US008478882B2

(12) United States Patent
Iwade et al.

(10) Patent No.: US 8,478,882 B2
(45) Date of Patent: Jul. 2, 2013

(54) INFORMATION PROCESSING APPARATUS, DATA ACQUISITION METHOD, AND PROGRAM

(75) Inventors: Takamasa Iwade, Tokyo (JP); Yohei Hashimoto, Tokyo (JP); Takuma Oiwa, Tokyo (JP); Kenji Hisanaga, Tokyo (JP); Yoshinori Atake, Kanagawa (JP); Tomohiro Katsube, Chiba (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/871,470

(22) Filed: Aug. 30, 2010

(65) Prior Publication Data

US 2011/0066732 A1    Mar. 17, 2011

(30) Foreign Application Priority Data

Sep. 17, 2009    (JP) ................................ P2009-216286

(51) Int. Cl.
*G06F 15/16* (2006.01)
*G06F 13/00* (2006.01)
*G06F 17/00* (2006.01)

(52) U.S. Cl.
USPC ............................ 709/227; 711/118; 715/234

(58) Field of Classification Search
USPC ............................ 709/227; 711/118; 715/234
See application file for complete search history.

(56) References Cited

U.S. PATENT DOCUMENTS

| 6,055,569 | A | 4/2000 | O'Brien et al. |
| 6,993,591 | B1* | 1/2006 | Klemm ........................ 709/232 |
| 2004/0205250 | A1* | 10/2004 | Bain et al. ..................... 709/249 |
| 2006/0069618 | A1* | 3/2006 | Milener et al. .................. 705/14 |
| 2006/0277308 | A1* | 12/2006 | Morse et al. ................... 709/227 |
| 2007/0067305 | A1* | 3/2007 | Ives ............................... 707/10 |
| 2008/0215206 | A1* | 9/2008 | Ikeda et al. ..................... 701/30 |
| 2008/0301300 | A1 | 12/2008 | Toub |
| 2009/0094361 | A1* | 4/2009 | Srinivasan .................... 709/224 |
| 2009/0259762 | A1* | 10/2009 | Karlsson et al. ............... 709/231 |

FOREIGN PATENT DOCUMENTS

JP    2004-280405    10/2004

OTHER PUBLICATIONS

European Search Report from the European Patent Office in corresponding European Application No. 10173497.8, dated Dec. 15, 2011.

Kuuskeri J. et al., "AsynchttpEval Rquest: A New Primitive for Downloading Web Applications Incrementally and Securely", Software Engineering and advanced Applications, 2009. SEAA "09.35$^{th}$ Euromicro Conference on, IEEE, Piscataway, NJ USA, Aug. 27, 2009, pp. 80-86, XP031577995.

Padmanabhan Venkata et al., "Using predictive prefetching to improve World Wide Web latency", IEEE Transactions on Antennas and Propagation, IEEE Service Center, vol. 26, No. 3, Jul. 1, 1996 pp. 22-36, XP002104433.

* cited by examiner

*Primary Examiner* — Boris Gorney
(74) *Attorney, Agent, or Firm* — Sherr & Jiang, PLLC

(57) ABSTRACT

Provided is a data acquisition method including the steps of selecting one or more of at least one link destination, acquiring, before the link destination is selected, display control data including at least a structural unit in which information relating to a layout of a display screen is written, the display control data existing at the link destination selected in the previous step, extracting structural units included in the display control data before the prefetched link destination is selected, generating, before the prefetched link destination is selected, first structured data for display control by linking the extracted structural units in which information involving script processing is not written, generating, in a case the prefetched link destination is selected, second structured data for display control by linking the structural units, displaying a display screen using the first structured data, and redisplaying the display screen using the second structured data.

11 Claims, 85 Drawing Sheets

FIG. 2
API FOR HANDLING STRUCTURE OR CONTENT OF HTML AND XML
RENDERING ENGINE CONVERTS A DOM TREE WHICH IS AN INTERNAL
PRESENTATION OF BROWSER TO A PAGE RESENTATION TO BE VIEWED BY USER
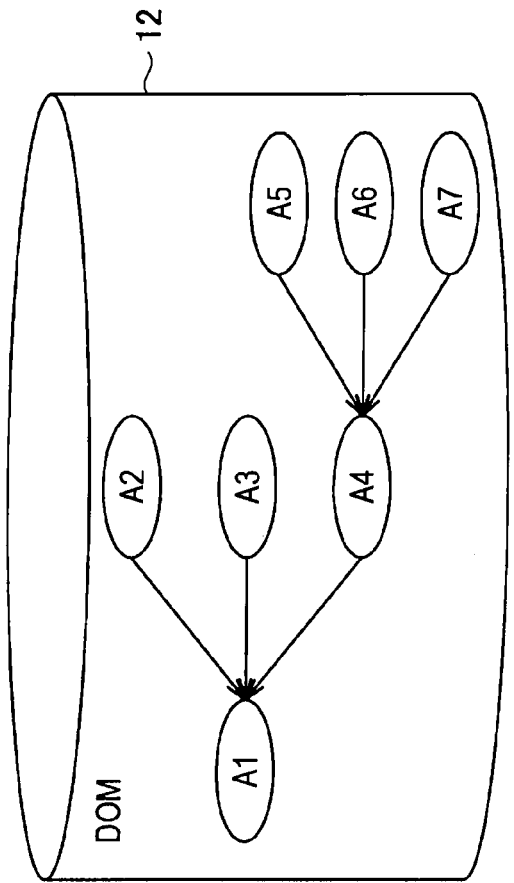
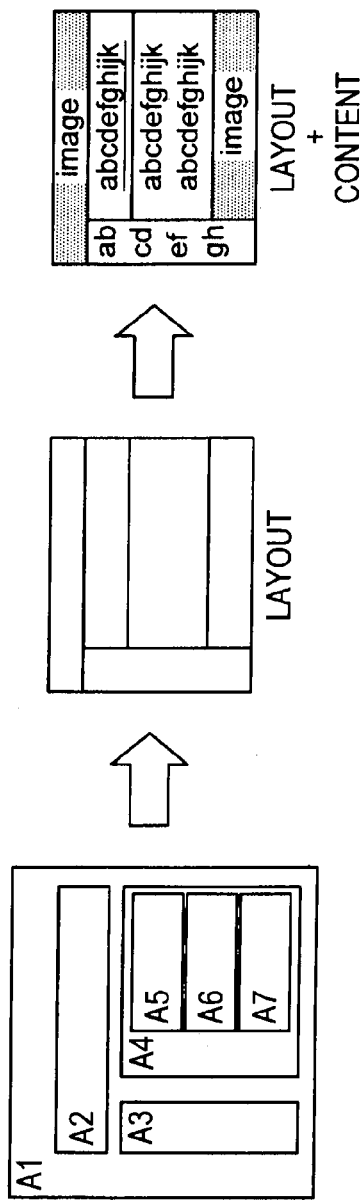

OVERVIEW OF PROCESSING OF HTML, CSS, JS
html + css
- DUE TO LAYOUT SPECIFICATION BY CSS, TEXT IS TO THE RIGHT/IMAGE IS TO SPECIFIED POSITION

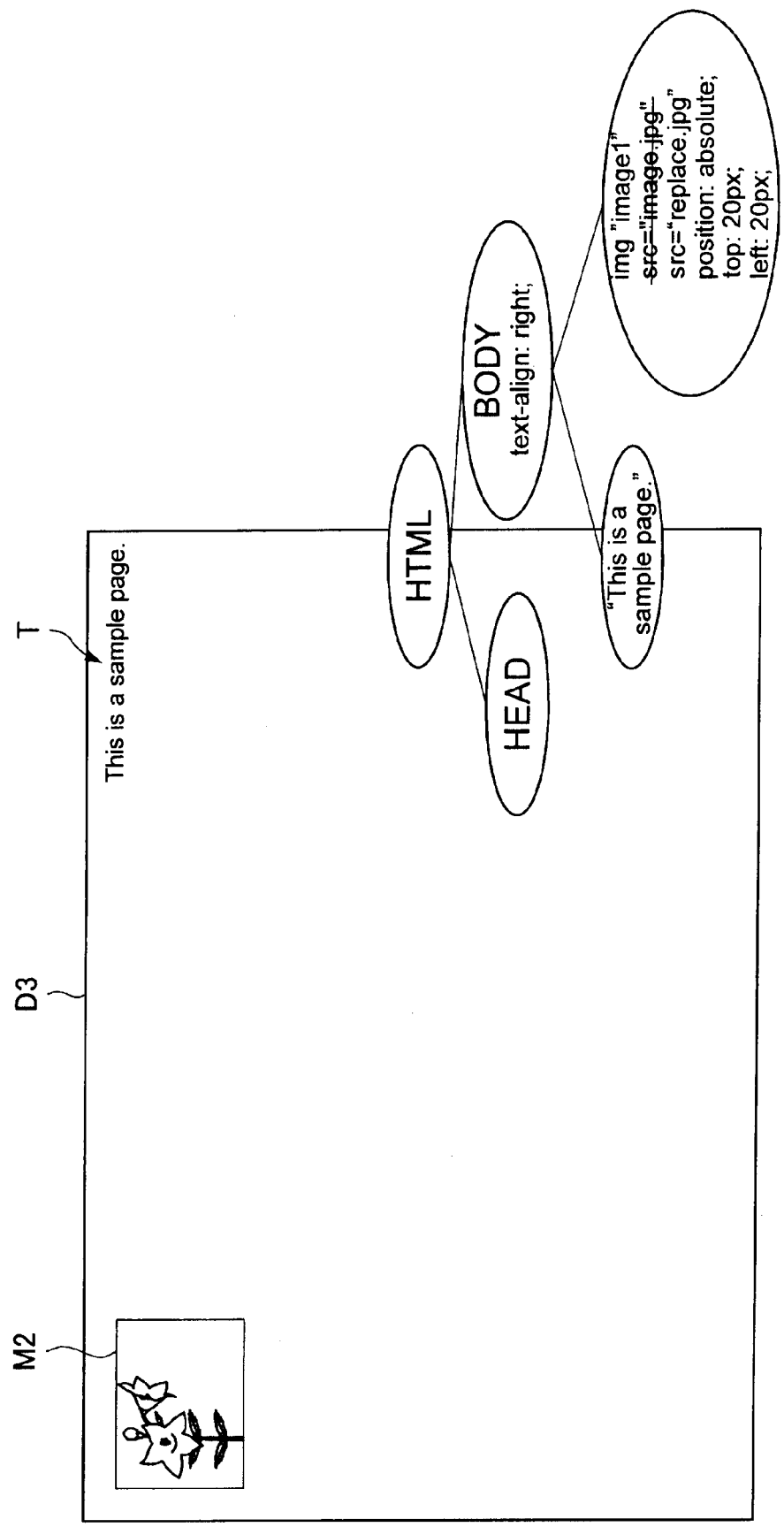

FIG. 18

PROCESSING FLOW OF EXISTING METHOD sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` download

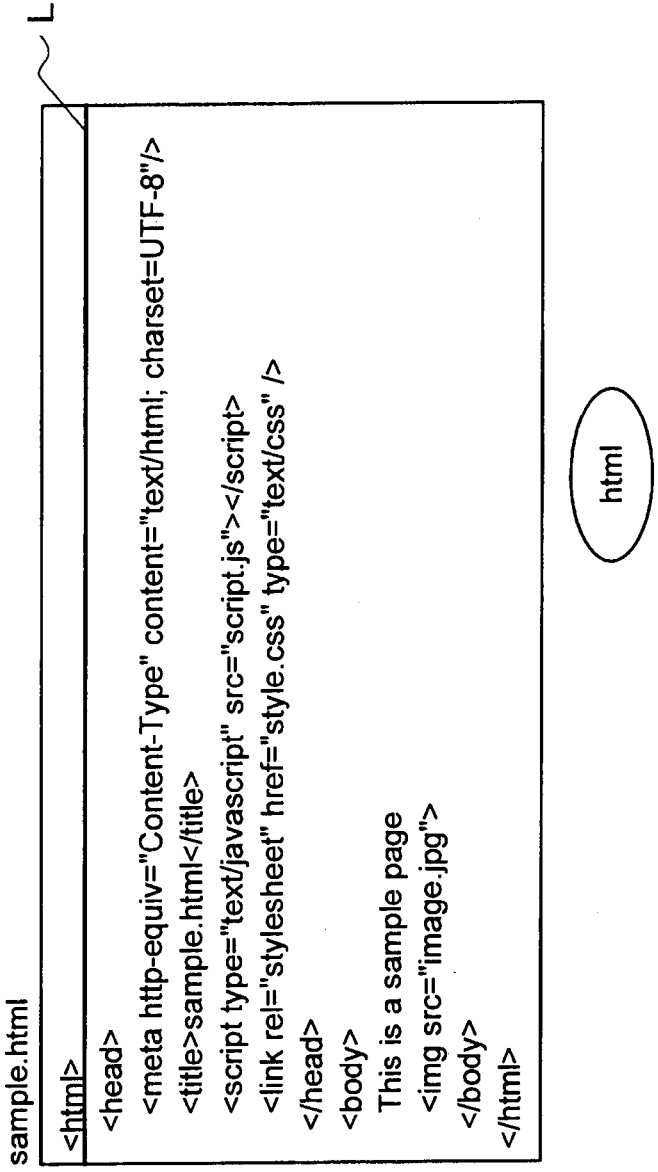

FIG. 21

PROCESSING FLOW OF EXISTING METHOD sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L

html — head — meta — http-equiv='Content-Type' content='text/html;charset=UTF-8'

FIG. 25

PROCESSING FLOW OF EXISTING METHOD sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js

```
document.title = 'new title';
```

WHEN SCRIPT IS EXECUTED, DOM STRUCTURE IS CHANGED

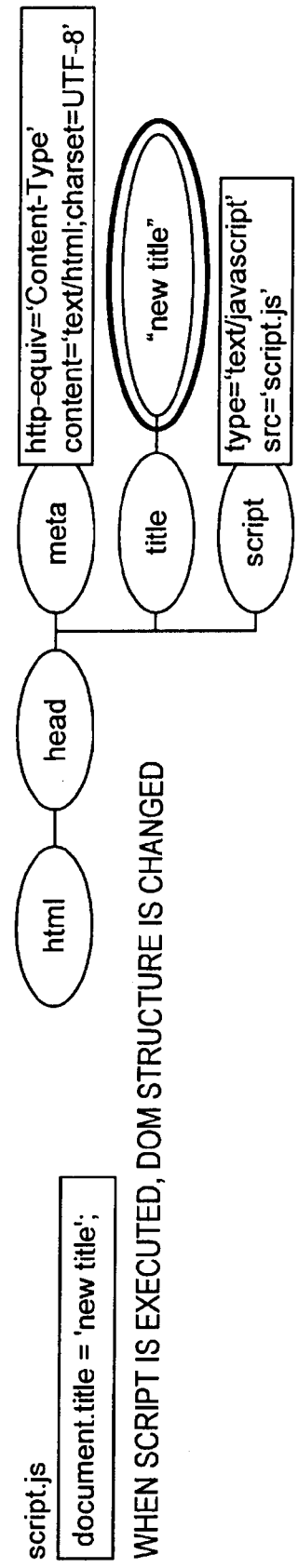

FIG. 28

PROCESSING FLOW OF EXISTING METHOD sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js
```
document.title = 'new title';
``` style.css
```
body {
  text-align: right;
}
```

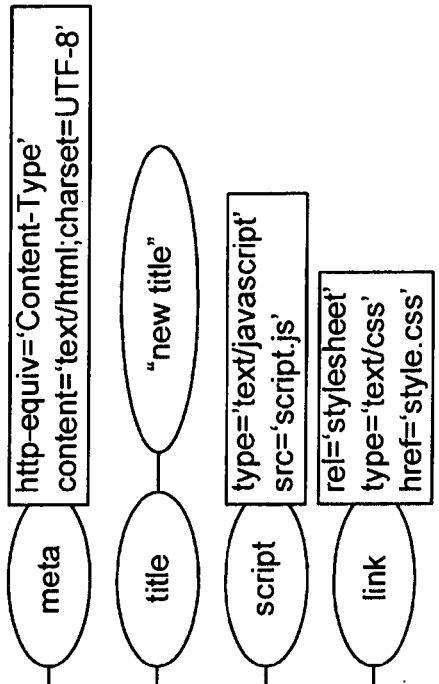

FIG. 29

PROCESSING FLOW OF EXISTING METHOD sample.html
```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
  This is a sample page
  <img src="image.jpg">
</body>
</html>
```

L script.js
```
document.title = 'new title';
``` style.css
```
body {
  text-align: right;
}
```

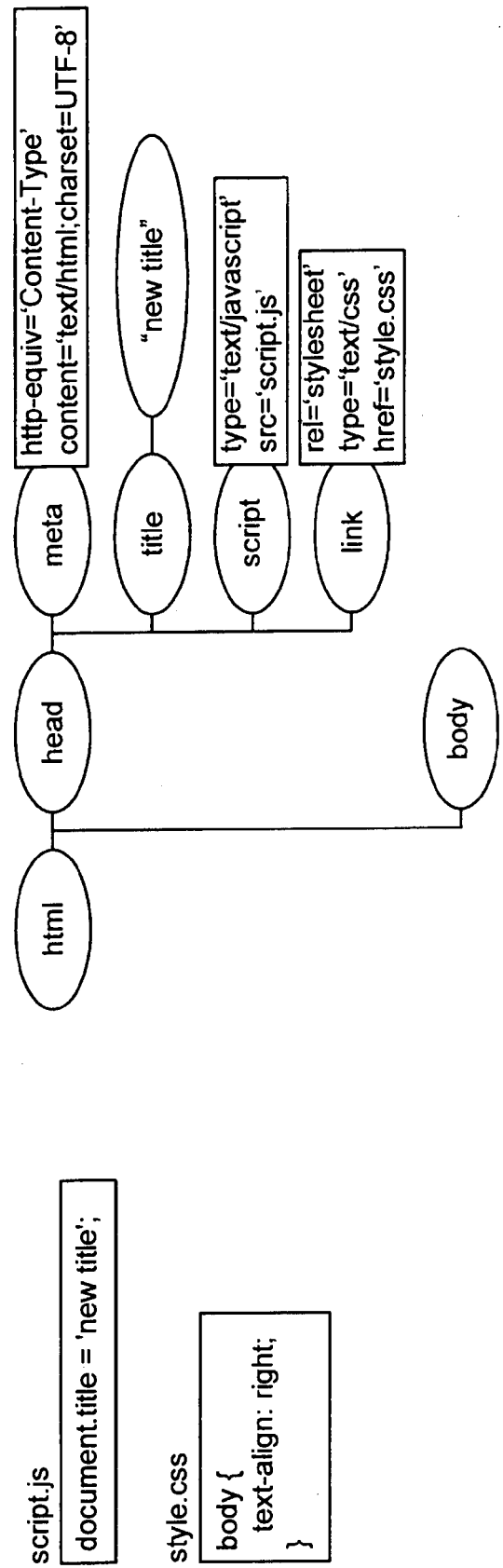

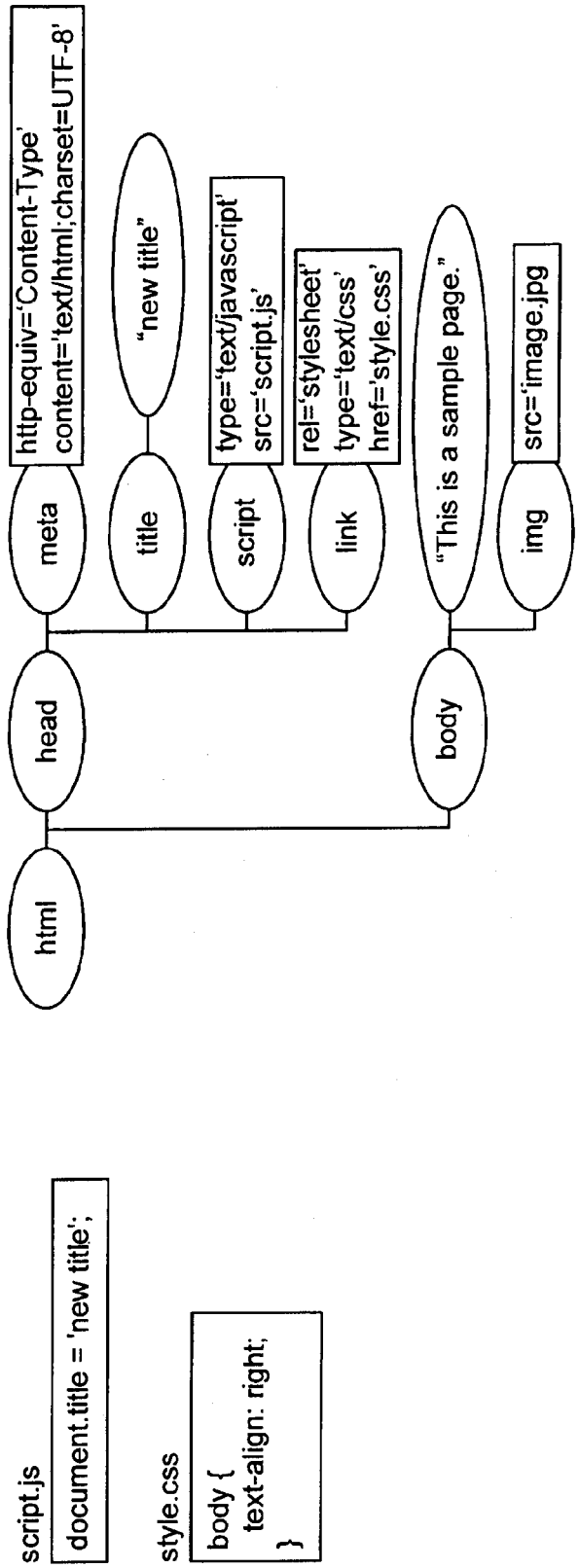

FIG. 31

PROCESSING FLOW OF EXISTING METHOD sample.html
```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js
```
document.title = 'new title';
``` style.css
```
body {
  text-align: right;
}
```

FIG. 36

PROCESSING FLOW BY FIRST THREAD OF PRESENT EMBODIMENT sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` download

FIG. 37

PROCESSING FLOW BY FIRST THREAD OF PRESENT EMBODIMENT
sample.html

```
<html>
  <head>
    <meta http-equiv="Content-Type" content="text/html; charset=UTF-8"/>
    <title>sample.html</title>
    <script type="text/javascript" src="script.js"></script>
    <link rel="stylesheet" href="style.css" type="text/css" />
  </head>
  <body>
    This is a sample page
    <img src="image.jpg">
  </body>
</html>
```

( html )

FIG. 38

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L

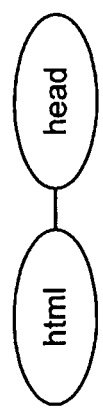

PROCESSING FLOW BY FIRST THREAD OF
PRESENT EMBODIMENT
sample.html

FIG. 39

```
<html>
 <head>
  <meta http-equiv="Content-Type" content="text/html; charset=UTF-8"/>
  <title>sample.html</title>
  <script type="text/javascript" src="script.js"></script>
  <link rel="stylesheet" href="style.css" type="text/css" />
 </head>
 <body>
  This is a sample page
  <img src="image.jpg">
 </body>
</html>
```

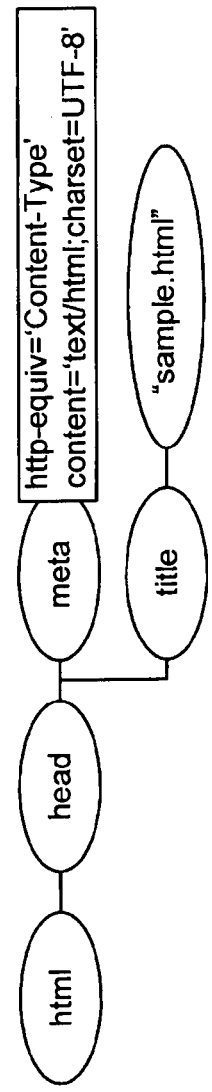

FIG. 40

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

FIG. 41

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

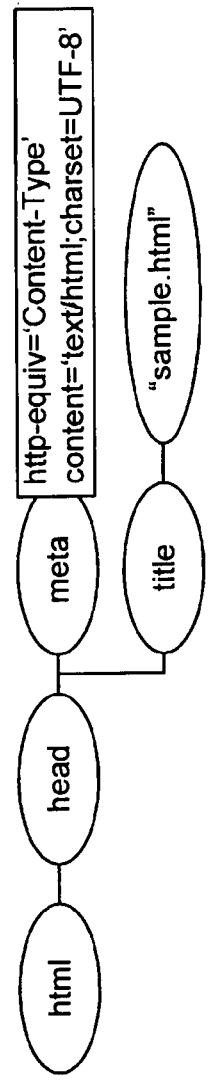

PROCESSING FLOW BY FIRST THREAD OF
PRESENT EMBODIMENT
sample.html

FIG. 42

```
<html>
<head>
<meta http-equiv="Content-Type" content="text/html; charset=UTF-8"/>
<title>sample.html</title>
<script type="text/javascript" src="script.js"></script>
```
———————— L
SKIP
```
<link rel="stylesheet" href="style.css" type="text/css" />
</head>
<body>
This is a sample page
<img src="image.jpg">
</body>
</html>
```

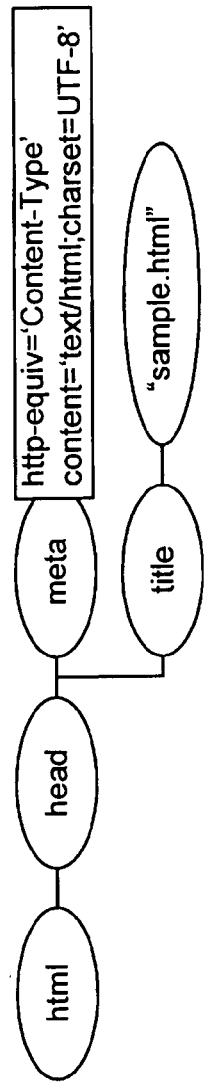

FIG. 43

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

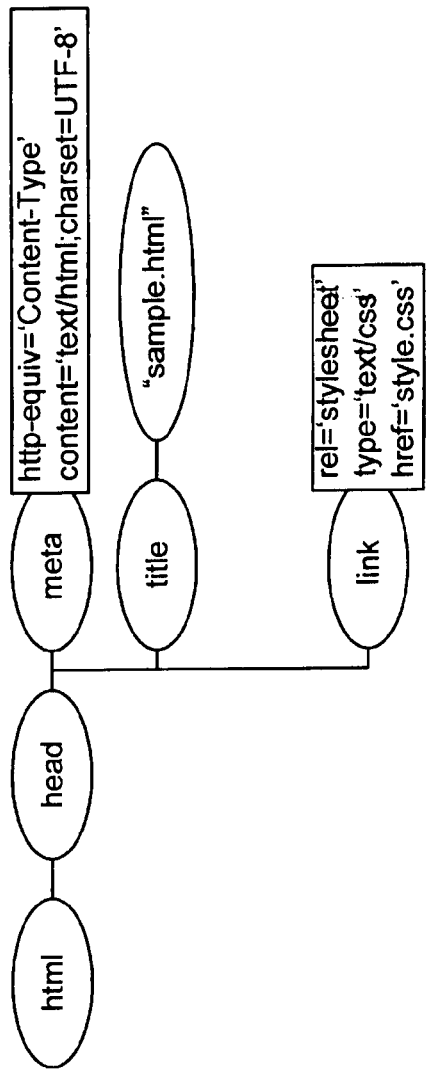

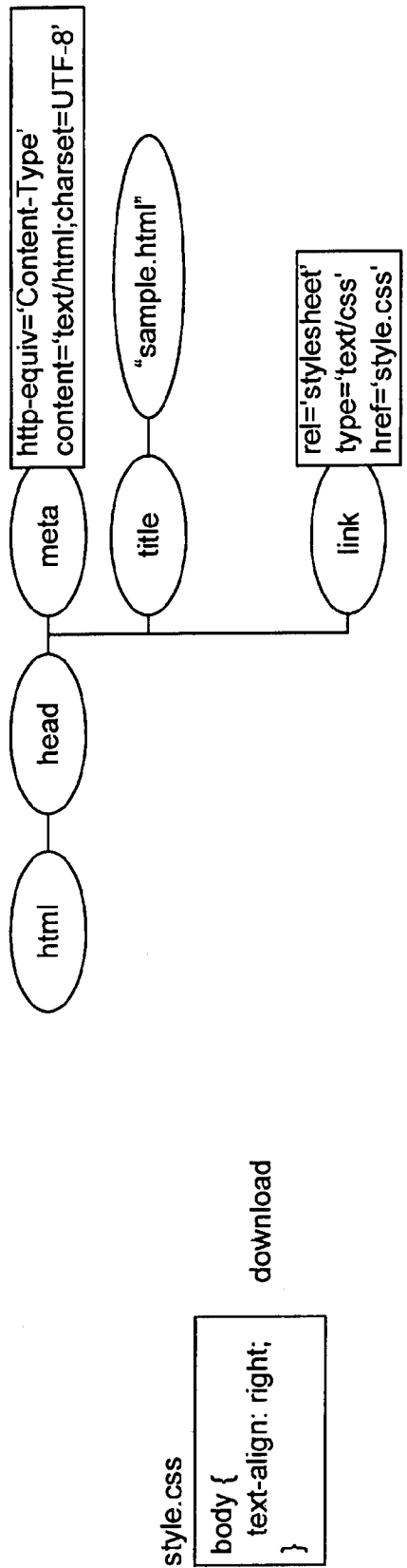

FIG. 44

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
    text-align: right;
}
``` download

FIG. 46

PROCESSING FLOW BY FIRST THREAD OF PRESENT EMBODIMENT sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L style.css
```
body {
    text-align: right;
}
```

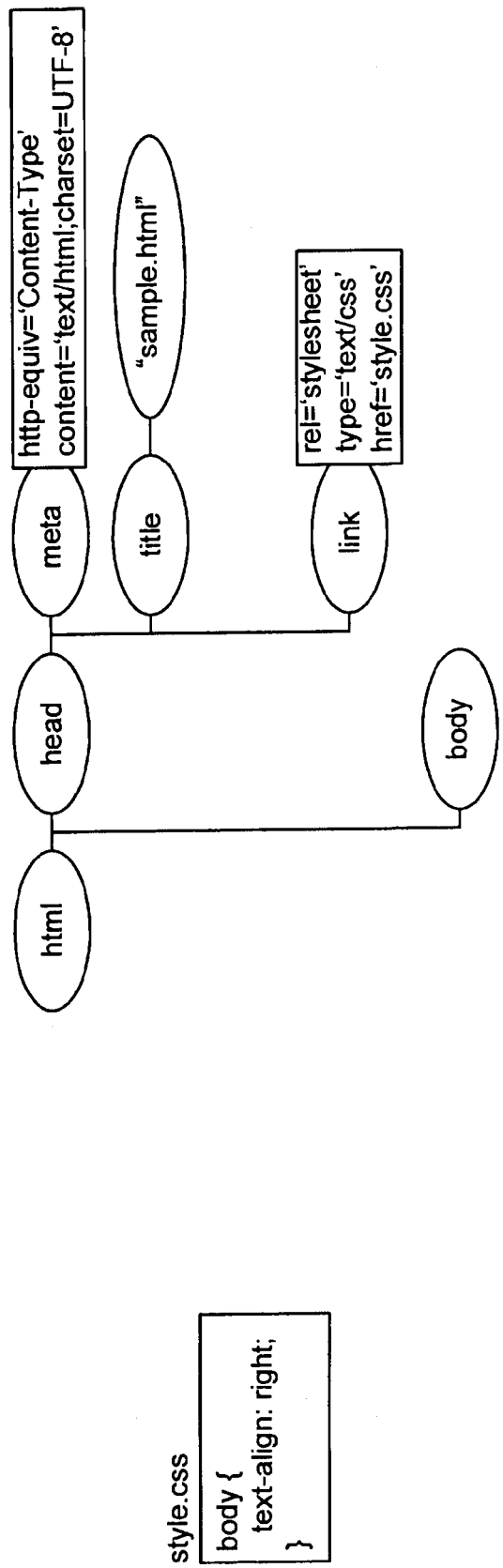

FIG. 47

PROCESSING FLOW BY FIRST THREAD OF
PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
  text-align: right;
}
```

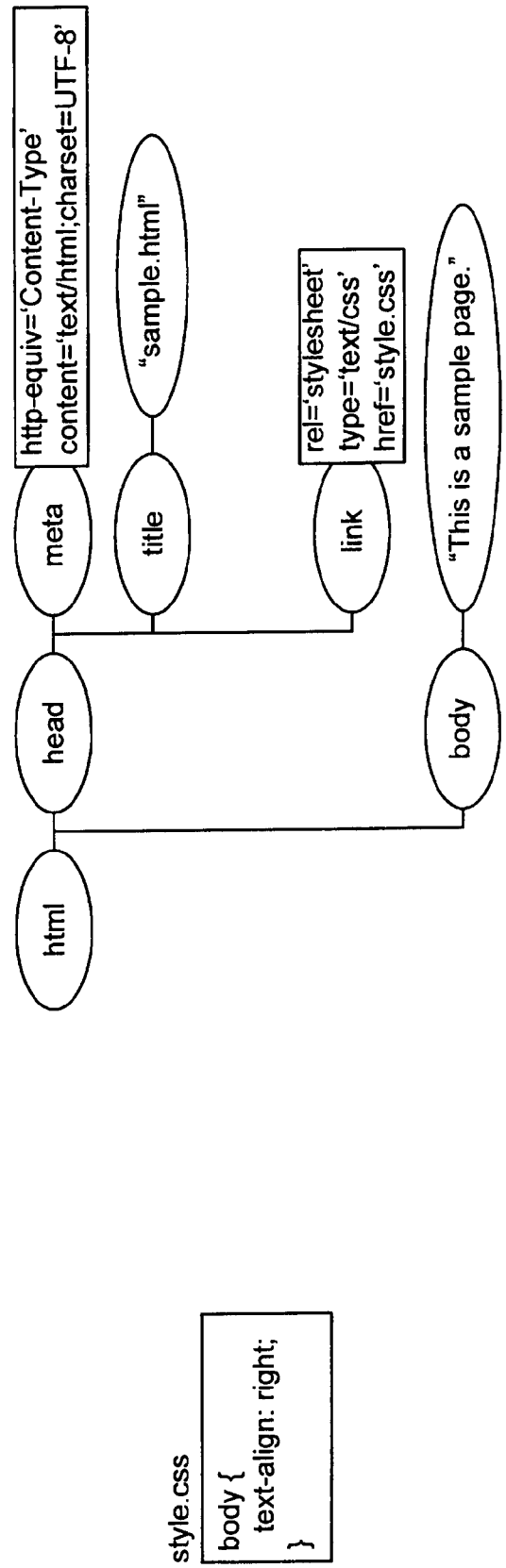

FIG. 48

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L style.css

```
body {
    text-align: right;
}
```

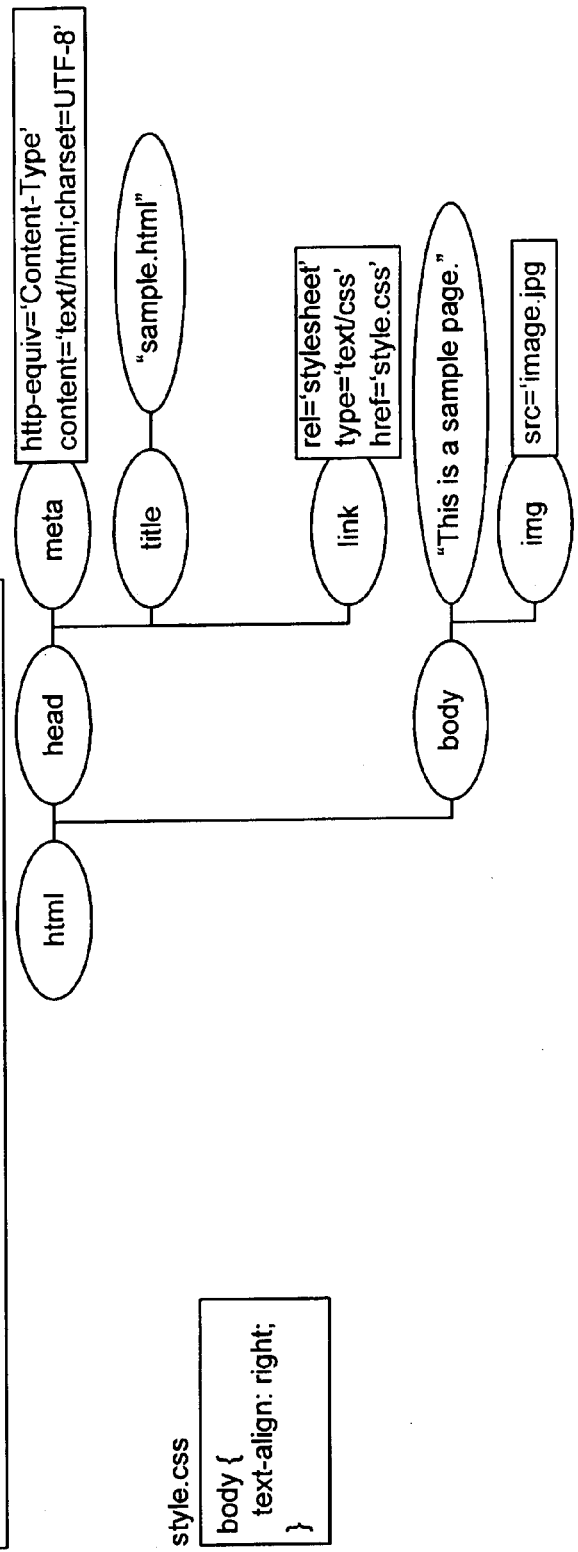

FIG. 49

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
  text-align: right;
}
``` image.jpg download
PROCEED WITH DOM BUILDING WITHOUT WAITING FOR DOWNLOAD COMPLETION

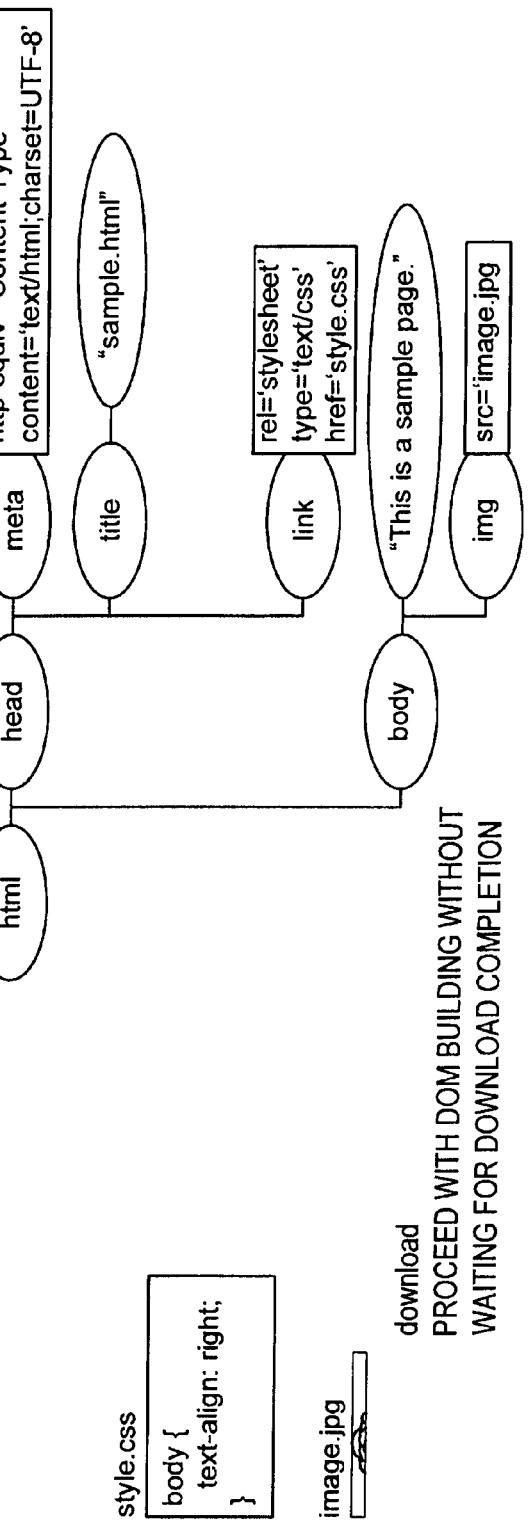

FIG. 50

PROCESSING FLOW BY FIRST THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
  text-align: right;
}
``` image.jpg    downloading...

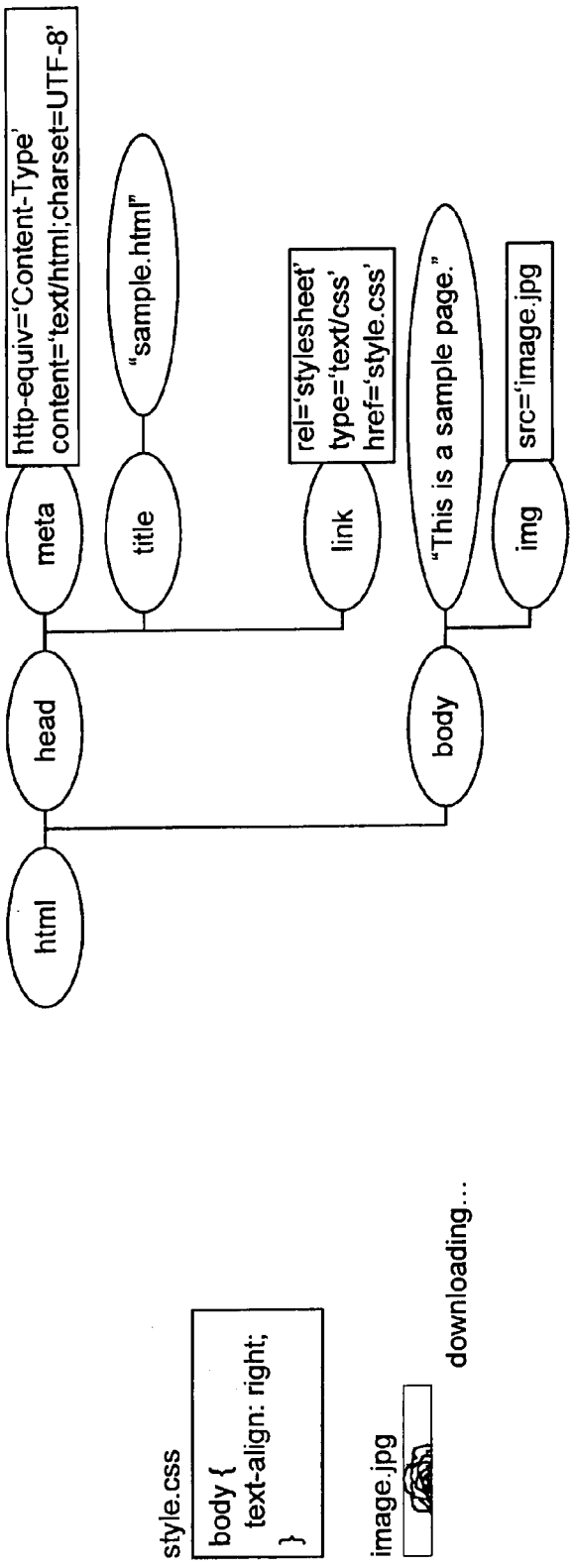

FIG. 53

PROCESSING FLOW BY SECOND THREAD OF PRESENT EMBODIMENT sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
  text-align: right;
}
``` image.jpg
downloading...

FIG. 54

PROCESSING FLOW BY SECOND THREAD OF PRESENT EMBODIMENT
sample.html

```
<html>
  <head>
    <meta http-equiv="Content-Type" content="text/html; charset=UTF-8"/>
    <title>sample.html</title>
    <script type="text/javascript" src="script.js"></script>
    <link rel="stylesheet" href="style.css" type="text/css" />
  </head>
  <body>
    This is a sample page
    <img src="image.jpg">
  </body>
</html>
```

( html )

style.css
```
body {
  text-align: right;
}
``` image.jpg
downloading...

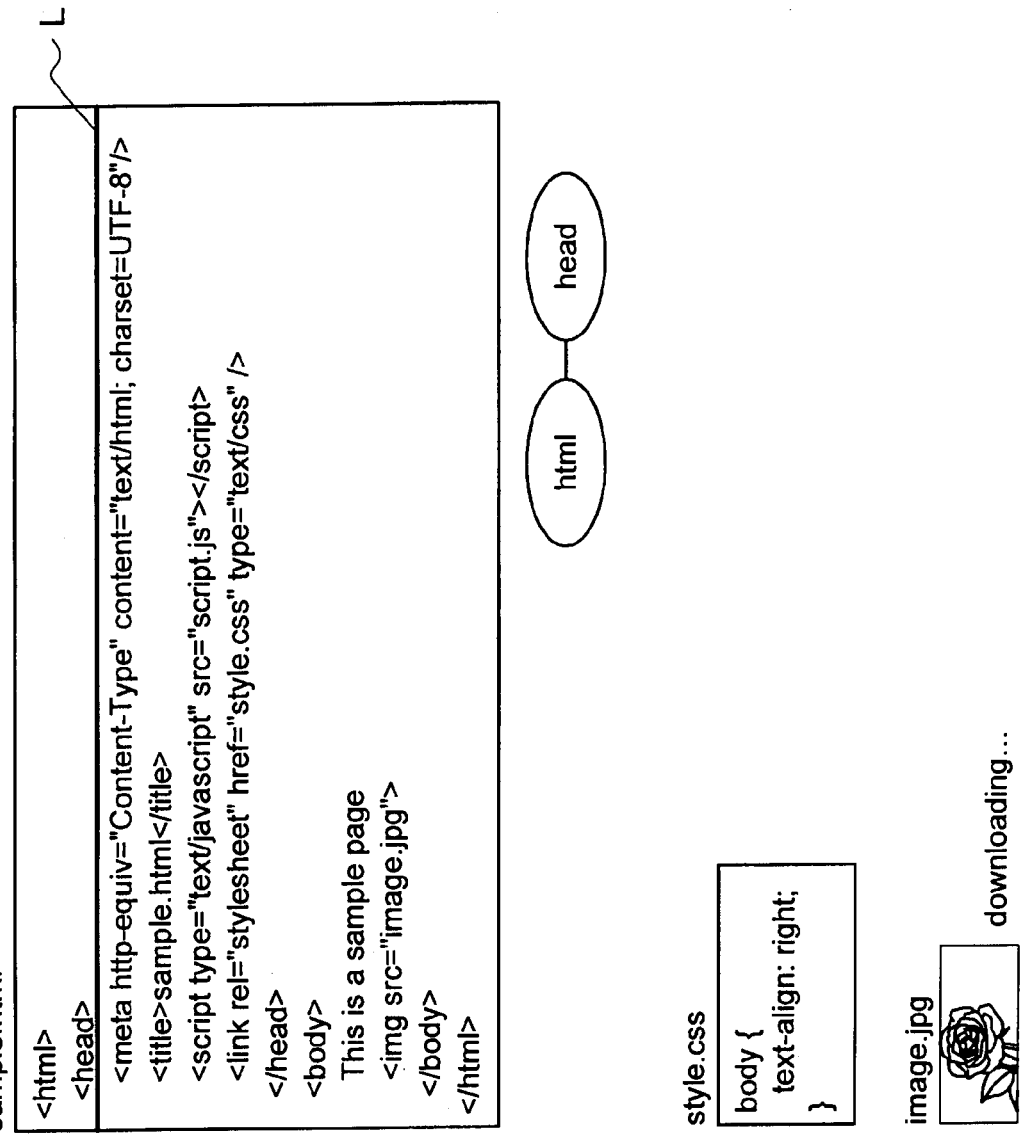

FIG. 56

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` style.css
```
body {
  text-align: right;
}
``` image.jpg
downloading....

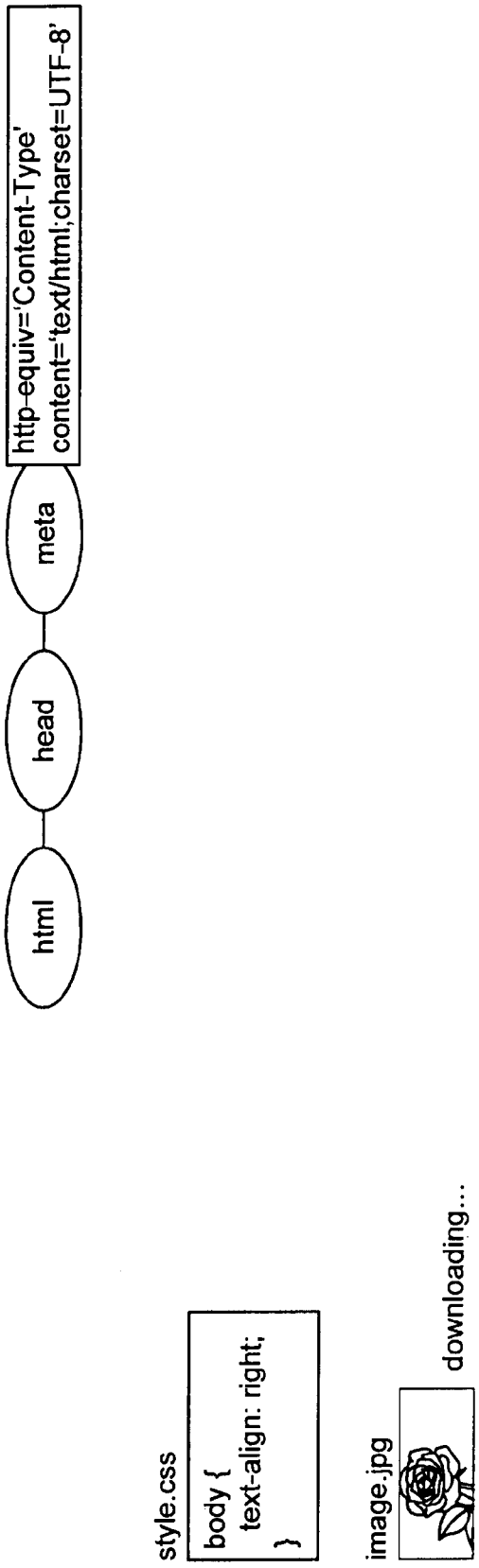

FIG. 57

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

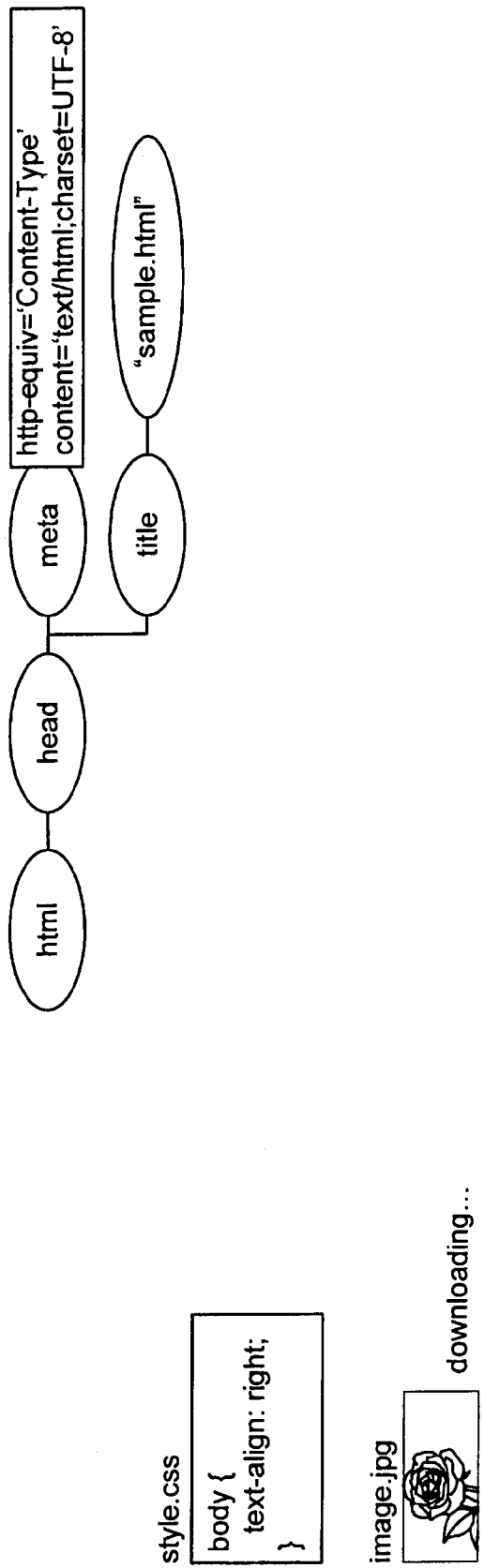

FIG. 58

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L

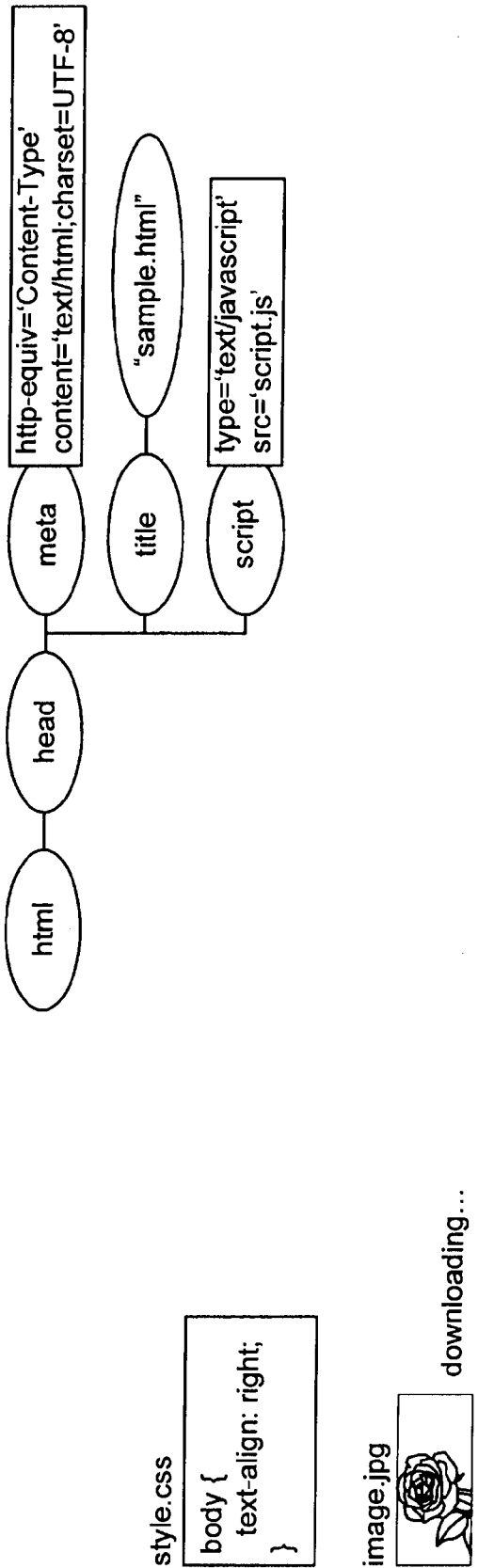

FIG. 59

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js
```
document.title = 'new title';
```
download&run style.css
```
body {
  text-align: right;
}
``` image.jpg
downloading...

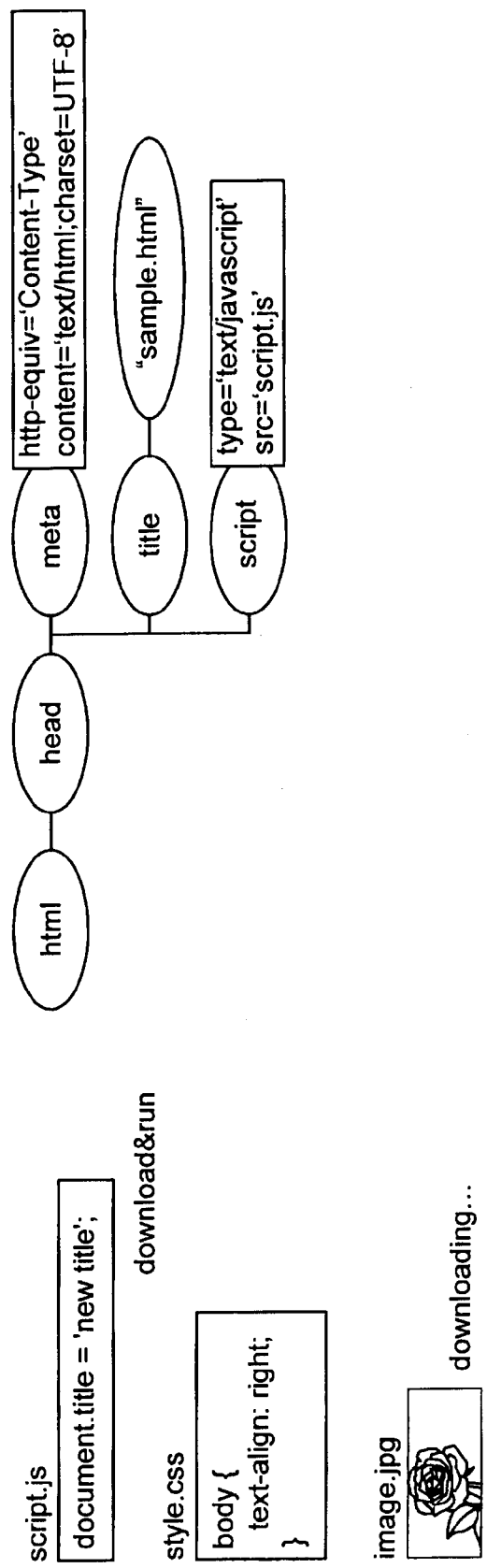

FIG. 60

PROCESSING FLOW BY SECOND THREAD OF PRESENT EMBODIMENT sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L script.js
```
document.title = 'new title';
``` style.css
```
body {
  text-align: right;
}
``` image.jpg downloading...

html — head — meta (http-equiv='Content-Type' content='text/html;charset=UTF-8')
           — title — "new title"
           — script (type='text/javascript' src='script.js')

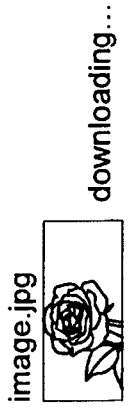

FIG. 62

PROCESSING FLOW BY SECOND THREAD OF PRESENT EMBODIMENT sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
```

L

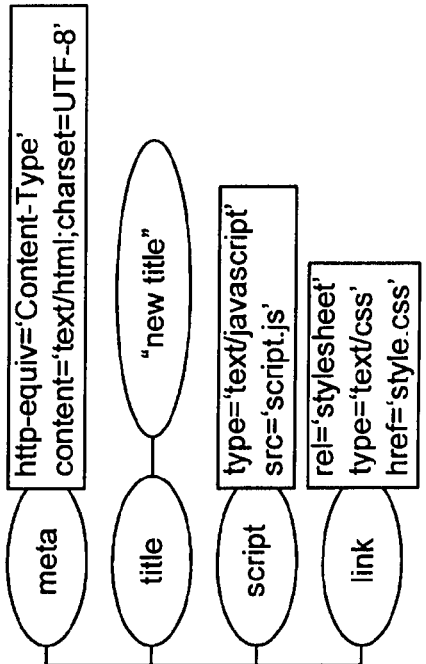

script.js document.title = 'new title';

style.css

```
body {
  text-align: right;
}
``` image.jpg

downloading...

FIG. 63

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js
```
document.title = 'new title';
``` style.css
```
body {
  text-align: right;
}
``` image.jpg

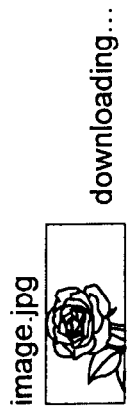

downloading....

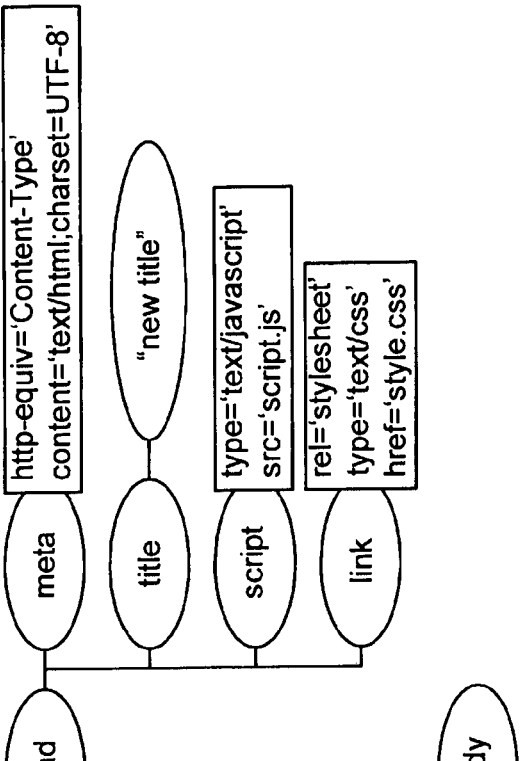

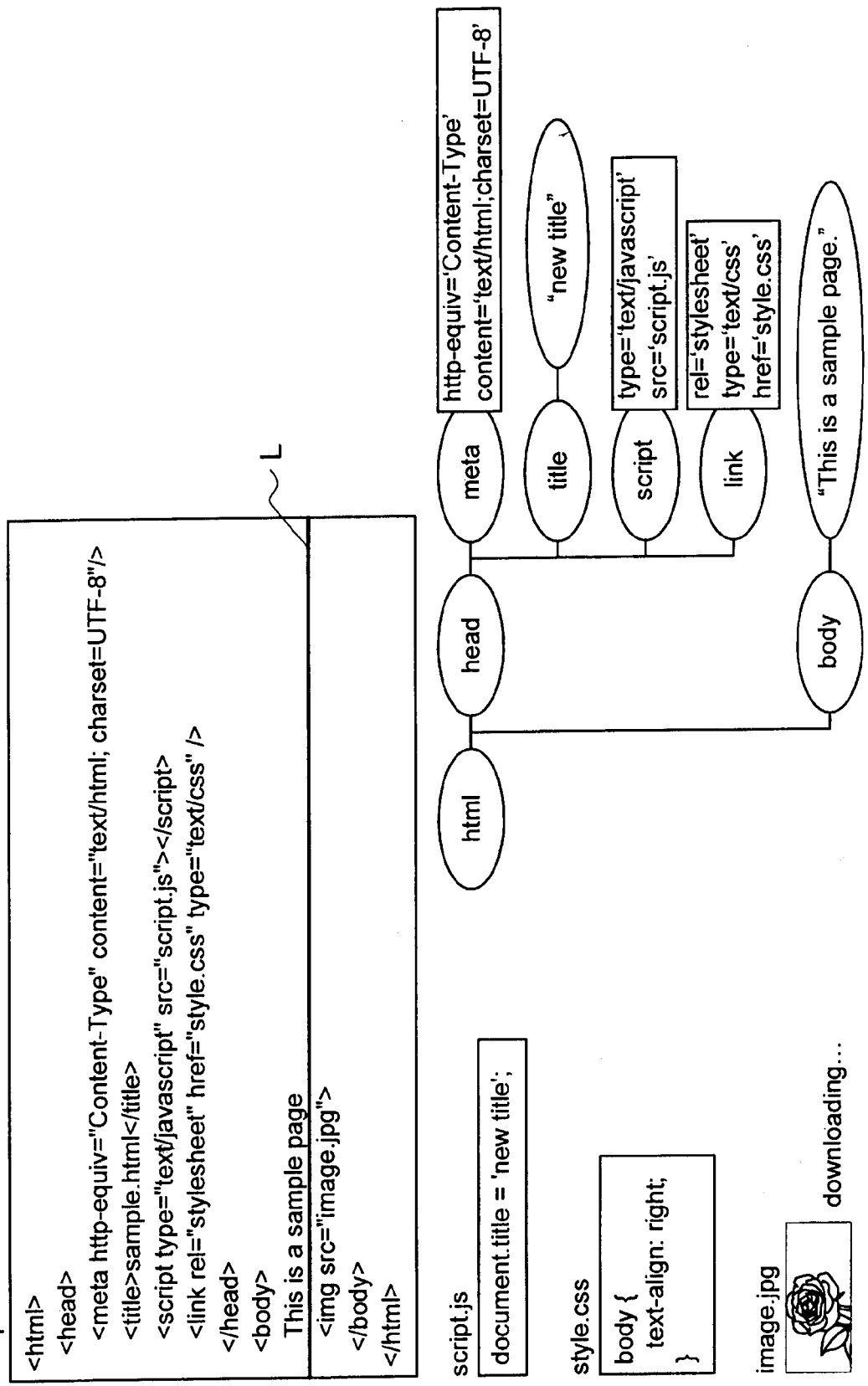

FIG. 66

PROCESSING FLOW BY SECOND THREAD OF PRESENT EMBODIMENT sample.html

```
<html>
 <head>
  <meta http-equiv="Content-Type" content="text/html; charset=UTF-8"/>
  <title>sample.html</title>
  <script type="text/javascript" src="script.js"></script>
  <link rel="stylesheet" href="style.css" type="text/css" />
 </head>
 <body>
  This is a sample page
  <img src="image.jpg">
 </body>
</html>
``` script.js
```
document.title = 'new title';
``` style.css
```
body {
  text-align: right;
}
``` image.jpg

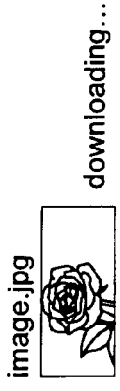

downloading...

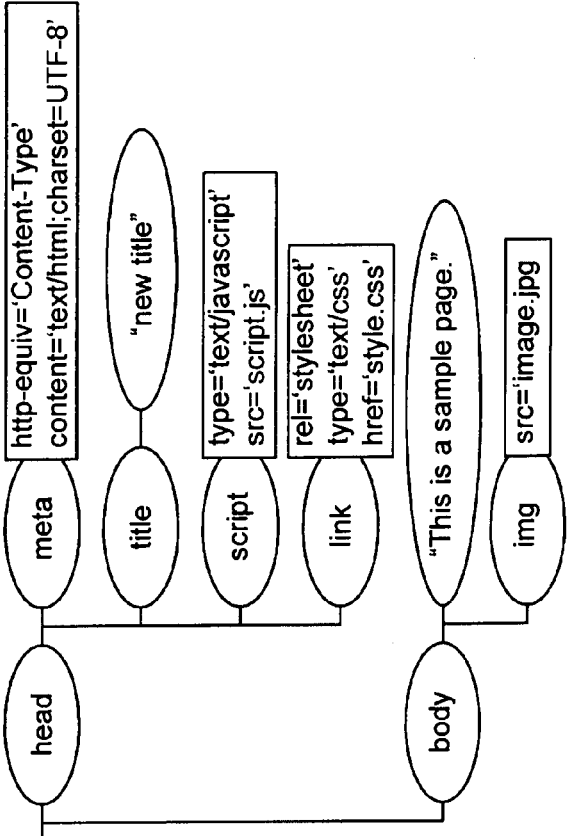

FIG. 67

PROCESSING FLOW BY SECOND THREAD OF PRESENT EMBODIMENT
sample.html

```
<html>
<head>
<meta http-equiv="Content-Type" content="text/html; charset=UTF-8"/>
<title>sample.html</title>
<script type="text/javascript" src="script.js"></script>
<link rel="stylesheet" href="style.css" type="text/css" />
</head>
<body>
This is a sample page
<img src="image.jpg">
</body>
</html>
``` script.js
```
document.title = 'new title';
``` style.css
```
body {
    text-align: right;
}
``` image.jpg downloading...

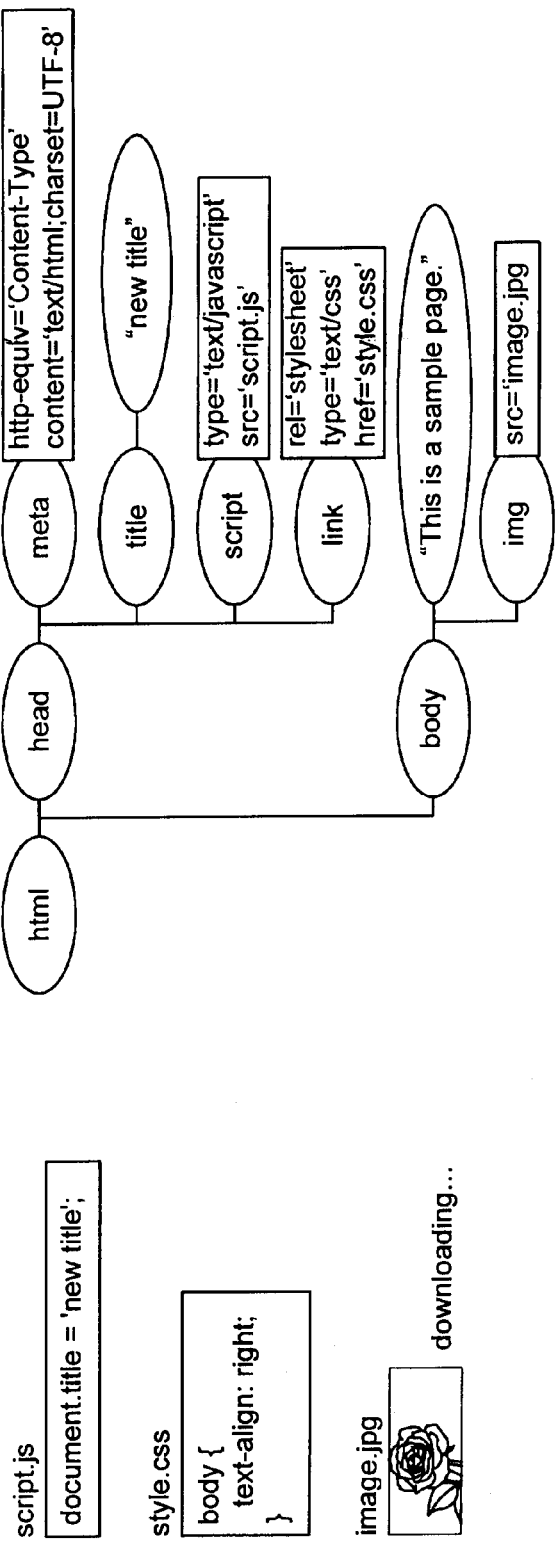

FIG. 72

- HTML, CSS PREFETCHING (ORDER OF PRIORITY)
  - (1) PAGES REGISTERED IN BOOKMARK LIST
  - (2) PAGES AT THE TOP OF SEARCH RESULT
  - (3) PAGES OF LINK DESTINATIONS IN BROWSING PAGE
- CREATION OF TEMPORARY DOM

FIG. 77

CONNECT TO LINK DESTINATION HOST → REDUCE LOADING TIME BY ESTABLISHING TCP CONNECTION TO HOST OF LINK DESTINATION IN ADVANCE BEFORE USER CLICKS LINK ON DISPLAYED WEB PAGE.

CONNECT DURING URL INPUT → REDUCE LOADING TIME BY ESTABLISHING TCP CONNECTION TO HOST OF SPECIFIED DESTINATION IN ADVANCE DURING INPUT OF URL BY USER.

FIG. 78

[LINK THAT IS HIGHLY PROBABLE TO BE CLICKED IN NEAR FUTURE]
- LINK DISPLAYED IN UPPER PART OF SEARCH RESULT SCREEN
- LINK IN CURRENTLY DISPLAYED SCREEN
- FREQUENTLY ACCESSED LINK IN BROWSING HISTORY
- LINK NEAR MOUSE POINTER OR LINK NEAR FINGER
- etc

[FACTOR FOR HIGH EFFECTIVENESS (LARGE RTT)]
- DETERMINATION BY DOMAIN (OTHER THAN DIRECTING DOMAIN, ETC.)
- SIGNIFICANTLY DIFFERENT IP RANGE (FAR-OFF COUNTRY)
- PING
- CACHE CONNECTION ESTABLISHMENT TIME
- etc

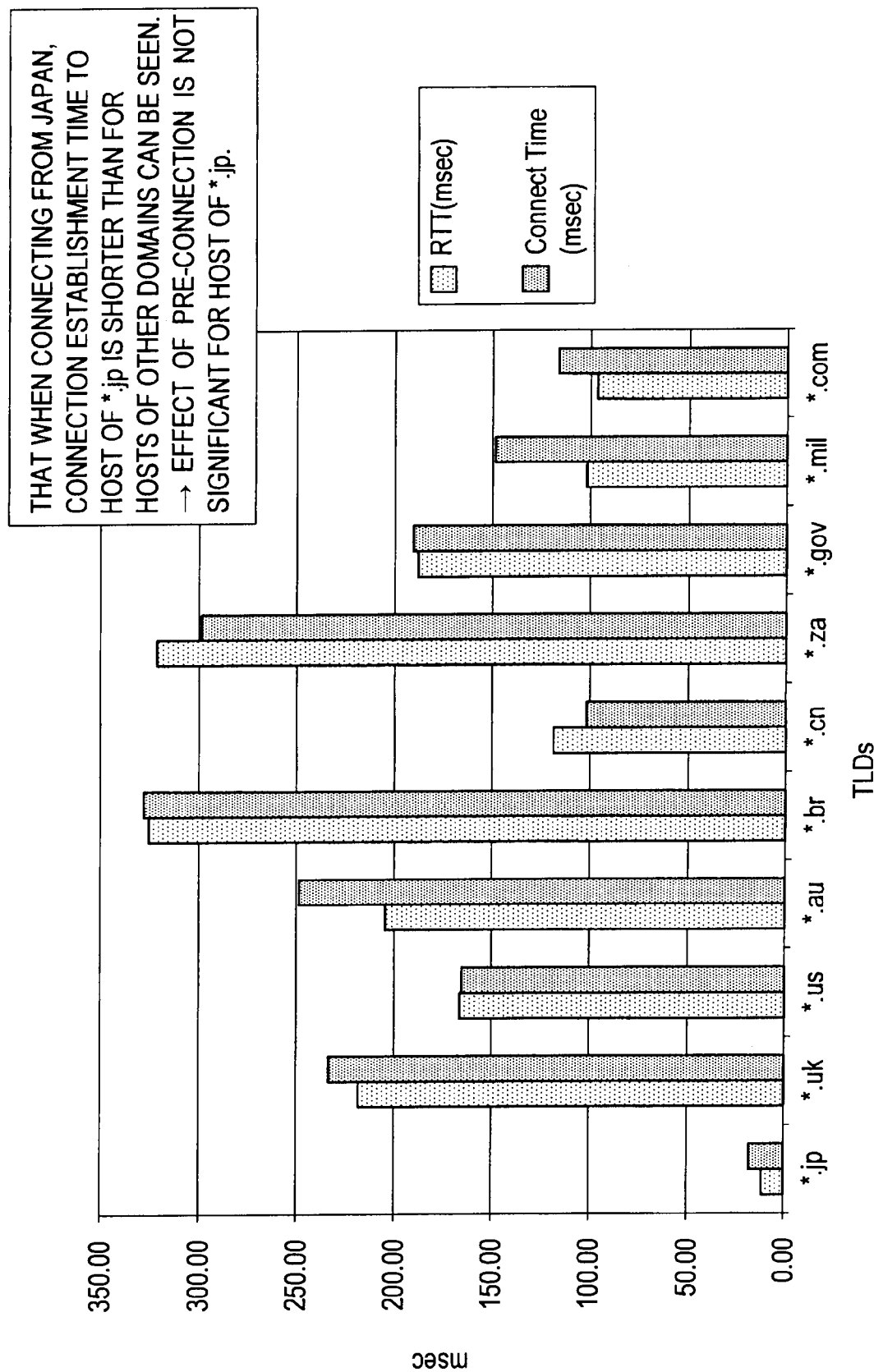

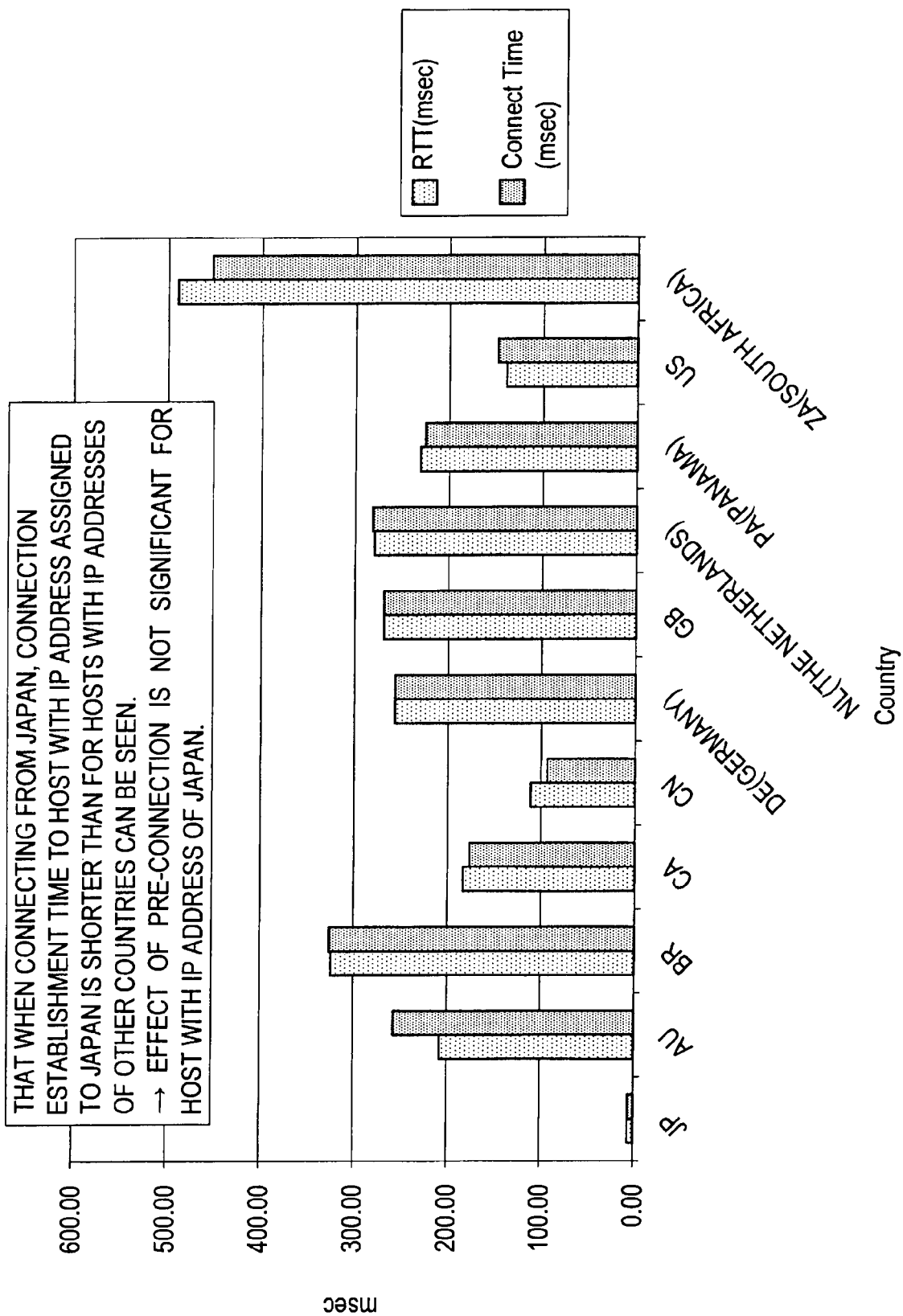

1. DETECT THAT FINGER NEARED TOUCH PANEL (PROXIMITY DETECTION)

2. IN THE CASE LINK IS PRESENT WITHIN DETECTED AREA,

3. START PREFETCHING FOR THE LINK

4. WHEN LINK IS TOUCHED, READ FILES FOLLOWING ALREADY PREFETCHED FILE

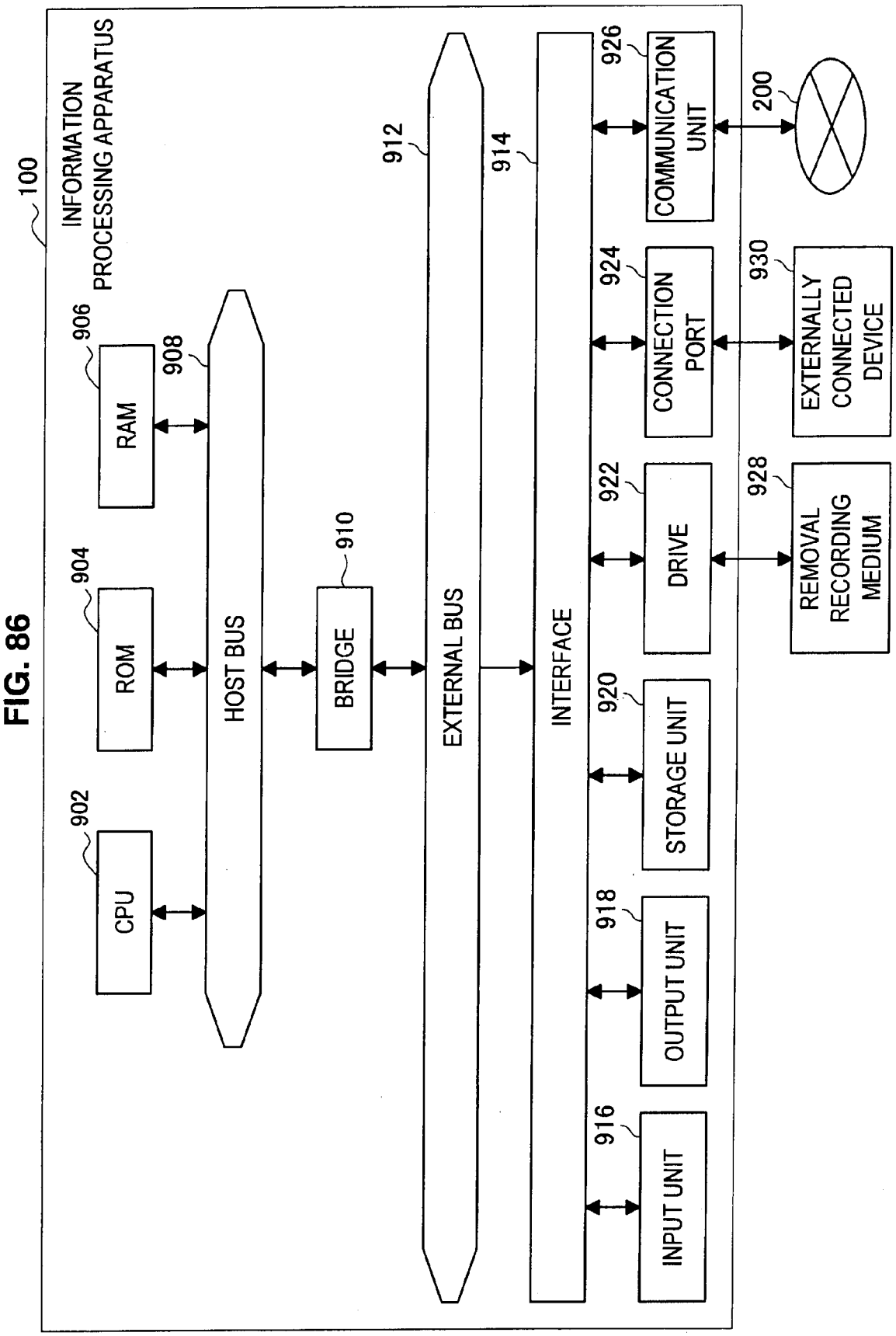

INFORMATION PROCESSING APPARATUS, DATA ACQUISITION METHOD, AND PROGRAM

BACKGROUND OF THE INVENTION

1. Field of the Invention

The present invention relates to an information processing apparatus, a data acquisition method, and a program.

2. Description of the Related Art

With the development of information communication technology, a network bandwidth is being widened. Accordingly, the volume of content transmitted over a wide area network such as the Internet is also on the increase. Also, a program for performing script processing is embedded in many of the homepages published on the wide area network, and the page structures are modified so that dynamic processing can be performed on the homepages. However, when reading large content or performing script processing, a long time is taken until a homepage is fully displayed. In view of such issue, there is developed technology for caching, in advance, information published on the wide area network such as the Internet (hereinafter, WWW information), and for displaying the WWW information cached in advance when access is requested by a user. In relation to this technology, JP-A-2004-280405 discloses technology for efficiently caching the WWW information.

SUMMARY OF THE INVENTION

However, it is difficult to appropriately select WWW information to be cached in advance. For example, if all the pieces of the WWW information of the link destinations described in a displayed page are to be cached, acquisition itself of the WWW information will take a long time in a case there are many link destinations. Also, large amounts of cache memory will be used. Furthermore, most of the communication bandwidth will be taken up for the acquisition of the WWW information to be cached. For these reasons, to quickly display a page, it is necessary not only to cache the WWW information, but also to further refine the WWW information acquisition method.

The WWW information includes information for performing display control of a page (hereinafter, display control information). Also, the display control information includes information that defines the layout of a page (hereinafter, layout information), information for making a client terminal perform script processing (hereinafter, script information), and the like. However, the layout information and the script information mentioned above may be treated as separate data from the display control information mentioned above. In this case, link information between the display control information and the layout information and link information between the display control information and the script information are included in the display control information. Therefore, practically, the layout information and the script information are included in the display control information.

In many cases, the display control information is written in a structured language such as an HTML (HyperText Markup Language) and an XML (eXtensible Markup Language), for example. These structured languages adopt a description method which defines a structural unit by using tags. Accordingly, the display control information is structured with a section delimited by the tags as the structural unit. Also, in many cases, the layout information mentioned above is expressed in style sheets such as CSS (Cascading Style Sheets) and the like. Furthermore, in many cases, the script information mentioned above is written in a script language such as JavaScript (registered trademark; hereinafter, abbreviated as JS), ECMAScript, VBScript (registered trademark), and the like.

As described, the display control information (1) includes the layout information and the script information, and (2) is structured based on specific structural units. Normally, at the time of displaying the WWW information by a WWW browser or the like, the display control information is analysed, and the execution order of display processing or the acquisition order of data is determined with the structural units included in the display control information as a reference. Next, the structural units are linked to each other by a WWW browser or the like, and structured data for display control, called DOM (Document Object Model), is created. Then, acquisition of data, display of data, and the like are performed based on the DOM created by the WWW browser or the like (see FIG. 1).

At the time of building the DOM, if the script information is included in the display control information, data acquisition or display processing is delayed due to the sequential nature of script processing. Accordingly, even if sufficiently wide bandwidth is reserved for the wide area network, when a page is to be displayed based on the display control information including the script information, there is a certain amount of wait time until the page is displayed. Particularly, if the steps of the script processing are nested, the wait time is further increased.

In light of the foregoing, it is desirable to provide an information processing apparatus, a data acquisition method, and a program which are new and improved, and which are capable of reducing the display delay of a page caused due to the script processing that is sequentially performed and of quickly displaying a well laid-out page.

According to an embodiment of the present invention, there is provided an information processing apparatus which includes a link selection unit that selects one or more of at least one link destination which is a result of search based on key information, a data prefetch unit that acquires, before the link destination is selected by user operation, information relating to a layout of a display screen and display control data including at least a structural unit in which the information relating to a layout of a display screen is written, the display control data and the information relating to a layout of a display screen existing at the link destination selected by the link selection unit, a structure analysis unit that analyses the display control data and extracts structural units included in the display control data, in a case the link destination whose display control data has been acquired by the data prefetch unit is selected by the user operation, a first structuring unit that generates, in a case the link destination whose display control data has been acquired by the data prefetch unit is selected by the user operation, first structured data for display control by mutually linking, except for a structural unit in which information relating to display control involving script processing is written, the structural units including at least the structural unit in which the information relating to a layout of a display screen is written, among the structural units extracted by the structure analysis unit, a second structuring unit that generates, in a case the link destination whose display control data has been acquired by the data prefetch unit is selected by the user operation, second structured data for display control by mutually linking the structural units, and a display control unit that displays a display screen by using the first structured data generated by the first structuring unit, and, at a stage the second structured data is generated by the second structuring unit, redisplays the display screen by using the second structured data.

The information processing apparatus may further include a connection establishment unit that establishes a connection to the link destination. The link selection unit may further select at least any of the link destination existing within a specific range of a display position of a position specifying object that is used for specifying a position on the display screen, the link destination currently displayed on the display screen and the link destination which has been selected specific times or more. The connection establishment unit may establish a TCP connection to the link destination that the link selection unit further selected, before the link destination is selected by the user operation.

The link selection unit may select, as a link destination to which the TCP connection is to be established, a link destination whose round-trip time is a specific threshold or more, among the at least one link destination.

The link selection unit may decide, according to a domain name or an IP address of the link destination, whether or not the link destination is to be selected as the link destination to which the TCP connection is to be established.

The information processing apparatus may further include a data acquisition unit that acquires the display control data and related data related to the display control data. The data acquisition unit may handle a data acquisition request from the first structuring unit in priority to a data acquisition request from the second structuring unit.

The connection establishment unit may acquire, when a host address of the link destination is decided, an IP address corresponding to the host address before prefetching of the display control data or establishment of the TCP connection.

The information processing apparatus may further include a cache memory in which the display control data and the related data acquired by the data acquisition unit upon requests from the first structuring unit and the second structuring unit are stored. The display control unit may switch display based on data stored in the cache memory, at a time point of all the display control data required for display based on the second structured data having been stored in the cache memory.

The second structuring unit does not have to generate the second structured data in a case the structural unit in which the information relating to display control involving script processing is written is not present in the structural units extracted by the structure analysis unit.

The information processing apparatus may further include a display history storage unit that stores a history including a structural unit corresponding to content displayed on the display screen at a time of performing display based on the first structured data. The display control unit may select, at a time of switching to display based on the second structured data, a structural unit corresponding to content to be displayed on the display screen, based on display history stored in the display history storage unit.

According to another embodiment of the present invention, there is provided a data acquisition method which includes the steps of selecting one or more of at least one link destination which is a result of search based on key information, acquiring, before the link destination is selected by user operation, display control data including at least a structural unit in which information relating to a layout of a display screen is written, the display control data existing at the link destination selected in the step of selecting a part of at least one link selection destination, analysing the display control data and extracting structural units included in the display control data before the link destination whose display control data has been acquired prior to the user operation is selected by the user operation, generating, before the link destination whose display control data has been acquired prior to the user operation is selected by the user operation, first structured data for display control by mutually linking, except for a structural unit in which information relating to display control involving script processing is written, the structural units including at least the structural unit in which the information relating to a layout of a display screen is written, among the structural units extracted in the step of extracting structural units, generating, in a case the link destination whose display control data has been acquired prior to the user operation is selected by the user operation, second structured data for display control by mutually linking the structural units, displaying a display screen by using the first structured data generated in the step of generating first structured data, and redisplaying, at a stage the second structured data is generated, the display screen by using the second structured data.

According to another embodiment of the present invention, there is provided a program for causing a computer to realize a link selection function of selecting one or more of at least one link destination which is a result of search based on key information, a data prefetch function of acquiring, before the link destination is selected by user operation, display control data including at least a structural unit in which information relating to a layout of a display screen is written, the display control data existing at the link destination selected by the link selection function, a structure analysis function of analysing the display control data and extracting structural units included in the display control data, before the link destination whose display control data has been acquired by the data prefetch function is selected by the user operation, a first structuring function of generating, before the link destination whose display control data has been acquired by the data prefetch function is selected by the user operation, first structured data for display control by mutually linking, except for a structural unit in which information relating to display control involving script processing is written, the structural units including at least the structural unit in which the information relating to a layout of a display screen is written, among the structural units extracted by the structure analysis function, a second structuring function of generating, in a case the link destination whose display control data has been acquired by the data prefetch function is selected by the user operation, second structured data for display control by mutually linking the structural units, and a display control function of displaying a display screen by using the first structured data generated by the first structuring function, and redisplaying, at a stage the second structured data is generated by the second structuring function, the display screen by using the second structured data.

According to the embodiments of the present invention described above, the display delay of a page caused by the sequential nature of script processing can be reduced, and a well laid-out page can be quickly displayed.

BRIEF DESCRIPTION OF THE DRAWINGS

FIG. 2 is an explanatory diagram showing an overview of a DOM and a flow of a page display process based on the DOM;

FIG. 17 is an explanatory diagram showing a relationship between the structure of a DOM and a display result;

FIG. 18 is an explanatory diagram showing a flow of an HTML file execution process based on a standard display control method;

FIG. 19 is an explanatory diagram showing a flow of an HTML file execution process based on a standard display control method;

FIG. 21 is an explanatory diagram showing a flow of an HTML file execution process based on a standard display control method;

FIG. 25 is an explanatory diagram showing a flow of an HTML file execution process based on a standard display control method;

FIG. 28 is an explanatory diagram showing a flow of an HTML file execution process based on a standard display control method;

FIG. 29 is an explanatory diagram showing a flow of an HTML file execution process based on a standard display control method;

FIG. 31 is an explanatory diagram showing a flow of an HTML file execution process based on a standard display control method;

FIG. 36 is an explanatory diagram showing a flow of an HTML file execution process based on the display control method according to the embodiment;

FIG. 37 is an explanatory diagram showing a flow of an HTML file execution process based on the display control method according to the embodiment;

FIG. 38 is an explanatory diagram showing a flow of an HTML file execution process based on the display control method according to the embodiment;

FIG. 39 is an explanatory diagram showing a flow of an HTML file execution process based on the display control method according to the embodiment;

FIG. 40 is an explanatory diagram showing a flow of an HTML file execution process based on the display control method according to the embodiment;

FIG. 41 is an explanatory diagram showing a flow of an HTML file execution process based on the display control method according to the embodiment;

FIG. 42 is an explanatory diagram showing a flow of an HTML file execution process based on the display control method according to the embodiment;

FIG. 43 is an explanatory diagram showing a flow of an HTML file execution process based on the display control method according to the embodiment;

FIG. 44 is an explanatory diagram showing a flow of an HTML file execution process based on the display control method according to the embodiment;

FIG. 46 is an explanatory diagram showing a flow of an HTML file execution process based on the display control method according to the embodiment;

FIG. 47 is an explanatory diagram showing a flow of an HTML file execution process based on the display control method according to the embodiment;

FIG. 48 is an explanatory diagram showing a flow of an HTML file execution process based on the display control method according to the embodiment;

FIG. 49 is an explanatory diagram showing a flow of an HTML file execution process based on the display control method according to the embodiment;

FIG. 50 is an explanatory diagram showing a flow of an HTML file execution process based on the display control method according to the embodiment;

FIG. 53 is an explanatory diagram showing a flow of an HTML file execution process based on the display control method according to the embodiment;

FIG. 54 is an explanatory diagram showing a flow of an HTML file execution process based on the display control method according to the embodiment;

FIG. 55 is an explanatory diagram showing a flow of an HTML file execution process based on the display control method according to the embodiment;

FIG. 56 is an explanatory diagram showing a flow of an HTML file execution process based on the display control method according to the embodiment;

FIG. 57 is an explanatory diagram showing a flow of an HTML file execution process based on the display control method according to the embodiment;

FIG. 58 is an explanatory diagram showing a flow of an HTML file execution process based on the display control method according to the embodiment;

FIG. 59 is an explanatory diagram showing a flow of an HTML file execution process based on the display control method according to the embodiment;

FIG. 60 is an explanatory diagram showing a flow of an HTML file execution process based on the display control method according to the embodiment;

FIG. 62 is an explanatory diagram showing a flow of an HTML file execution process based on the display control method according to the embodiment;

FIG. 63 is an explanatory diagram showing a flow of an HTML file execution process based on the display control method according to the embodiment;

FIG. 64 is an explanatory diagram showing a flow of an HTML file execution process based on the display control method according to the embodiment;

FIG. 66 is an explanatory diagram showing a flow of an HTML file execution process based on the display control method according to the embodiment;

FIG. 67 is an explanatory diagram showing a flow of an HTML file execution process based on the display control method according to the embodiment;

FIG. 72 is an explanatory diagram showing a method of selecting a prefetch target;

FIG. 77 is an explanatory diagram showing a pre-connection method according to the embodiment;

FIG. 78 is an explanatory diagram showing a pre-connection method according to the embodiment;

FIG. 79 is an explanatory diagram showing a difference in connection establishment times depending on the difference in TLD;

FIG. 80 is an explanatory diagram showing a difference in connection establishment times depending on the difference in target country;

FIG. 86 is an explanatory diagram showing an example of the hardware configuration of an information processing apparatus capable of realizing the function of the information processing apparatus according to each embodiment of the present invention.

DETAILED DESCRIPTION OF THE EMBODIMENT(S)

Figure 1:
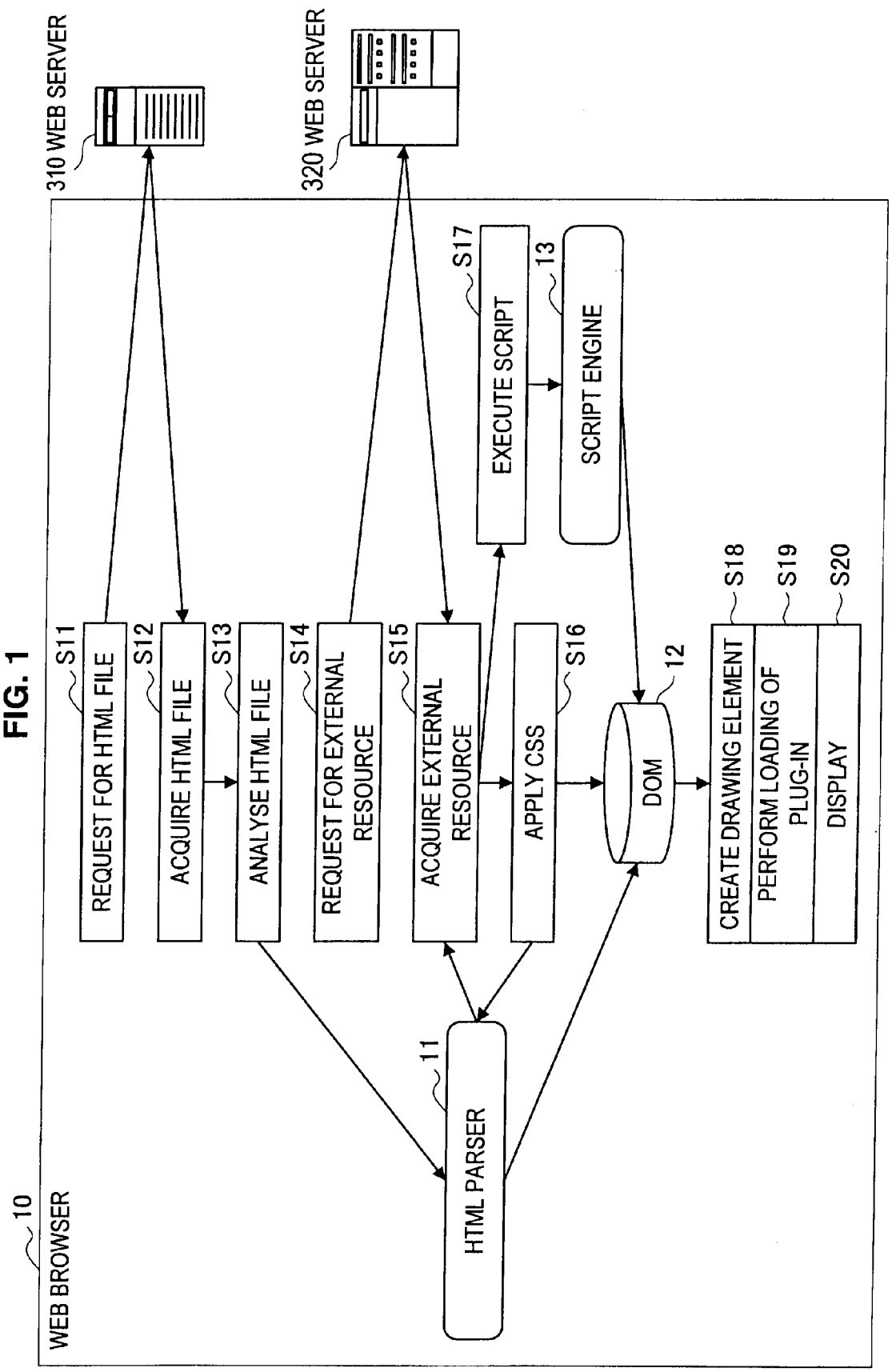
FIG. 1 is an explanatory diagram showing a flow of a page display process by a Web browser.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of describing embodiments of the present invention described below will be briefly mentioned here. First, before describing in detail the technical configuration according to the present embodiment, a standard configuration relating to a page display process by a Web browser will be described with reference to FIGS. 1 to 6. Then, a Web page display processing sequence according to the first embodiment of the present invention will be described with reference to FIGS. 7 to 9. Then, a functional configuration and an operation of an information processing apparatus 100 according to the embodiment will be described with reference to FIGS. 10 and 11.

Figure 12:
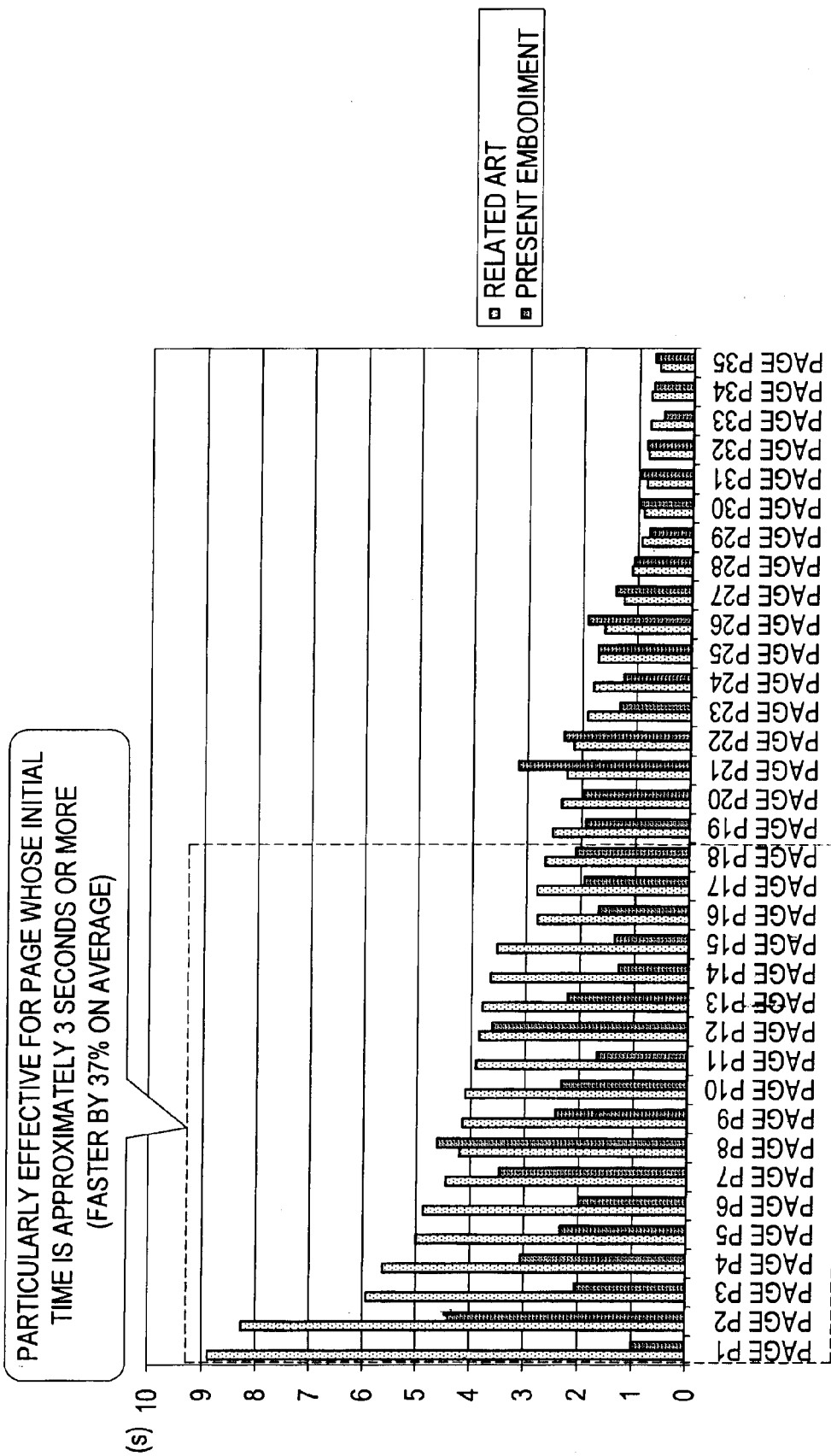
FIG. 12 is an explanatory diagram showing a measurement result of a page display time in a case of adopting a display control method according to the embodiment.
Figure 13:
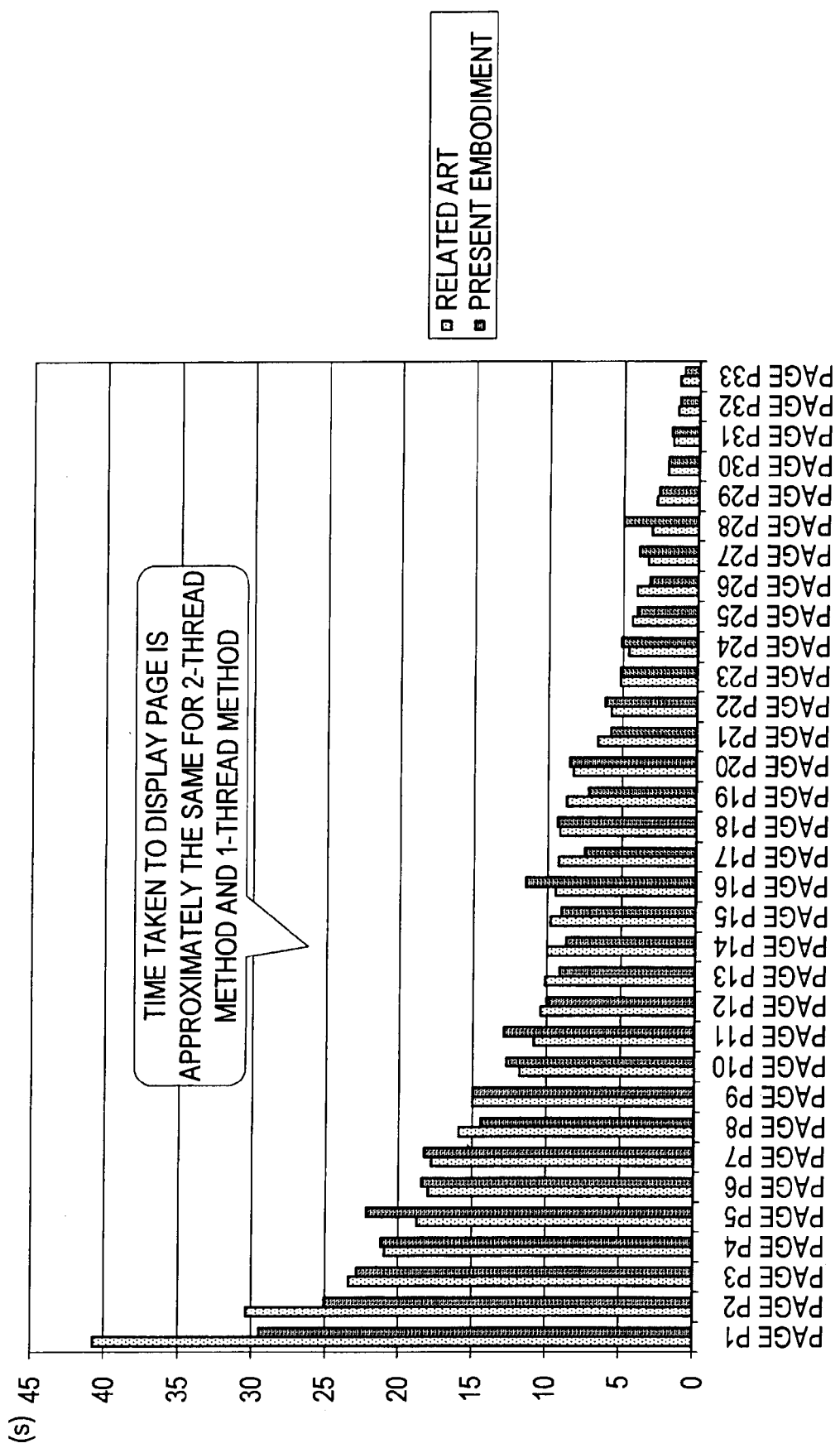
FIG. 13 is an explanatory diagram showing a measurement result of a page display time in a case of adopting the display control method according to the embodiment.
Figure 14:
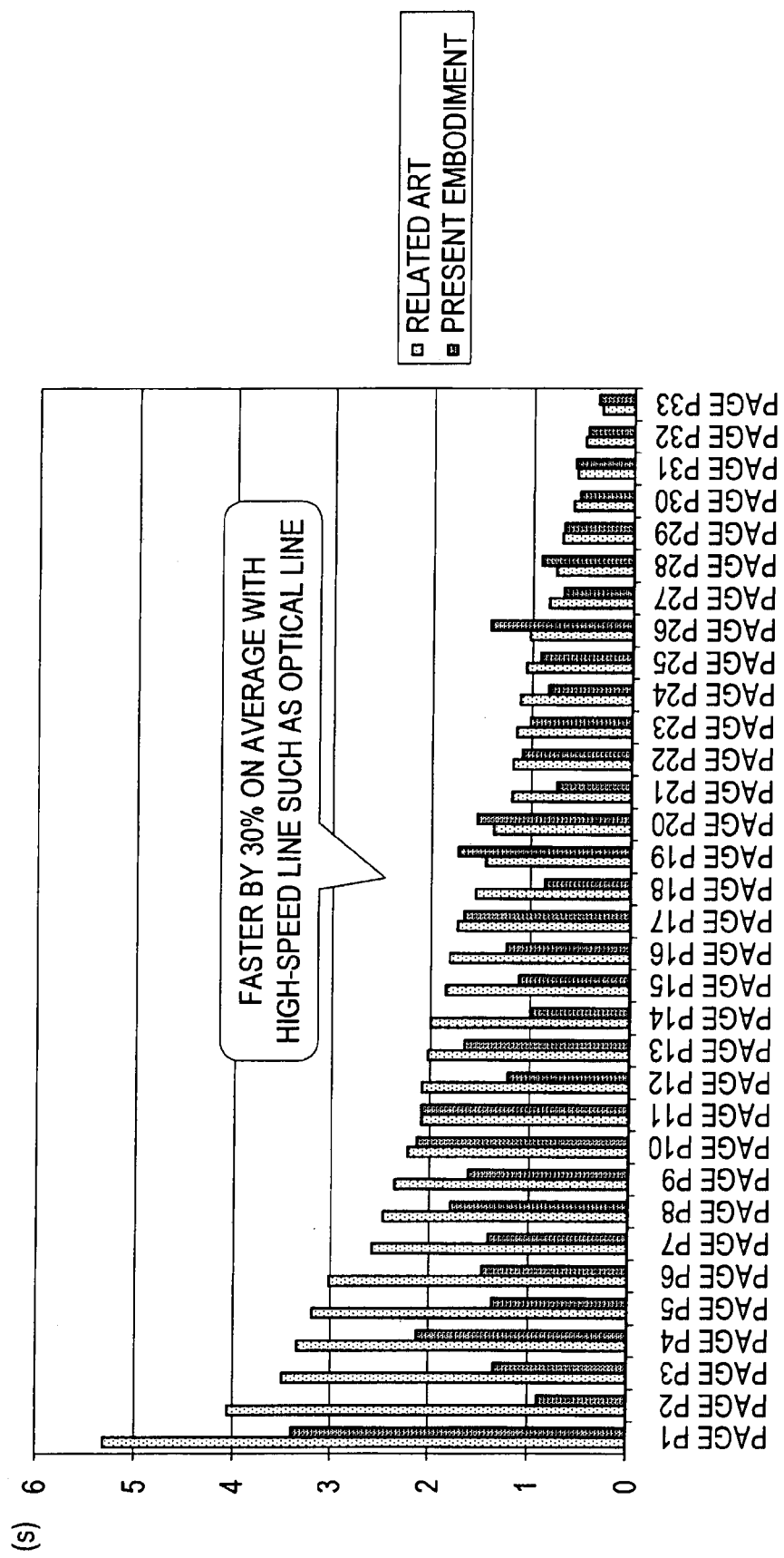
FIG. 14 is an explanatory diagram showing a measurement result of a page display time in a case of adopting the display control method according to the embodiment.

Next, an effect of reducing page display time obtained in the case of adopting a display control method according to the embodiment will be described with reference to FIGS. 12 to 14. Then, the relationship between the difference in DOM structure and the difference in display result will be described with reference to FIGS. 15 to 17. Then, to compare against the technology of the embodiment, a standard HTML file execution process will be briefly described with reference to FIGS. 18 to 35. Then, an HTML file execution process according to the embodiment will be described with reference to FIGS. 36 to 68.

Figure 69:
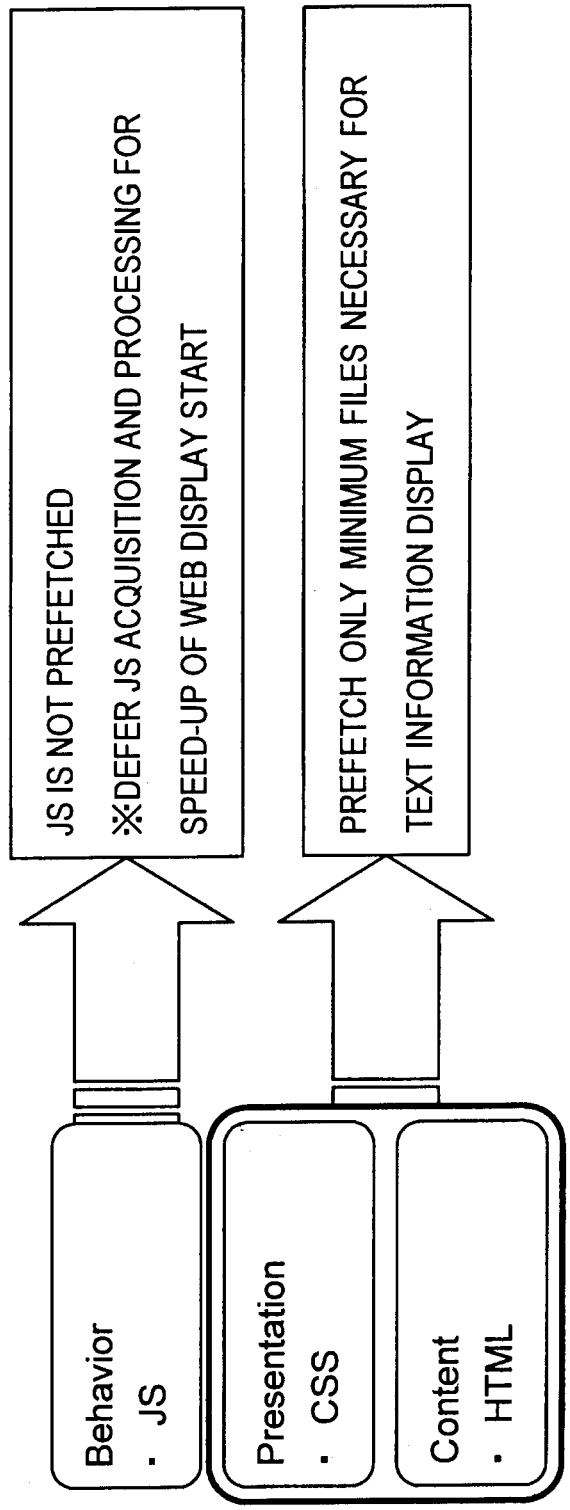
FIG. 69 is an explanatory diagram showing a prefetching method according to the second embodiment of the present invention.

Next, a prefetching method according to the second embodiment of the present invention will be described with reference to FIG. 69. Then, a difference in effects according to types of prefetch targets will be indicated with reference to FIGS. 70 and 71 while describing a highly effective method of selecting a prefetch target with reference to FIG. 72. Then, a functional configuration and an operation of an information processing apparatus 100 according to the embodiment will be described with reference to FIGS. 73 and 74. Then, a flow of a prefetch process according to the embodiment will be described with reference to FIG. 75. Then, a difference in effects according to types of prefetching will be described with reference to FIG. 76.

Next, a pre-connection method according to the embodiment will be described with reference to FIGS. 77 and 78. Then, with reference to FIGS. 79 and 80, effects of the pre-connection will be compared in relation to TLD and target country.

Next, a method of integrating proximity detection and a prefetch process according to the third embodiment of the present invention will be described with reference to FIG. 81. Then, a functional configuration and an operation of an information processing apparatus 100 according to the embodiment will be described with reference to FIGS. 82 and 83. Then, a flow of the prefetch process according to the embodiment will be described with reference to FIG. 84. Then, a structure and an operation of an in-cell touch panel that can be used for the proximity detection according to the embodiment will be described with reference to FIG. 85.

Next, an example of the hardware configuration capable of realizing the functions of the information processing apparatuses 100 according to the first to third embodiments will be described with reference to FIG. 86. Lastly, the technical ideas of the embodiments will be summarized and operational effects obtained by the technical ideas will be briefly described.

(Description Items)
1: Introduction
   1-1: Operation of Web Browser
   1-2: Display Time Analysis Result
2: First Embodiment
   2-1: Operation of Web Browser
   2-2: Functional Configuration of Information Processing Apparatus 100
   2-3: Operation of Information Processing Apparatus 100
   2-4: Effect on Display Time
   2-5: Comparison Between Display Results according to Difference in DOM Structures
   2-6: Concrete Example of DOM Building Steps
3: Second Embodiment
   3-1: Effect of Prefetching (Consideration)
   3-2: Functional Configuration of Information Processing Apparatus 100
   3-3: Operation of Information Processing Apparatus 100
   3-4: Flow of Prefetch Process
   3-5: Effect of Prefetching
   3-6: Effect of Pre-Connection (Consideration)
4: Third Embodiment
   4-1: Integration of Proximity Detection and Prefetch Process
   4-2: Functional Configuration of Information Processing Apparatus 100
   4-3: Operation of Information Processing Apparatus 100
   4-4: Flow of Prefetch Process based on Proximity Detection
   4-5: Structure of Touch Panel Capable of Proximity Detection (In-Cell Touch Panel)
5: Hardware Configuration Example of Information Processing Apparatus 100
6: Summary

1: INTRODUCTION

First, before describing the embodiments of the present invention, a Web page display process by a Web browser will be described. An explanation will be given here on a standard flow of processes performed by a Web browser, from the acquisition of an HTML file to the display of a Web page (hereinafter, display processing sequence).

<1-1: Operation of Web Browser>

A display processing sequence by a standard Web browser 10 is shown in FIG. 1. As shown in FIG. 1, the Web browser 10 first requests a Web server 310 for an HTML file (step S11). Then, the Web browser 10 acquires the HTML file transmitted by the Web server 310 in response to the request (step S12). Then, the Web browser 10 analyses the acquired HTML file (step S13).

At this time, the Web browser 10 analyses the structure of the HTML by using a parser program called HTML parser 11. As has been described, the HTML file is written by using specific tags that define the structural units. Accordingly, by using the parser program, a structural unit delimited by the tags can be extracted, or the relationship between the structural units can be analysed. The HTML parser 11 analyses the HTML file, and requests a Web server 320 for an external resource where appropriate (step S14).

The external resource here is, for example, a style sheet file that defines layout information and a script file that defines script information. Now, when an external resource is transmitted from the Web server 320 in response to the request, the Web browser 10 acquires the external resource transmitted by the Web server 320 (step S15). The external resource acquired in step S15 is used for the process of step S16 or S17 depending on its type. Also, information on the structural unit extracted from the HTML file by the HTML parser 11 is used at the time of building a DOM 12.

When the external resource acquired in step S15 is a CSS file, the Web browser 10 applies the CSS (step S16). Also, when the external resource acquired in step S15 is a script file, the Web browser 10 performs script processing by a script engine 13 (step S17). After performing the process of step S16 or S17, the Web browser 10 builds the DOM 12. Then, the Web browser 10 creates various drawing elements based on the DOM 12 that has been built (step S18). Then, the Web browser 10 loads a plug-in as appropriate (step S19), and displays a Web page (step S20).

As described, various processes are performed until a Web page is displayed. Many of these processes are performed before the building of the DOM 12.

(DOM 12)

Here, the process of building the DOM 12, and the process of displaying a Web page based on the DOM 12 that has been built will be described in greater detail with reference to FIG. 2.

As shown in FIG. 2, the DOM 12 is a tree structure built by linking the structural units of the HTML file extracted by the HTML parser 11. More properly, the DOM 12 is an API (Application Program Interface) for handling the structure or the contents of an HTML (or an XML). For example, let us assume that multiple structural units (A1 to A7) for defining the display configuration of a Web page are included in the HTML file. These structural units are extracted in an analysis process by the HTML parser 11, and are mutually linked and built into the form of the DOM 12.

Note that the tree structure of the DOM 12 illustrated in FIG. 2 is a conceptual expression of a structure recognized by the Web browser. A Web page that is actually viewed by a user is created by a rendering engine of the Web browser 10 based on the tree structure of the DOM 12. The process of displaying a Web page is complete when the Web browser 10 has adjusted, after building the DOM 12, a display layout based on the tree structure of the DOM 12 and has embedded content such as image data and text data in a specific location in the display layout. As described, the building of the DOM 12 serves as a premise for displaying a Web page.

<1-2: Display Time Analysis Result>

Figure 3:
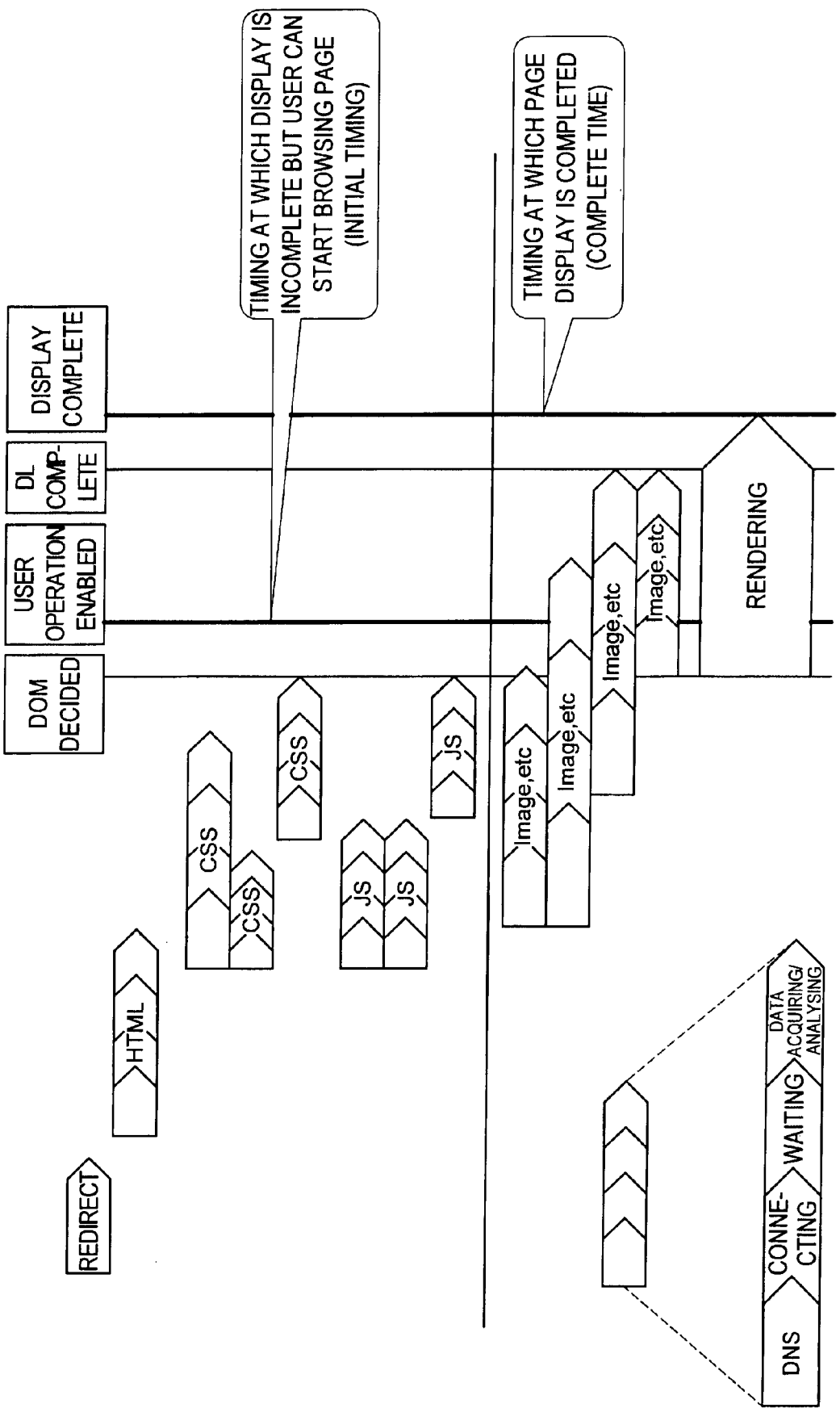
FIG. 3 is an explanatory diagram showing a file download sequence of a Web browser.
Figure 4:
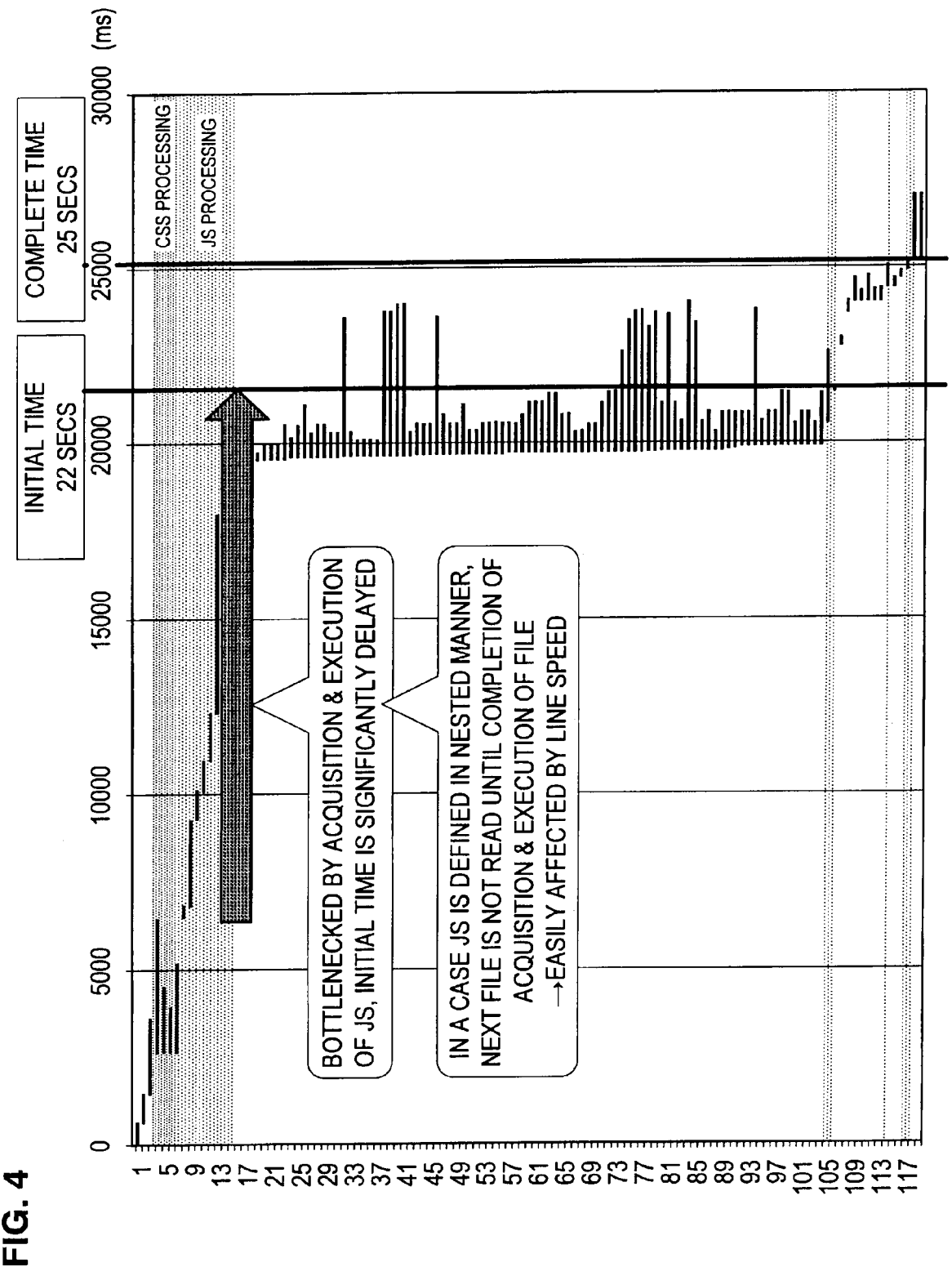
FIG. 4 is an explanatory diagram showing an analysis result of a page display time of a standard Web browser.
Figure 5:
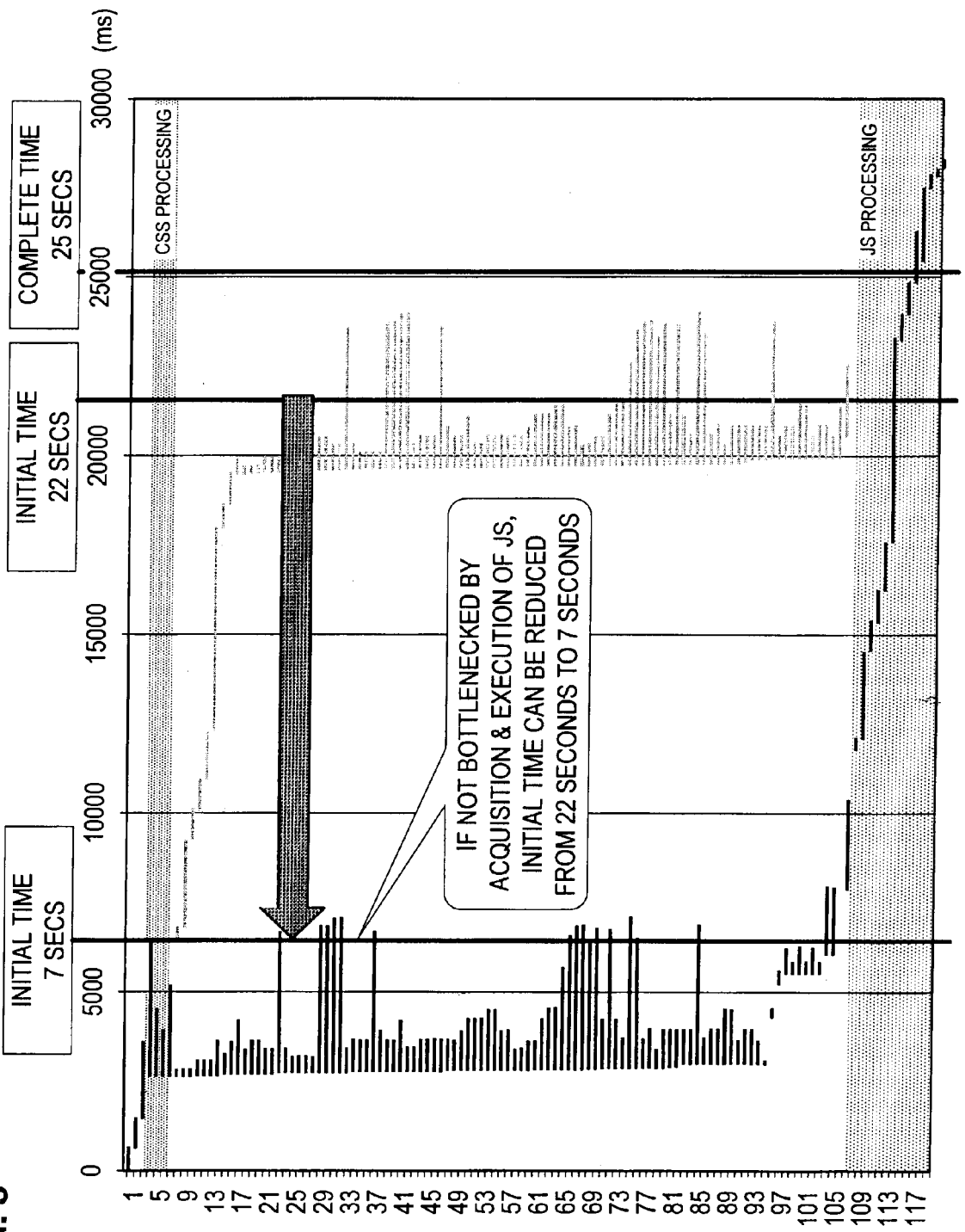
FIG. 5 is an explanatory diagram showing an analysis result of a page display time of a Web browser where script processing is not executed.

Here, the relationship between the timing of building the DOM 12 and the time it takes to display a Web page will be considered with reference to FIGS. 3 to 5.

(Download Sequence)

As described above, the building of the DOM 12 is performed after at least the completion of the analysis of the HTML file by the HTML parser 11, the application of CSS and the execution of script processing. More particularly, a processing sequence as shown in FIG. 3 is performed. The processing sequence shown in FIG. 3 is illustrated with a premise that time runs from left to right. That is, processes are performed in order from the process shown on the left side.

As shown in FIG. 3, when a redirect to a Web page or the like occurs, an HTML file is downloaded by the Web browser 10. Additionally, at the time of downloading the file, time taken for name resolution through DNS, time taken for establishing a connection to a Web server, a wait time, and the like become necessary. The download time of each file shown in FIG. 3 includes these times. When the download of the HTML file is complete, the Web browser 10 analyses the downloaded HTML file.

Then, the Web browser 10 downloads a CSS file or a JS file as appropriate, based on the analysis result of the HTML file. Additionally, the download of the CSS file or the JS file may be performed during the analysis of the HTML file. Also, multiple CSS files or multiple JS files may be downloaded. Furthermore, image data and the like (Image etc.) is downloaded in accordance with the analysis result of the HTML file. When all the CSS files and the JS files are downloaded, the structural elements for building the DOM 12 are determined.

When all the structural elements for building the DOM 12 are ready, rendering of the DOM 12 is started by the rendering engine of the Web browser 10. At this time, it is not necessary that all the pieces of the image data and the like are downloaded. Also, when the rendering has progressed to a certain degree, operation by a user is enabled. Next, when all the pieces of image data and the like are downloaded and the rendering of the DOM 12 is complete, display of a Web page is complete. Display of a complete Web page is completed at this time point. As described, in the display processing sequence of a standard Web browser 10, the DOM 12 is not established until the HTML file, the CSS file and the JS file are all downloaded.

(Time Taken for Displaying Web Page)

Now, the download sequence illustrated in FIG. 3 only shows the order of the processes. Thus, the length of time that each process actually takes is not known from the example shown in FIG. 3. Accordingly, a result of measuring the length of time taken for each process by actually using the Web browser 10 is shown in FIG. 4.

Moreover, the example of FIG. 4 shows the time that has been actually measured, but the actual value of the time is variable depending on the measurement environment. Accordingly, attention should be focused on the relative length of the time taken for each process. Furthermore, a vertical line indicating an initial time and a vertical line indicating a complete time are shown in FIG. 4. The initial time here means the time until the operation by a user can be started. On the other hand, the complete time here means the time until all the files and all the pieces of data are downloaded and a Web page is displayed in a complete form.

First, attention will be paid on the processing of the CSS file. The processing of the CSS file is started when a time of about 2500 ms has elapsed since the occurrence of a redirect (0 ms), and is performed continuously for about 2500 ms. Furthermore, in the example of FIG. 4, processing is started at the same time for three CSS files.

Next, attention will be paid on the processing of the JS file. The processing of the JS file is simultaneously started when the processing of the CSS file is started. However, processing of only one JS file is started at this time point. The processing of the second JS file is started after the completion of the processing of the first JS file. Also at this time point, processing is started only for one JS file. Likewise, processing is performed for one JS file at a time until processing of all the JS files is complete. As a result, a time of about 12000 ms is taken for the processing of all the JS files.

Subsequently, download of image data and the like, rendering of a DOM, and the like are performed, and Web page display processing is performed. These processes are performed simultaneously in parallel, and the processing time taken for displaying a Web page is not greatly affected.

What can be said from the measurement result illustrated in FIG. 4 is that the proportion of the time taken for processing the JS file to the time taken until a Web page is displayed is significantly high. The main reason that the processing of the JS file takes time is that the download and execution of multiple JS files are not able to be performed in parallel. This situation occurs because, in a case the JS files are defined in a nested manner, the download and execution of a following JS file are not possible until the download and execution of the preceding JS file are complete. Although the JS file is taken as an example here, the same can be said also for a script file written in another script language.

Accordingly, the inventors of the present invention have devised a method of performing the download and execution of the JS file after the other processes. To estimate the effect obtained in the case of applying this method, a simulation as illustrated in FIG. 5 is performed. As can be seen from the result, when the download and execution of the JS file are performed later, the initial time is reduced to 7 seconds. Incidentally, since the initial time is 22 seconds in the example of FIG. 4, the initial time is reduced by 15 seconds by performing the download and execution of the JS file at a later sequence. However, the example of FIG. 5 is only a simulation, and in reality, various modifications have to be made to put the download and execution of the JS file at a later sequence.

2: FIRST EMBODIMENT

As described above, time taken for displaying a Web page can be drastically reduced by performing the download and execution of a script file at a later sequence. In the following, a mechanism for putting the processing on a script file at a later sequence will be described. The first embodiment of the present invention relates to an apparatus and a method for realizing such mechanism.

<2-1: Operation of Web Browser>

First, the processing sequence of a Web browser according to the present embodiment will be described with reference to FIGS. 6 to 9. Note that the processing sequence shown in FIG. 6 is the processing sequence of a standard Web browser shown for comparison with the processing sequence according to the present embodiment.

(Standard Processing Sequence)

Figure 6:
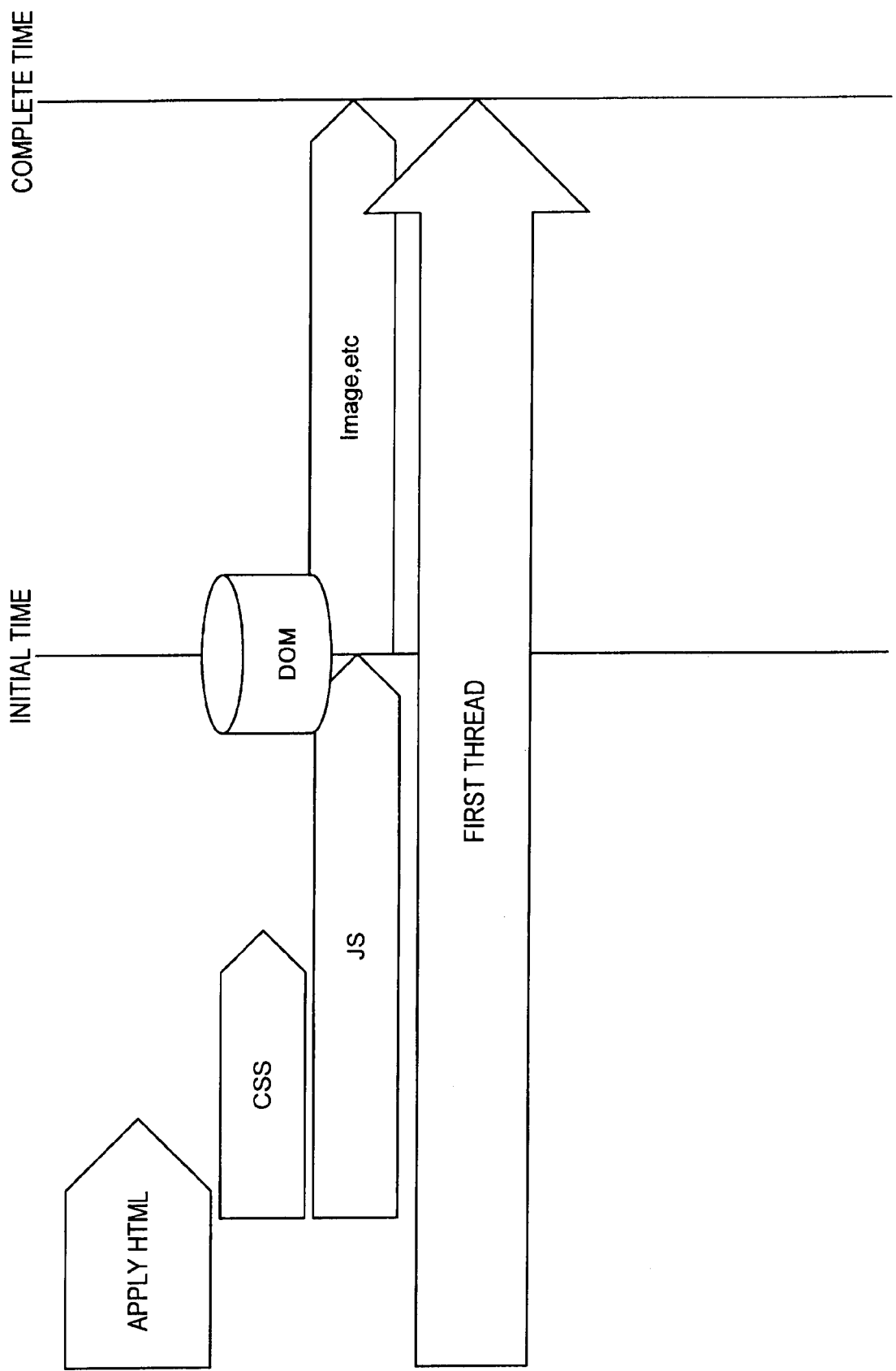
FIG. 6 is an explanatory diagram showing a page display processing sequence of a standard Web browser.

As shown in FIG. 6, the processing sequence of a standard Web browser is performed in the order of processing of an HTML file, {processing of a CSS file, processing of a JS file}, building of a DOM, and download of image data and the like, as described above. That is, this series of processes is executed by one thread (first thread).

(Processing Sequence of Present Embodiment)

Figure 7:
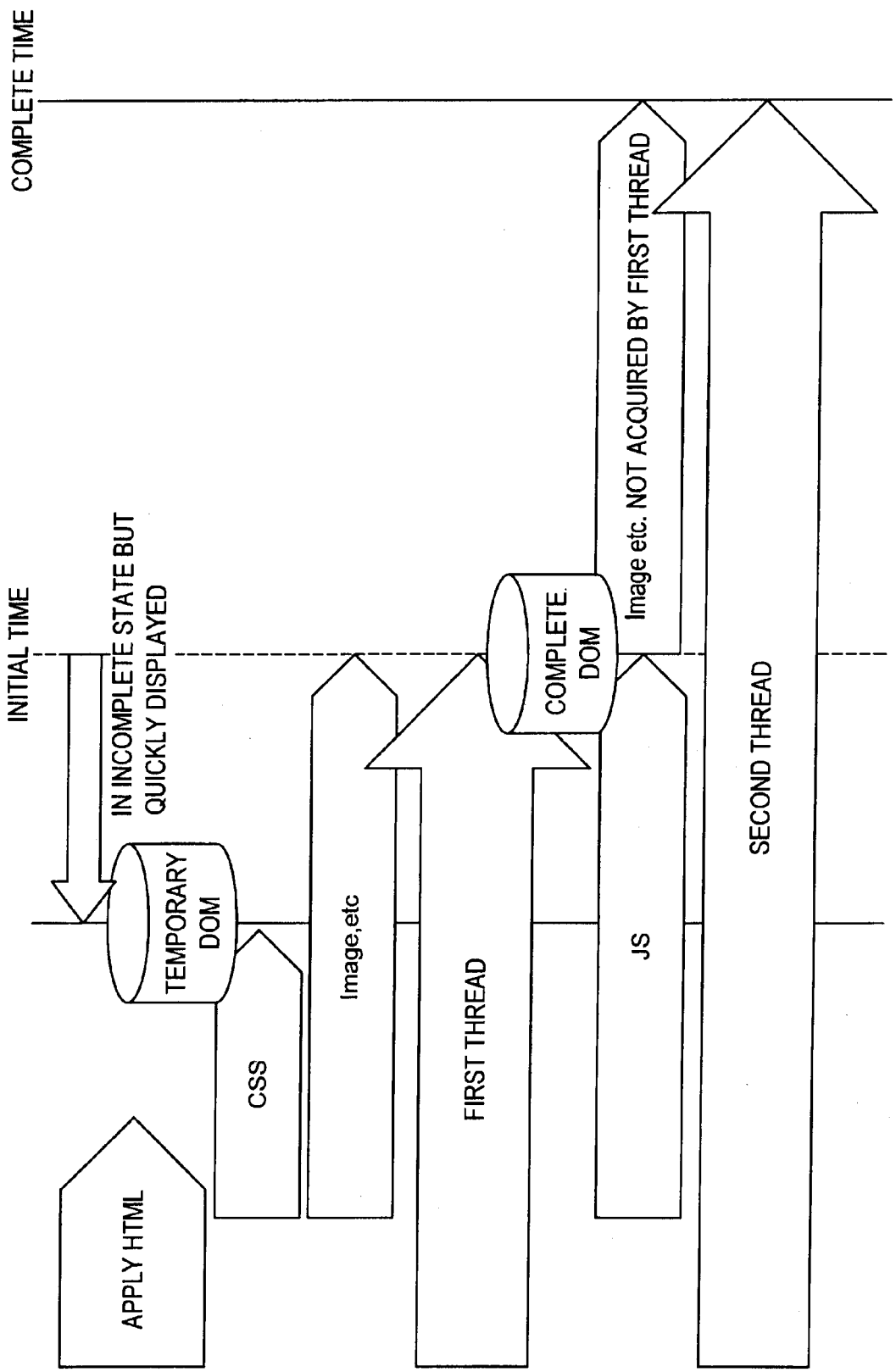
FIG. 7 is an explanatory diagram showing a page display processing sequence of a Web browser according to the first embodiment of the present invention.

On the other hand, the processing sequence according to the present embodiment is performed by two threads (first and second threads) as shown in FIG. 7. In the first thread, processing of an HTML file, processing of a CSS file and download of image data and the like are performed, and a simple DOM (hereinafter, temporary DOM) is built at the stage of completion of the processing of the CSS file. Then, a Web page is displayed based on the temporary DOM.

On the other hand, in the second thread, processing of a JS file is performed, and the final DOM (hereinafter, complete DOM) is built at the stage of completion of the processing of the JS file. Furthermore, image data and the like not acquired by the first thread is downloaded, and a Web page is displayed based on the complete DOM. At this time, the Web page displayed based on the temporary DOM is updated to the Web page displayed based on the complete DOM (see FIG. 8).

As has been described with reference to a simulation result, the timing of building a DOM was delayed due to the processing of the JS file being included, and the time taken until the display of a Web page was long as a result. However, the building of a temporary DOM to be built by the first thread is performed independently of the processing of the JS file. Thus, the building of the temporary DOM is performed at a very early timing compared to the building timing of the DOM by a standard Web browser.

However, the structural unit related to the processing of the JS file is not included in the temporary DOM. Therefore, the Web page displayed based on the temporary DOM is different from the Web page displayed based on the complete DOM including the structural unit related to the processing of the JS file. However, the processing sequence according to the present embodiment includes an operation by the second thread for building the complete DOM that includes the structural unit related to the processing of the JS file. Also, since the display is switched to that of the Web page based on the complete DOM at the timing of the completion of the processing by the second thread, discomfort felt by a user due to the difference in the Web pages can be resolved. As described, by applying the processing sequence according to the present embodiment, a challenging task of combining the quick display of a Web page and the display of the right Web page can achieved.

Figure 8:
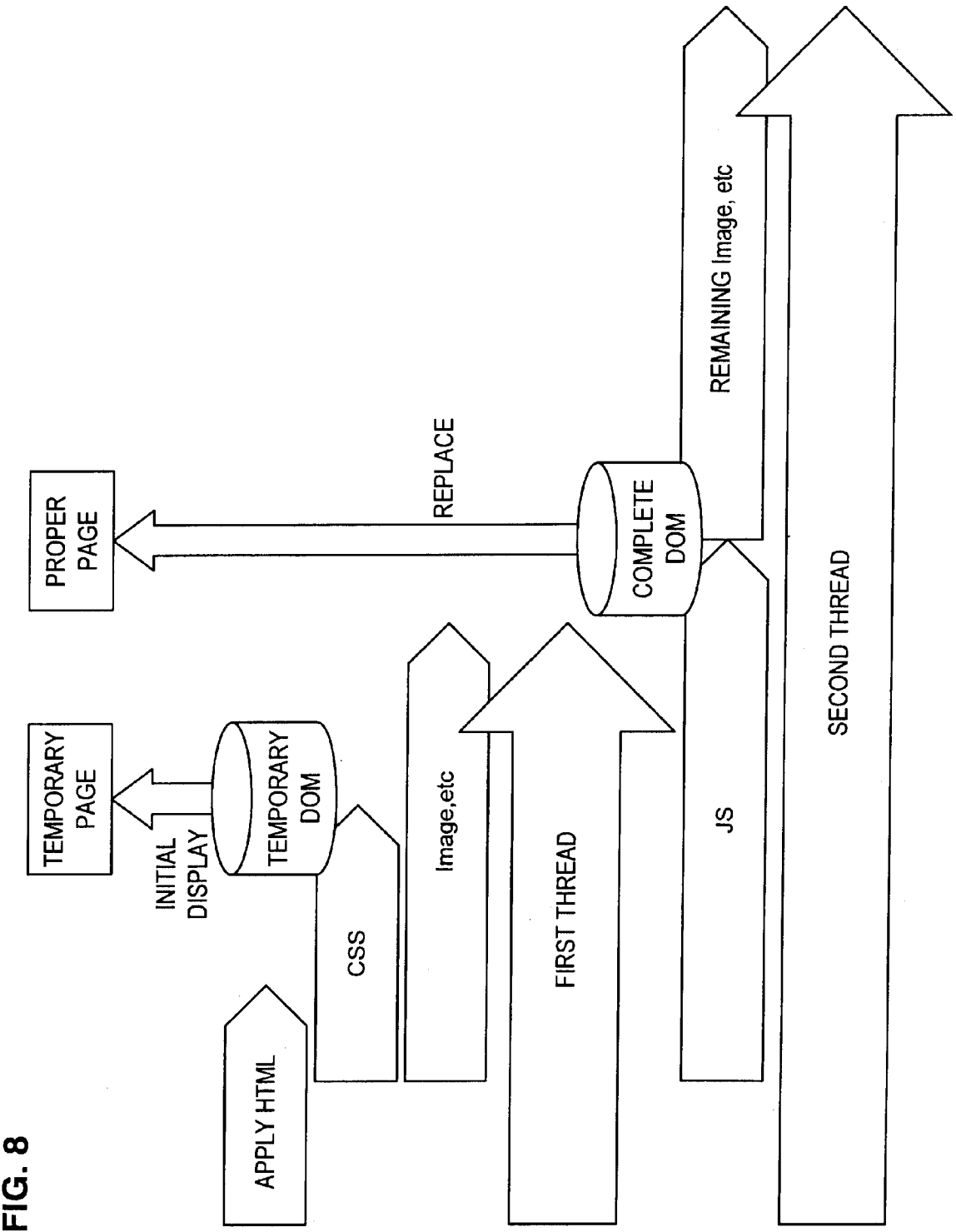
FIG. 8 is an explanatory diagram showing a page display processing sequence of the Web browser according to the embodiment.
Figure 9:
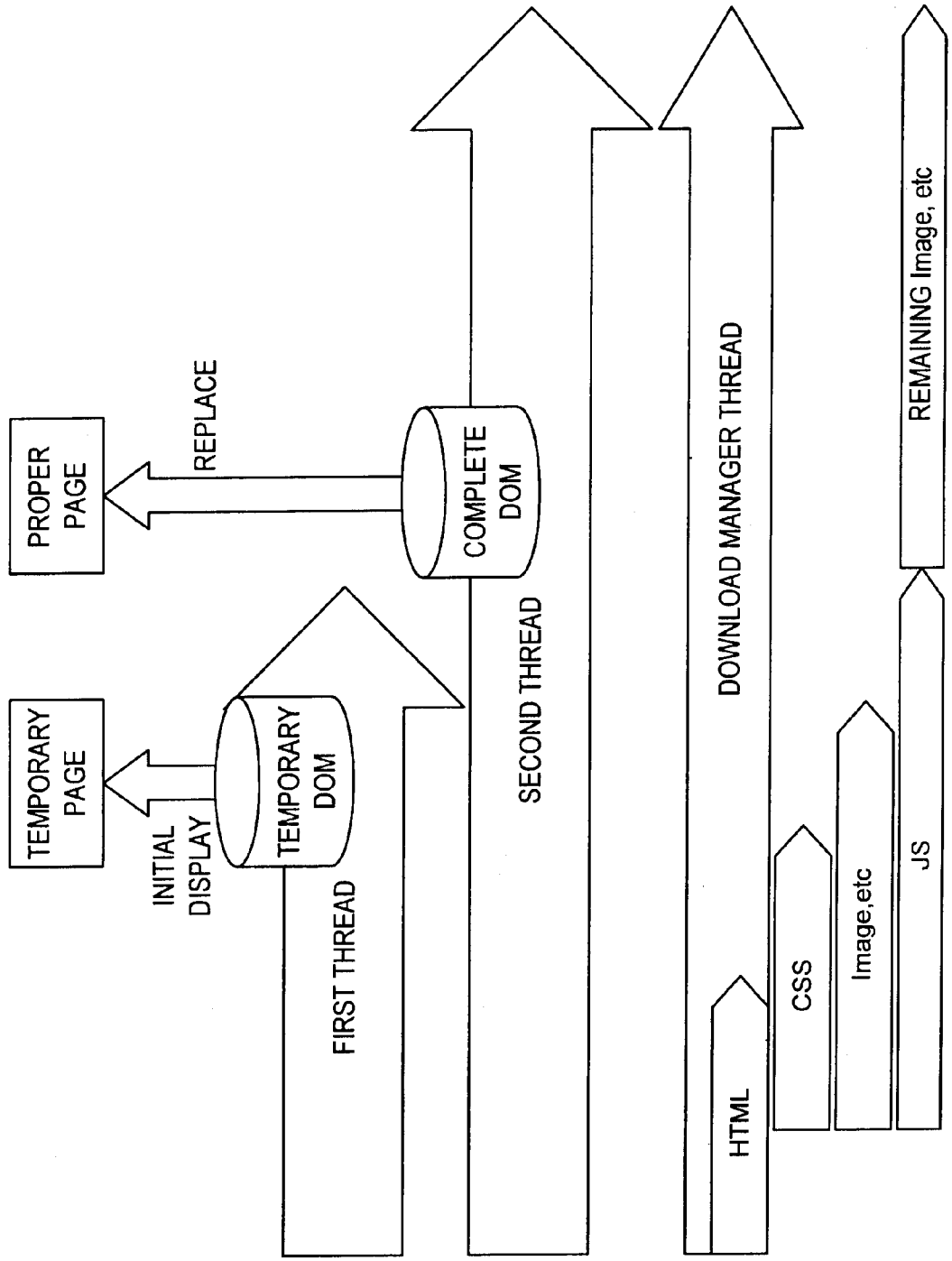
FIG. 9 is an explanatory diagram showing a page display processing sequence of the Web browser according to the embodiment.

Moreover, in reality, some files of the structural units which will be nodes of the DOM are overlapped for the temporary DOM built by the first thread and the complete DOM built by the second thread. Accordingly, in relation to the download of each file, it is efficient to execute a download manager thread, and to use, by the first and second threads, the files that the download manager thread acquired, as shown in FIG. 9. For example, the download manager thread is exclusively in charge of the download of the HTML file, the CSS file, the JS file, the image data, and the like. Additionally, the download timing is as shown in FIGS. 7 and 8.

Heretofore, the processing sequence according to the present embodiment has been described.

<2-2: Functional Configuration of Information Processing Apparatus 100>

Figure 10:
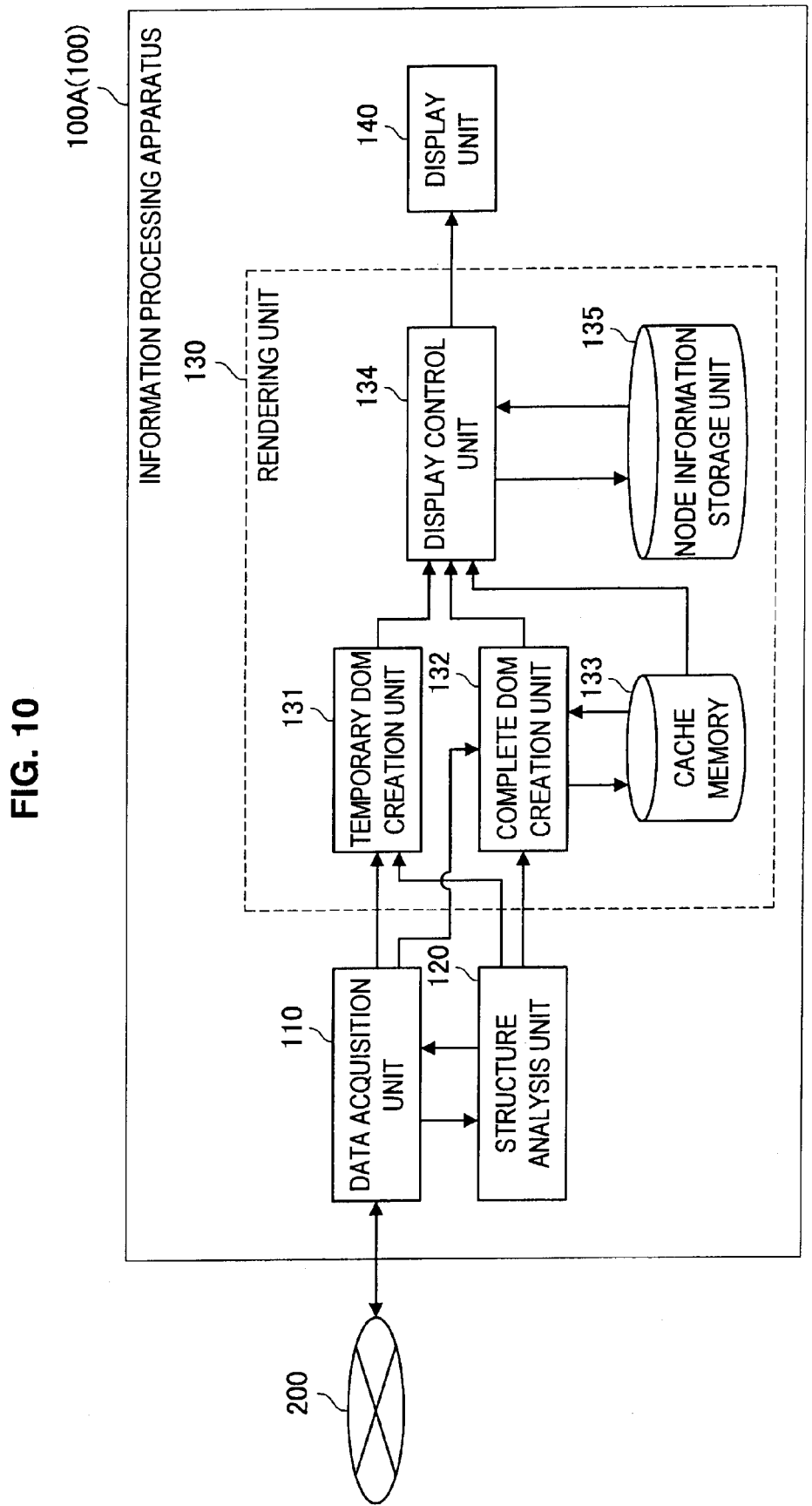
FIG. 10 is an explanatory diagram showing an example of the functional configuration of an information processing apparatus according to the embodiment.

Next, the functional configuration of the information processing apparatus 100 that is capable of realizing the above idea will be described with reference to FIG. 10. FIG. 10 is an explanatory diagram showing an example of the functional configuration of the information processing apparatus 100 according to the present embodiment. Additionally, to distinguish from information processing apparatuses 100 according to the second and third embodiments, the information processing apparatus 100 according to the present embodiment may be sometimes referred to as an information processing apparatus 100A.

As shown in FIG. 10, the information processing apparatus 100 is mainly configured from a data acquisition unit 110, a structure analysis unit 120, a rendering unit 130, and a display unit 140. Furthermore, the rendering unit 130 includes a temporary DOM creation unit 131, a complete DOM creation unit 132, a cache memory 133, a display control unit 134, and a node information storage unit 135.

When a redirect occurs, first, an HTML file is downloaded by the data acquisition unit 110. Then, the HTML file downloaded by the data acquisition unit 110 is input to the structure analysis unit 120. When the HTML file is input, the structure analysis unit 120 analyses the structure of the HTML file, and extracts the structural unit of the HTML file. Then, the structure analysis unit 120 transmits, as appropriate, requests for a CSS file and a JS file to the Web servers 310 and 320 via the data acquisition unit 110.

When a CSS file and a JS file are transmitted from the Web servers 310 and 320 in response to the requests, the data acquisition unit 110 receives the CSS file and the JS file that have been transmitted. The CSS file and the JS file received by the data acquisition unit 110 are input to the structure analysis unit 120. When the CSS file is input, the structure analysis unit 120 performs a process of applying the CSS file. Also, when the JS file is input, the structure analysis unit 120 executes the input JS file. At this time, JS files are sequentially acquired as appropriate, and are executed by the structure analysis unit 120.

The result of CSS file application by the structure analysis unit 120 is input to both the temporary DOM creation unit 131 and the complete DOM creation unit 132, and the result of JS file execution is input to the complete DOM creation unit 132. Also, the structure analysis unit 120 inputs information on the structural unit extracted from the HTML file to the temporary DOM creation unit 131 and the complete DOM creation unit 132. However, information on the structural unit relating to the processing of the JS file is not input to the temporary DOM creation unit 131. Furthermore, based on the analysis result of the HTML file, the structure analysis unit 120 requests the data acquisition unit 110 for the acquisition of image data and the like as appropriate. The image data and the like acquired by the data acquisition unit 110 in response to such request is input to the display control unit 134 via the temporary DOM creation unit 131 and the complete DOM creation unit 132.

As described above, the structural units of the HTML file, excluding the structural unit relating to the processing of the JS file, are input to the temporary DOM creation unit 131. Thus, the temporary DOM creation unit 131 forms a tree structure by mutually linking the input structural units, and builds a temporary DOM. Information on the temporary DOM built by the temporary DOM creation unit 131 is input to the display control unit 134. On the other hand, all the structural units of the HTML file, including the structural unit relating to the processing of the JS file, are input to the complete DOM creation unit 132. However, since the acquisition of the JS file takes a long time due to the sequential nature of the processing of the JS file, the input of information on all the structural units and data takes a relatively long time. As a result, building of the complete DOM is completed some time after the building of the temporary DOM.

When the information relating to all the structural units of the HTML file, including the information relating to the processing of the JS file, is input, the complete DOM creation unit 132 forms a tree structure by mutually linking the input structural units, and builds a complete DOM. Then, information on the complete DOM built by the complete DOM creation unit 132 is input to the display control unit 134. Furthermore, the complete DOM creation unit 132 acquires all the image data and the like necessary for displaying a Web page based on the complete DOM, and stores the same in the cache memory 133. By storing all the data necessary for displaying a Web page in the cache memory 133, a Web page displayed based on the temporary DOM can be quickly replaced with a Web page based on the complete DOM.

As described above, information on the temporary DOM and image data and the like are input from the temporary DOM creation unit 131 to the display control unit 134. When the information on the temporary DOM and the image data and the like are input, the display control unit 134 performs rendering based on the temporary DOM, and creates a Web page based on the temporary DOM. Then, the display control unit 134 makes the display unit 140 display the Web page based on the temporary DOM. Furthermore, when the information on the complete DOM and the image data and the like are input from the complete DOM creation unit 132, the display control unit 134 performs rendering based on the complete DOM, and creates a Web page based on the complete DOM. Then, the display control unit 134 replaces the Web page based on the temporary DOM with the Web page based on the complete DOM.

At this time, the display control unit 134 reads the image data and the like necessary for displaying a Web page stored in the cache memory 133, and makes the display unit 140 display the Web page based on the complete DOM. Note that when image data and the like necessary for displaying a Web page is not stored in the cache memory 133, the display control unit 134 acquires the image data and the like that are necessary via the data acquisition unit 110, and have the Web page displayed by using the acquired image data and the like.

Furthermore, in a case scrolling or the like is performed during the display of the Web page based on the temporary DOM, the display control unit 134 stores, in the node information storage unit 135, information on the structural unit displayed at a reference position on the display unit 140 (hereinafter, node information). Then, at the time of displaying the Web page based on the complete DOM, the display control unit 134 reads the node information stored in the node information storage unit 135, and adjusts the scroll position of the Web page based on the complete DOM such that the structural unit of the complete DOM corresponding to the node information is displayed at the reference position on the display unit 140. With this configuration, the discomfort felt by a user at the time the Web page based on the temporary DOM is switched to the Web page based on the complete DOM can be reduced.

Heretofore, the functional configuration of the information processing apparatus 100 according to the present embodiment has been described.

<2-3: Operation of Information Processing Apparatus 100>

Figure 11:
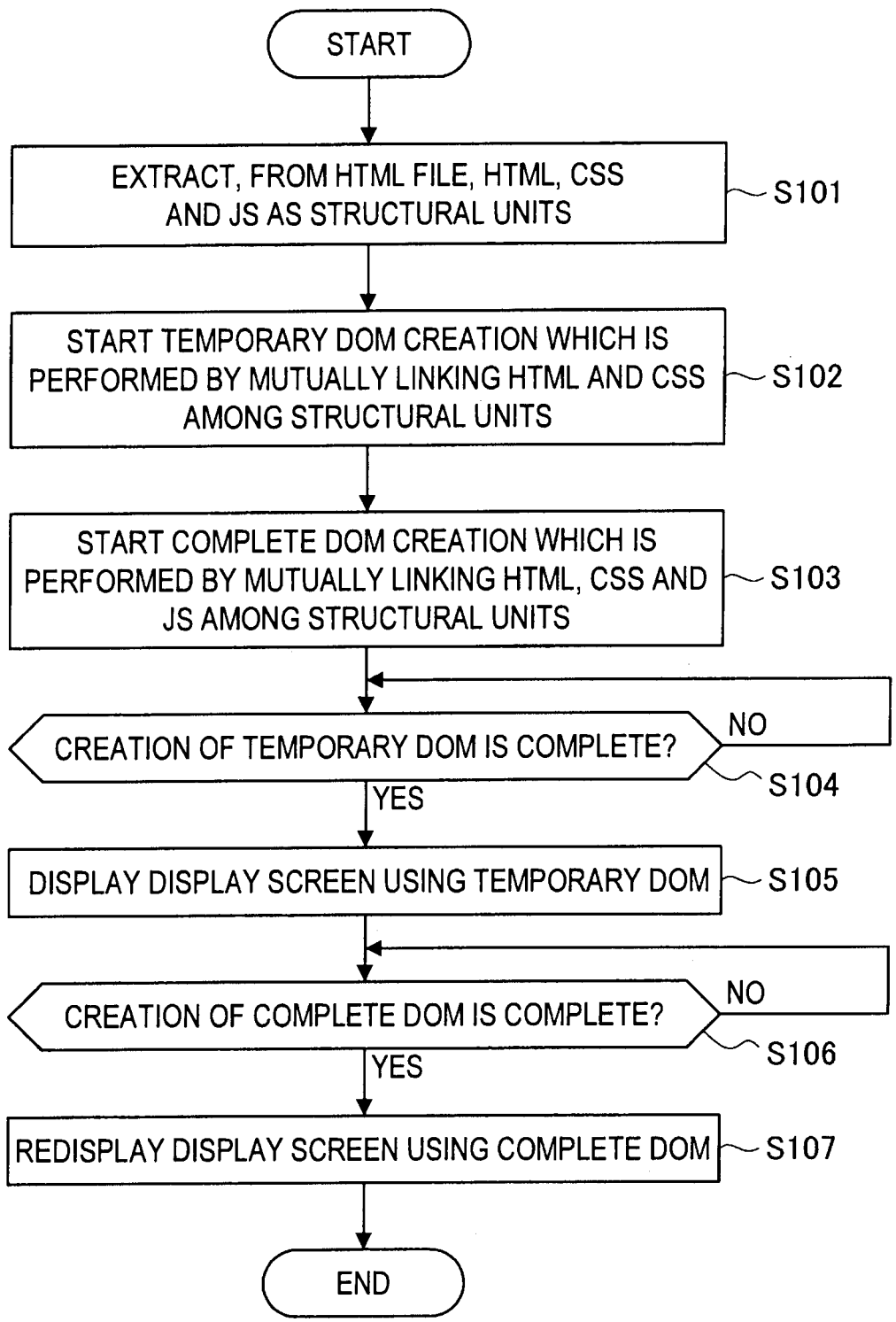
FIG. 11 is an explanatory diagram showing a flow of a display control process by the information processing apparatus according to the embodiment.

Next, an operation of the information processing apparatus 100 according to the present embodiment will be described with reference to FIG. 11. FIG. 11 is an explanatory diagram showing an operational flow of the information processing apparatus 100 according to the present embodiment.

As shown in FIG. 11, the information processing apparatus 100 first analyses an HTML file, and extracts a structural unit relating to HTML description, a structural unit relating to download and application of a CSS file, and a structural unit relating to download and execution of a JS file (step S101). Next, the information processing apparatus 100 starts creating a temporary DOM by mutually linking, among the extracted structural units, the structural unit relating to the HTML description and the structural unit relating to the CSS file (step S102). Then, the information processing apparatus 100 starts creating a complete DOM by mutually linking, among the extracted structural units, the structural unit relating to the HTML description, the structural unit relating to the CSS file, and the structural unit relating to the JS file (step S103).

Next, the information processing apparatus 100 determines whether the creation of the temporary DOM is complete or not (step S104). In the case the creation of the temporary DOM is complete, the information processing apparatus 100 proceeds to the step of S105. On the other hand, in the case the creation of the temporary DOM is not complete, the information processing apparatus 100 returns to the process of step S104. In the case of proceeding to the process of step S105, the information processing apparatus 100 creates a Web page by rendering the temporary DOM, and displays the same on a display screen (step S105).

Next, the information processing apparatus 100 determines whether the creation of the complete DOM is complete or not (step S106). In the case the creation of the complete DOM is complete, the information processing apparatus 100 proceeds to the process of step S107. On the other hand, in the case the creation of the complete DOM is not complete, the information processing apparatus 100 returns to the process of step S106. In the case of proceeding to the process of step S107, the information processing apparatus 100 creates a Web page by rendering the complete DOM, displays the Web page on the display screen instead of the Web page based on the temporary DOM (step S107), and ends the series of processes.

Heretofore, the operational flow of the information processing apparatus 100 according to the present embodiment has been described.

<2-4: Effect on Display Time>

Here, an effect obtained in the case of applying the processing sequence according to the present embodiment will be described with reference to FIGS. 12 to 14. The initial time obtained by the processing sequence of a standard Web browser and the initial time obtained by the processing sequence according to the present embodiment are shown in comparison to each other in FIGS. 12 and 14. Also, the complete time obtained by the processing sequence of a standard Web browser and the complete time obtained by the processing sequence according to the present embodiment are shown in comparison to each other in FIG. 13.

First, reference will be made to FIG. 12. As shown in FIG. 12, although depending on the structure of the Web page and the measurement environment, the initial time was reduced by 37% on average in the case of applying the processing sequence according to the present embodiment. Particularly, it was confirmed that the effect is significant for a Web page that heavily uses JS.

Next, reference will be made to FIG. 13. In FIG. 13, the complete time is compared between the processing sequence according to the present embodiment performed by two threads and the processing sequence of a standard Web browser performed by one thread. As can be seen from FIG. 13, although two threads are operating in the case of the processing sequence according to the present embodiment, the time until a Web page based on a complete DOM is fully displayed is about the same as the complete time of a standard Web browser performing with one thread. This is because the two threads are performing the processing simultaneously in parallel.

Next, reference will be made to FIG. 14. FIG. 14 shows a result of comparison between the initial times for the cases where a high-speed optical line is used. As shown in FIG. 14, also in a case of using a high-speed line with wide bandwidth, the speed is higher by 30% on average for the case of applying the processing sequence according to the present embodiment. The slowness of the rise of the bandwidth is considered to be the main factor for such result. That is, a user using a line with wide bandwidth can also experience the effect by applying the processing sequence according to the present embodiment.

Heretofore, an effect obtained by applying the processing sequence according to the present embodiment has been described.

<2-5: Comparison Between Display Results according to Difference in DOM Structures>

An effect obtained by applying the processing sequence according to the present embodiment has been made clear. However, it would be meaningless if a Web page based on the temporary DOM is disturbing to look at. The difference between the display results based on the difference in the DOM structure will be considered with reference to FIGS. 15 to 17.

(D1: HTML File Only)

Figure 15:
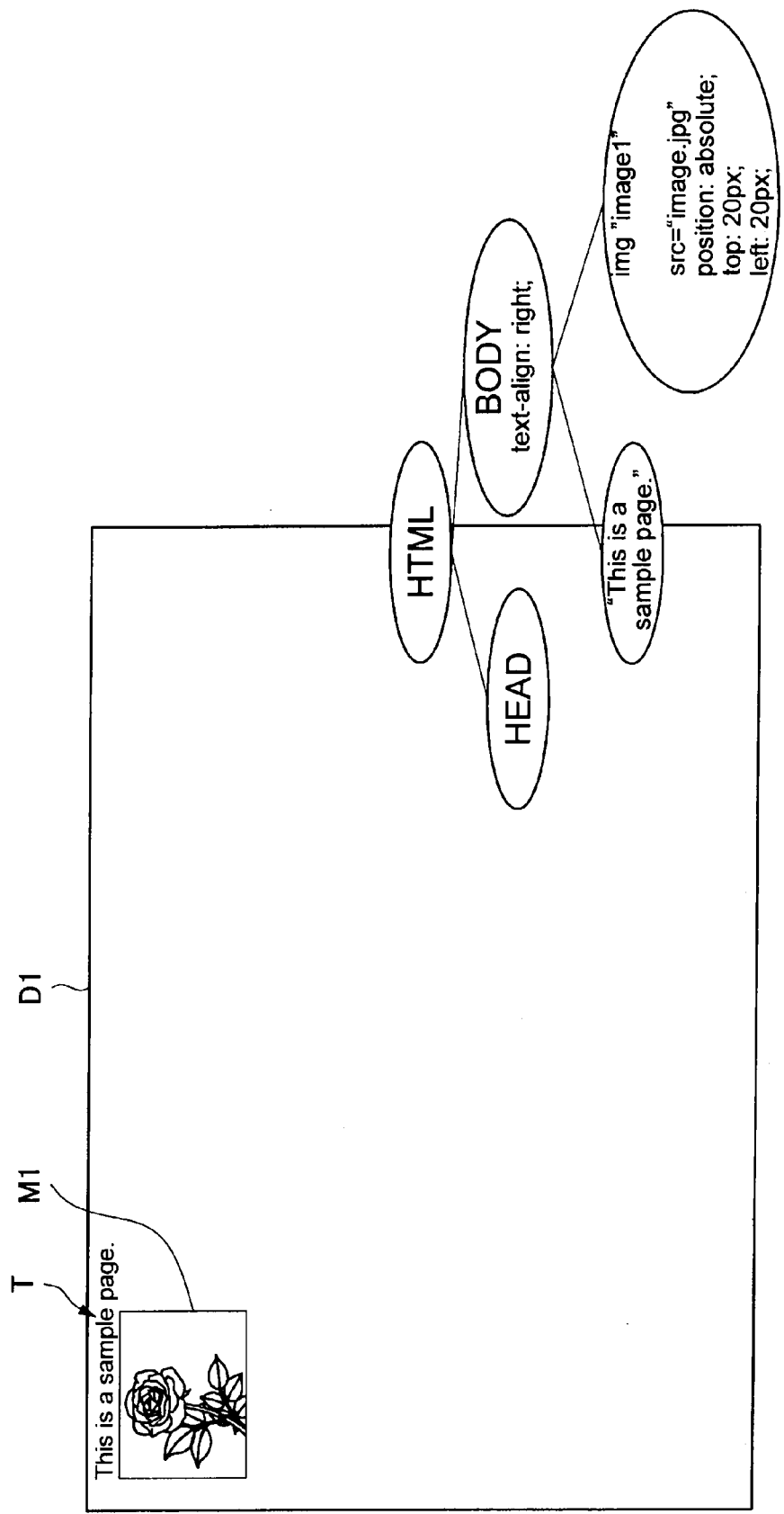
FIG. 15 is an explanatory diagram showing a relationship between the structure of a DOM and a display result.

First, reference will be made to FIG. 15. FIG. 15 shows a display configuration of a case where a simple DOM is built by using only an HTML file, and a Web page is displayed based on the simple DOM. In the case of only the HTML file, the layout is not particularly specified, and thus a display result in which text data T and image data M1 are simply vertically arranged is obtained. In this case, as illustrated in FIG. 15, the structure of the simple DOM will have a tree structure that takes the structural unit of HTML tags as a root, and the structural units of HEAD tags and BODY tags as nodes in the first hierarchy. Furthermore, a node corresponding to the text data T and a node corresponding to the image data M1 are linked to the lower hierarchy (second hierarchy) of the structural unit of the BODY tags, for example.

(D2: HTML File+CSS File)

Figure 16:
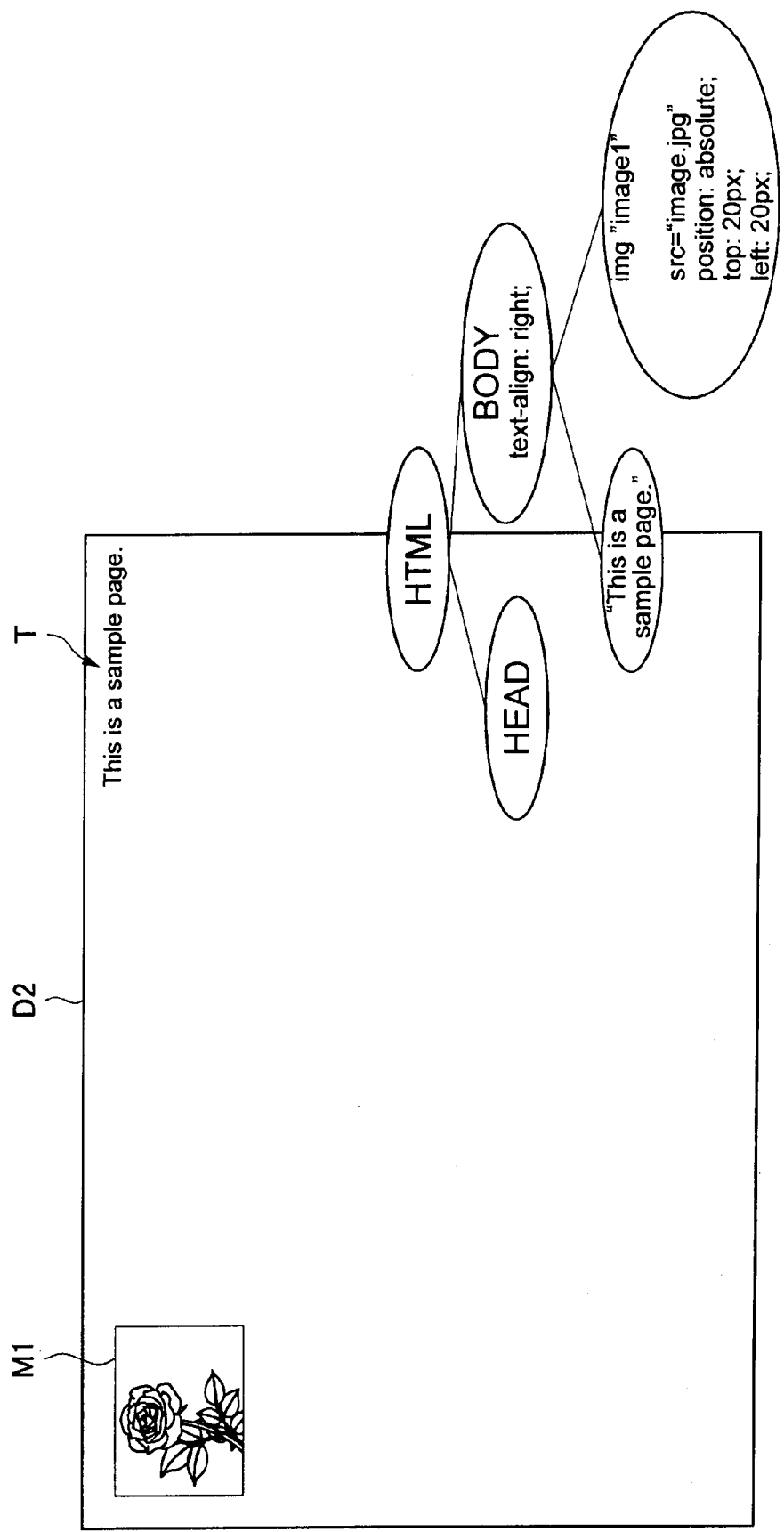
FIG. 16 is an explanatory diagram showing a relationship between the structure of a DOM and a display result.

Next, reference will be made to FIG. 16. FIG. 16 shows a display configuration of a case where a simple DOM is built by using an HTML file and a CSS file, and a Web page is displayed based on the simple DOM. This display configuration example corresponds to the display configuration based on the temporary DOM according to the present embodiment. In the example of FIG. 16, the layout is specified by the CSS file, and thus the display position of the text data T and the display position of the image data M1 are adjusted.

In this case, the structure of the simple DOM will have a tree structure that takes the structural unit of HTML tags as a root, and the structural units of HEAD tags and BODY tags as nodes in the first hierarchy. Furthermore, a node corresponding to the text data T and a node corresponding to the image data M1 are linked to the lower hierarchy (second hierarchy) of the structural unit of the BODY tags, for example. As described, since rewriting process is not performed on this simple DOM due to the application of the CSS file, the structure of the simple DOM is substantially the same as that in the case of only the HTML file.

(D3: HTML File+CSS File+JS File)

Next, reference will be made to FIG. 17. FIG. 17 shows a display configuration of a case where a DOM is built by using an HTML file, a CSS file and a JS file, and a Web page is displayed based on the DOM. This display configuration example corresponds to the display configuration based on the complete DOM according to the present embodiment. In the example of FIG. 17, the layout is specified by the CSS file, and thus the display position of the text data T and the display position of image data M2 are adjusted. Note that the content of a DOM node is rewritten by the execution of the JS file. In the example of FIG. 17, the display specification of the image data M1 included in a node is rewritten to the display specification of the image data M2.

As described, there is a difference between the display results of a Web page due to the structure of the simple DOM. However, as with the structure of the temporary DOM according to the present embodiment, by taking into consideration the structural unit relating to the CSS file, the layout of a Web page based on the temporary DOM is adjusted, and necessary information can be presented without making a user feel discomfort.

<2-6: Concrete Example of DOM Building Steps>

Next, concrete examples of DOM building steps will be described with reference to FIGS. 18 to 68. DOM building steps of a standard Web browser will be also shown for comparison. The processing steps of FIGS. 18 to 35 are DOM building steps of a standard Web browser, and the processing steps of FIGS. 36 to 68 are DOM building steps according to the present embodiment.

(DOM Building Steps of Standard Web Browser)

First, DOM building steps of a standard Web browser will be described. Here, a case of executing an HTML file illustrated in FIG. 18 will be described.

Figure 20:
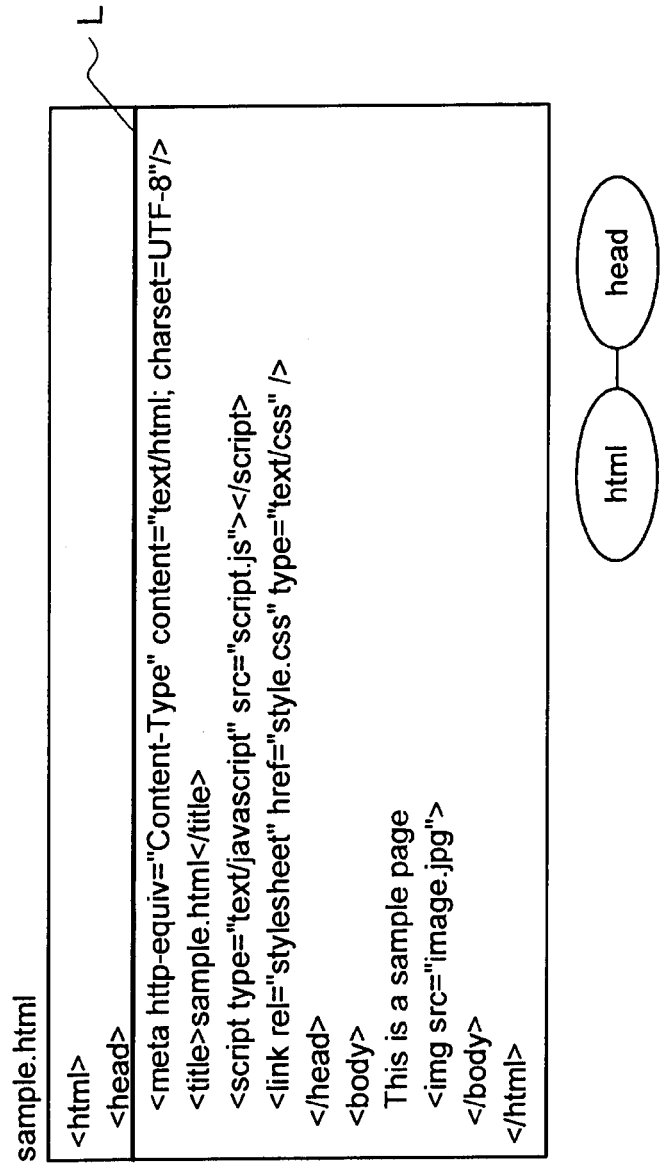
FIG. 20 is an explanatory diagram showing a flow of an HTML file execution process based on a standard display control method.

When a redirect occurs, an HTML file as shown in FIG. 18 is downloaded. Then, the structure of the downloaded HTML file is analysed. First, as shown in FIG. 19, an <html> tag at the beginning of the HTML file is read, and the structural unit delimited by <html> tags is recognized as the root of a DOM. Then, as shown in FIG. 20, a <head> tag is read, and the structural unit delimited by <head> tags is recognized as a node subordinate to the root of the DOM. At this time, the root corresponding to the <html> tag and the node corresponding to the <head> tag are linked to each other, as shown in FIG. 20.

Then, as shown in FIG. 21, a <meta . . . > tag is read, and the structural unit delimited by the <meta . . . > tags is recognized as a lower node subordinate to the <head> node. At this time, as shown in FIG. 21, the <head> node and the <meta . . . > node are linked to each other.

Figure 22:
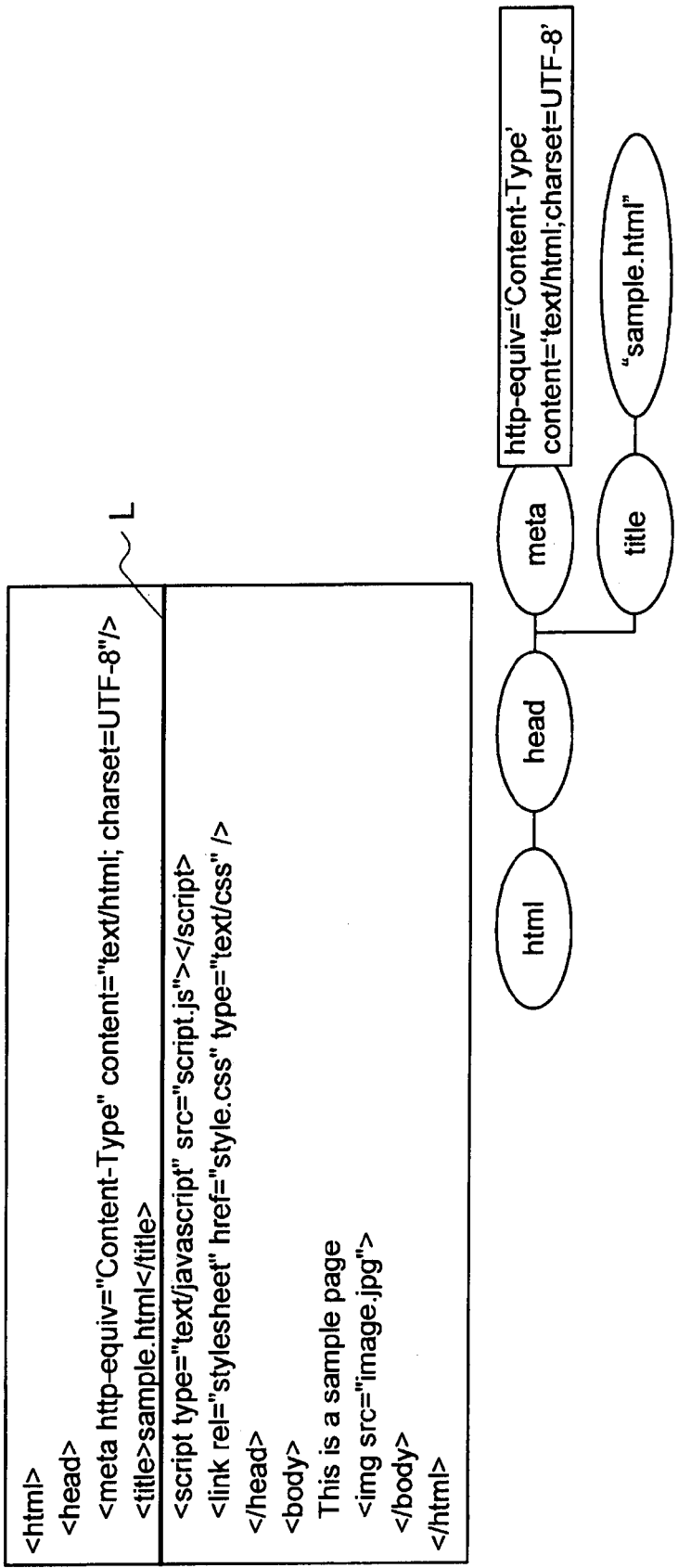
FIG. 22 is an explanatory diagram showing a flow of an HTML file execution process based on a standard display control method.

Next, as shown in FIG. 22, a <title> tag is read, and the structural unit delimited by the <title> tags is recognized as a lower node subordinate to the <head> node. Additionally, since the <meta . . . > tag and the <title> tag are delimited by the same <head> tags, the <title> tag is subordinate to the <head> tag, as shown in FIG. 22. That is, as shown in FIG. 22, the <head> node and the <title> node are linked to each other.

Figure 23:
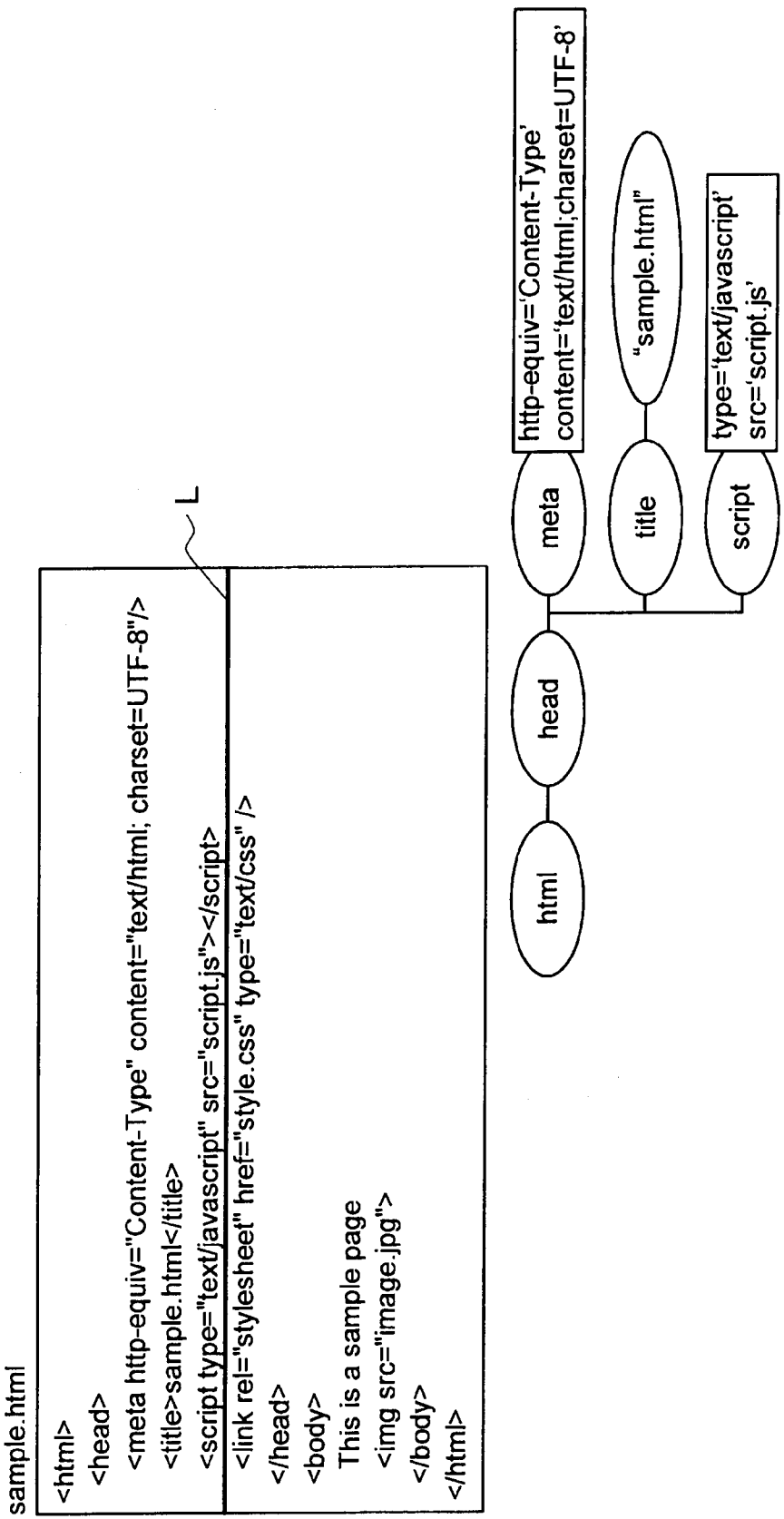
FIG. 23 is an explanatory diagram showing a flow of an HTML file execution process based on a standard display control method.

Next, as shown in FIG. 23, a <script . . . > tag is read, and the structural unit delimited by the <script . . . > tags is recognized as a lower node subordinate to the <head> node. Additionally, the <meta . . . > tag, the <title> tag and the <script . . . > tag are delimited by the same <head> tags, and thus the <script . . . > tag is subordinate to the <head> tag, as shown in FIG. 23. That is, as shown in FIG. 23, the <head> node and the <script . . . > node are linked to each other. Additionally, the <script . . . > node is a structural unit relating to the execution of script processing.

Figure 24:
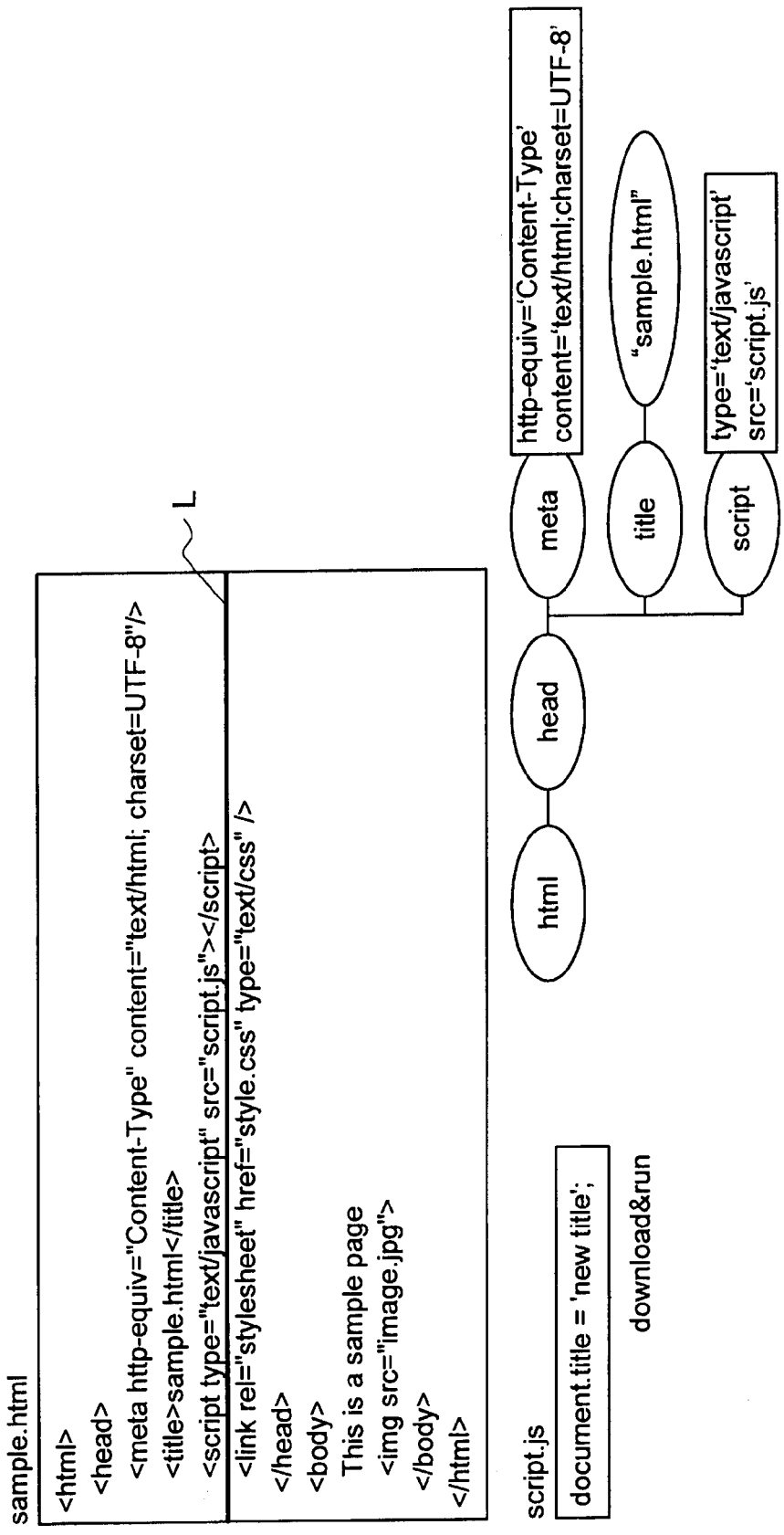
FIG. 24 is an explanatory diagram showing a flow of an HTML file execution process based on a standard display control method.

In the example of FIG. 23, a JS script file is associated with the structural unit of the <script . . . > tag. Accordingly, as shown in FIG. 24, when the <script . . . > tag is read, a JS script file is downloaded, and the downloaded JS script file is executed. At this time, if a description for changing the DOM structure is included in the JS script file, the DOM structure is changed at this stage. For example, in the case "document.title='new title';" is described in the JS script file as shown in FIG. 25, the contents of the <title> tag are changed, and thus the <title> node included in the DOM is updated.

Figure 26:
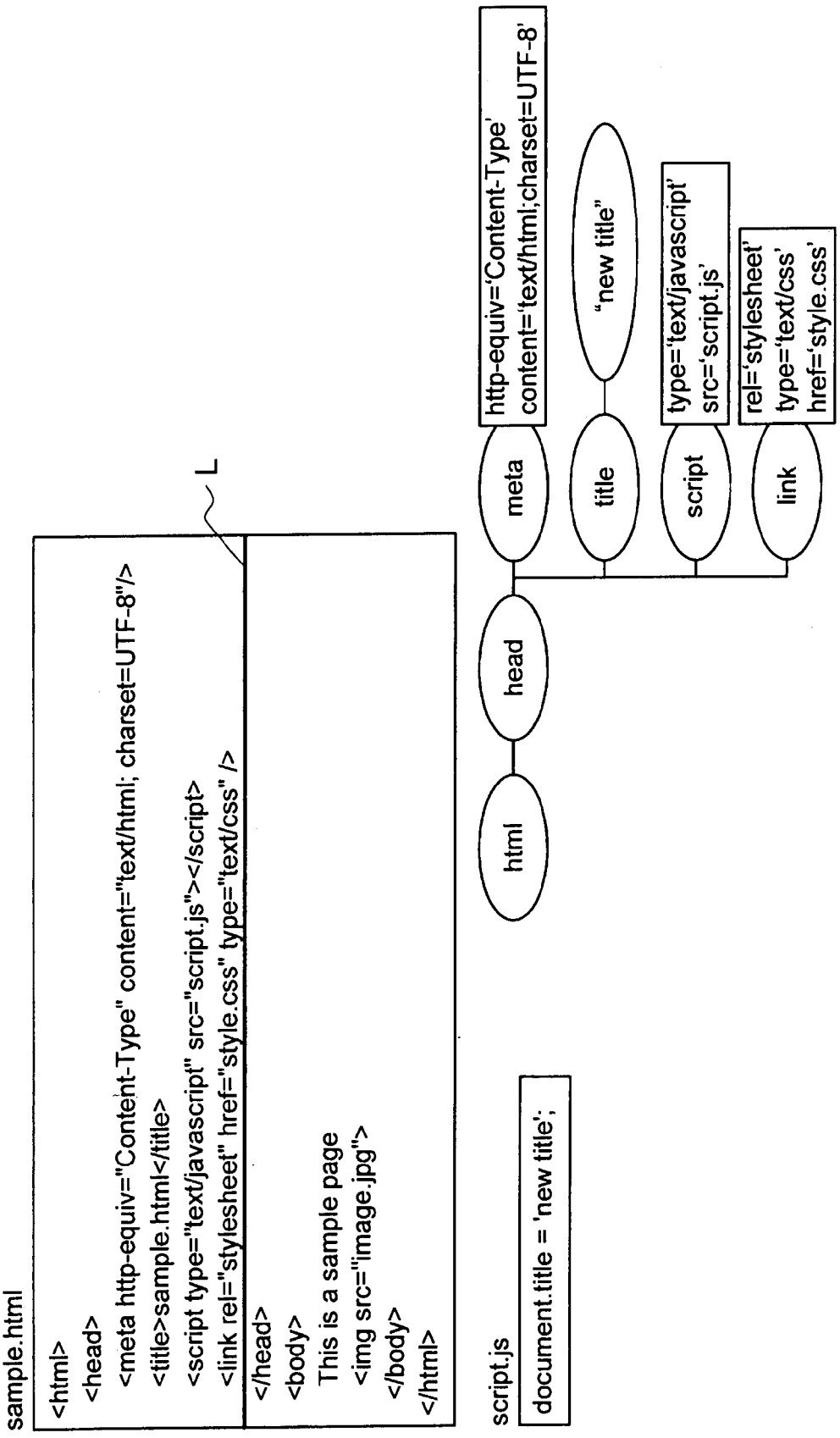
FIG. 26 is an explanatory diagram showing a flow of an HTML file execution process based on a standard display control method.

Next, as shown in FIG. 26, a <link . . . > tag is read, and the structural unit delimited by the <link . . . > tags is recognized as a lower node subordinate to the <head> node. Additionally, the <meta . . . > tag, the <title> tag, the <script . . . > tag and the <link . . . > tag are delimited by the same <head> tags, and thus the <link . . . > tag is subordinate to the <head> tag, as shown in FIG. 26. That is, as shown in FIG. 26, the <head> node and the <link . . . > node are linked to each other.

Figure 27:
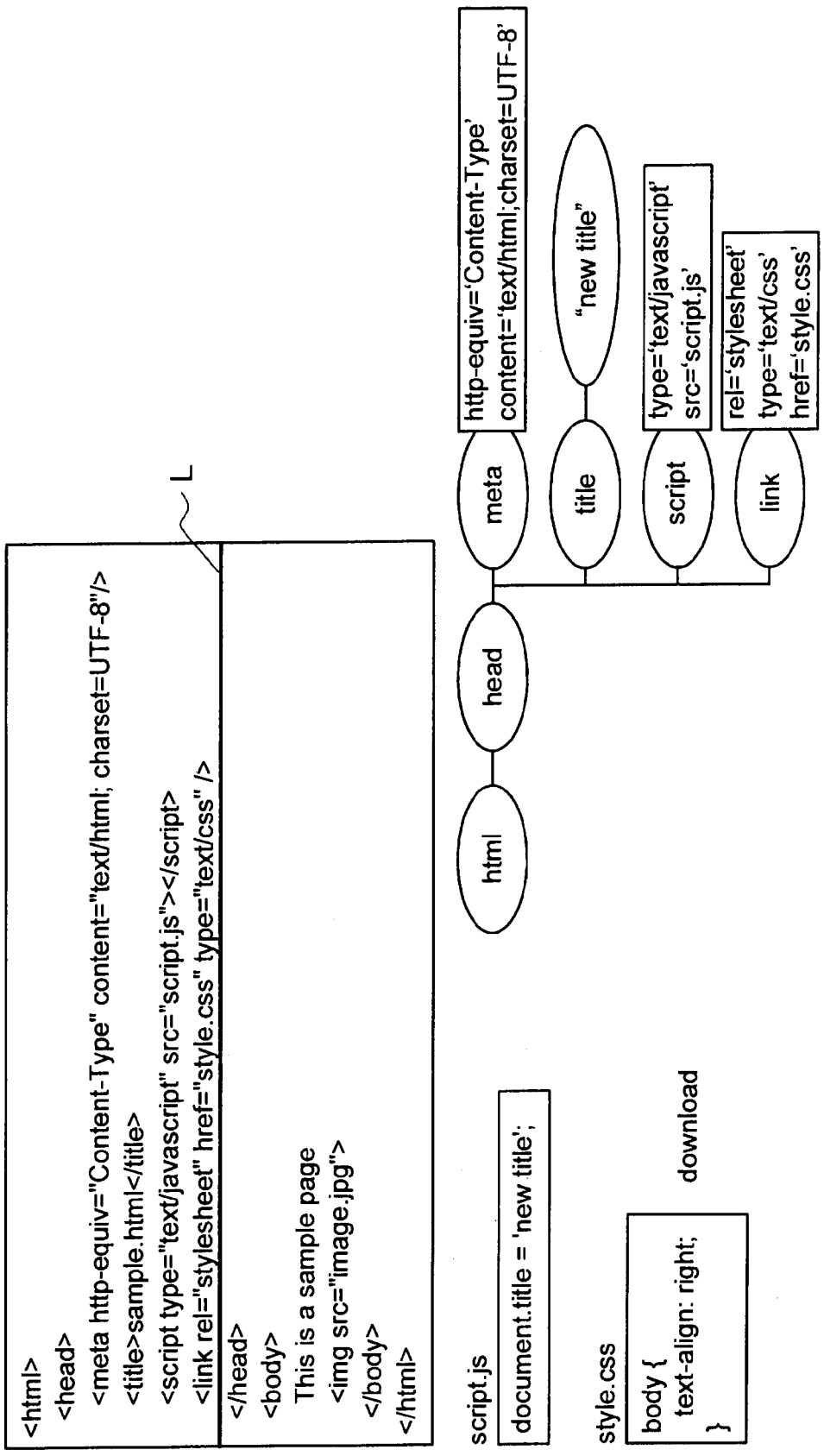
FIG. 27 is an explanatory diagram showing a flow of an HTML file execution process based on a standard display control method.

Additionally, in the example of FIG. 26, a CSS file is associated by the <link . . . > tag. Thus, the <link . . . > node is a structural unit relating to the definition of the layout. Accordingly, as shown in FIG. 27, when the <link . . . > tag is read, a CSS file is downloaded, and the downloaded CSS file is applied. For example, in the case "body {text-align:right}" is described in the CSS file as shown in FIG. 27, the display layout of text data is set to right-align.

Figure 30:
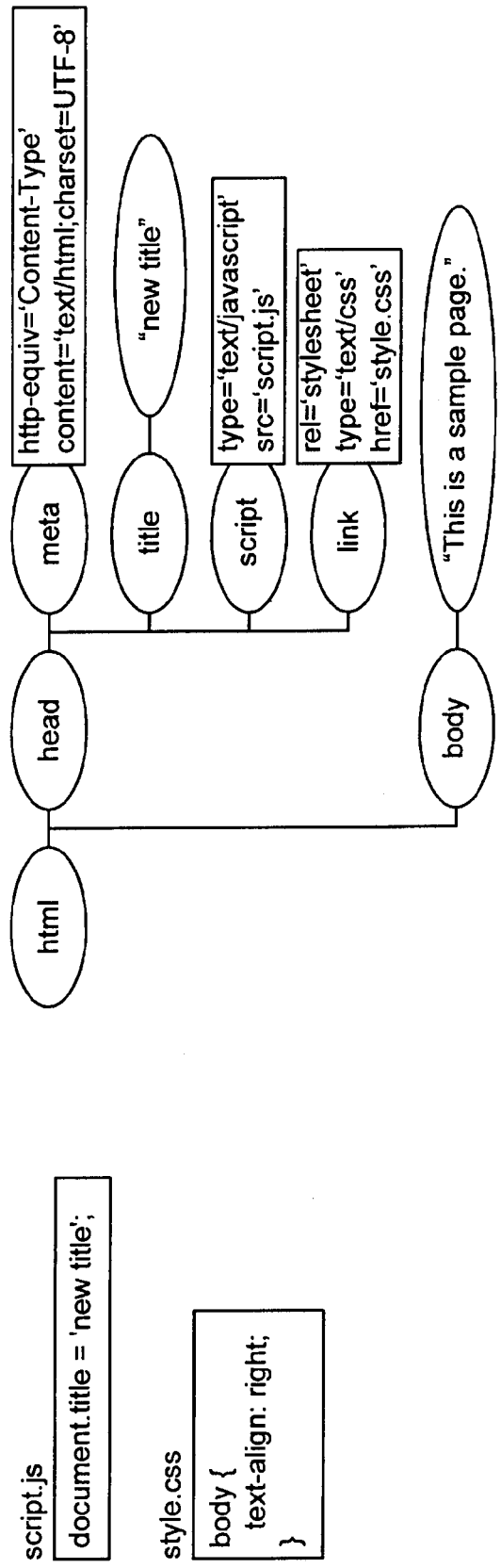
FIG. 30 is an explanatory diagram showing a flow of an HTML file execution process based on a standard display control method.

Next, as shown in FIG. 28, the </head> indicating the end position of the structural unit delimited by the <head> tags is read, and the building of the DOM tree subordinate to the <head> node is complete. Then, as shown in FIG. 29, a <body> tag is read, and the structural unit delimited by the <body> tags is recognized as a node subordinate to the root. That is, as shown in FIG. 29, the root and the <body> node are linked to each other. Then, as shown in FIGS. 30 and 31, the contents of the structural unit delimited by the <body> tags are read.

Figure 32:
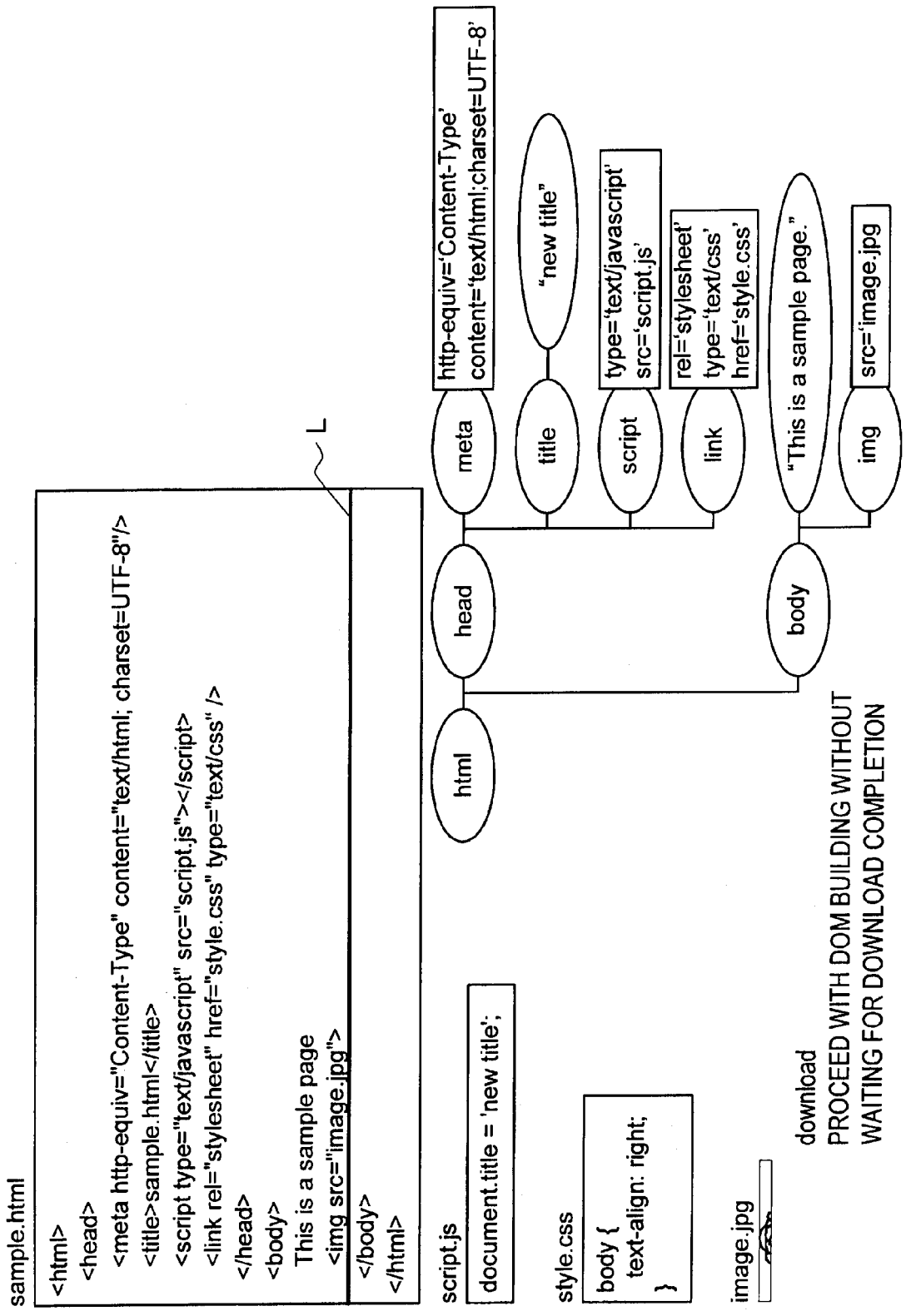
FIG. 32 is an explanatory diagram showing a flow of an HTML file execution process based on a standard display control method.
Figure 33:
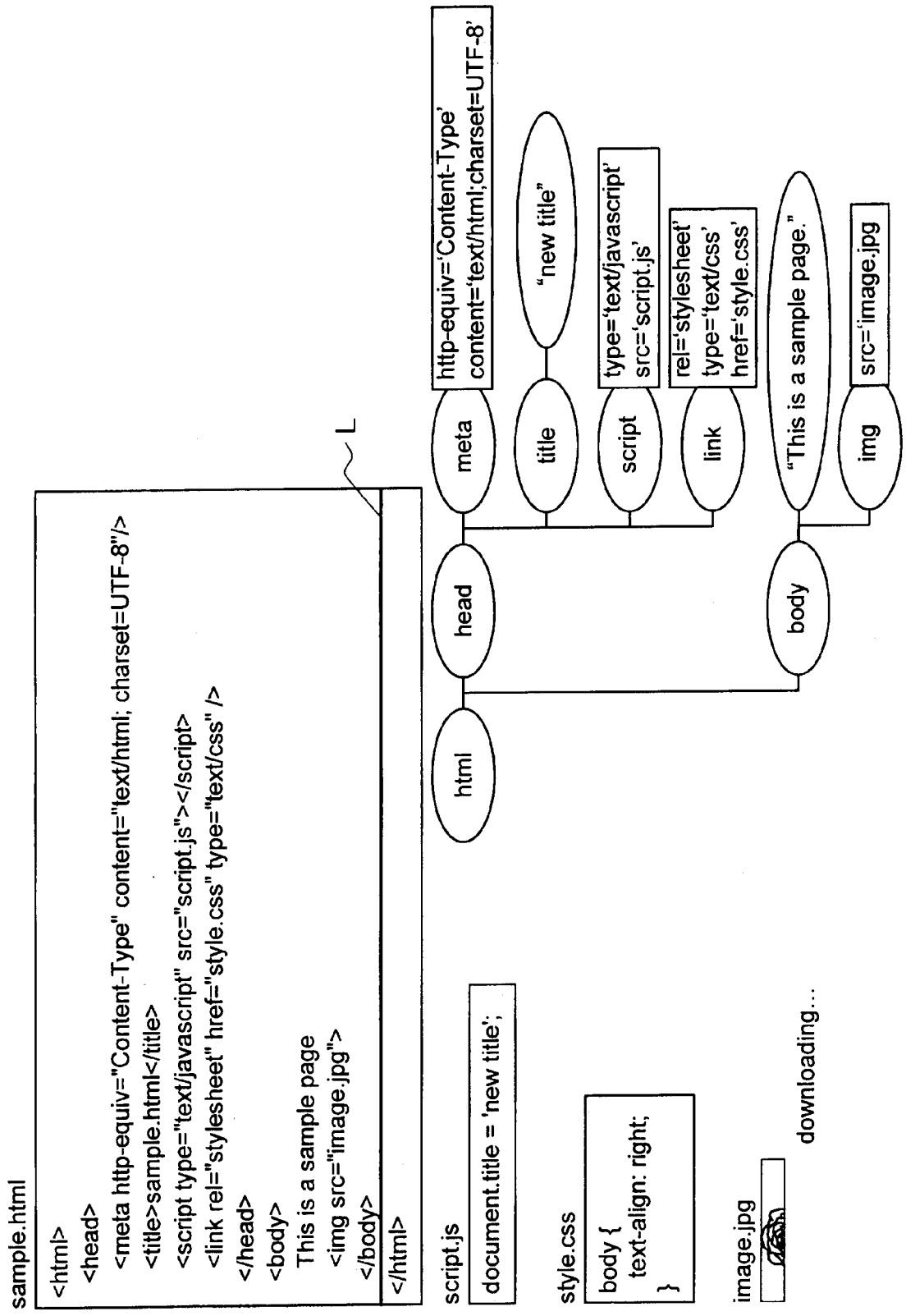
FIG. 33 is an explanatory diagram showing a flow of an HTML file execution process based on a standard display control method.
Figure 34:
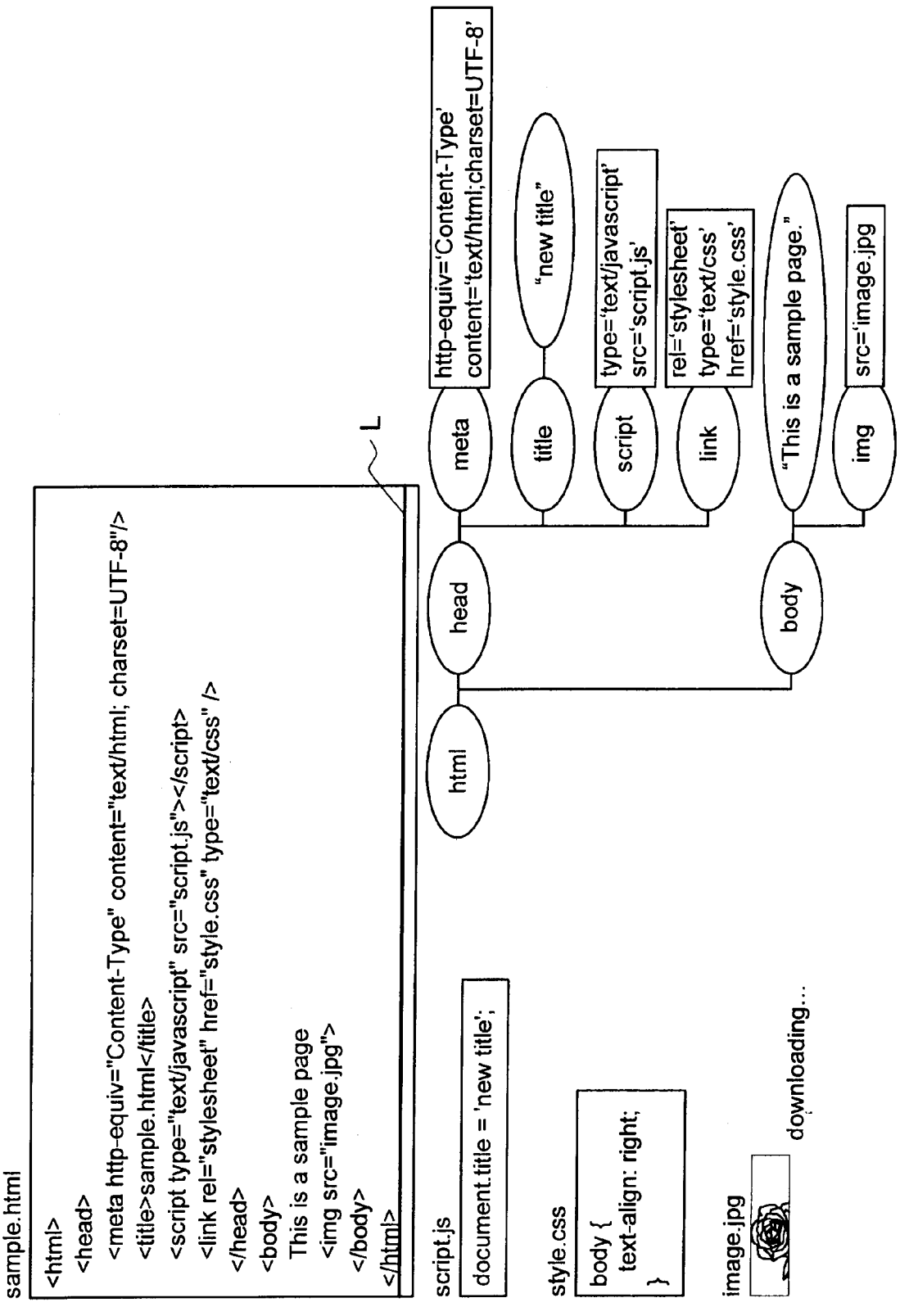
FIG. 34 is an explanatory diagram showing a flow of an HTML file execution process based on a standard display control method.
Figure 35:
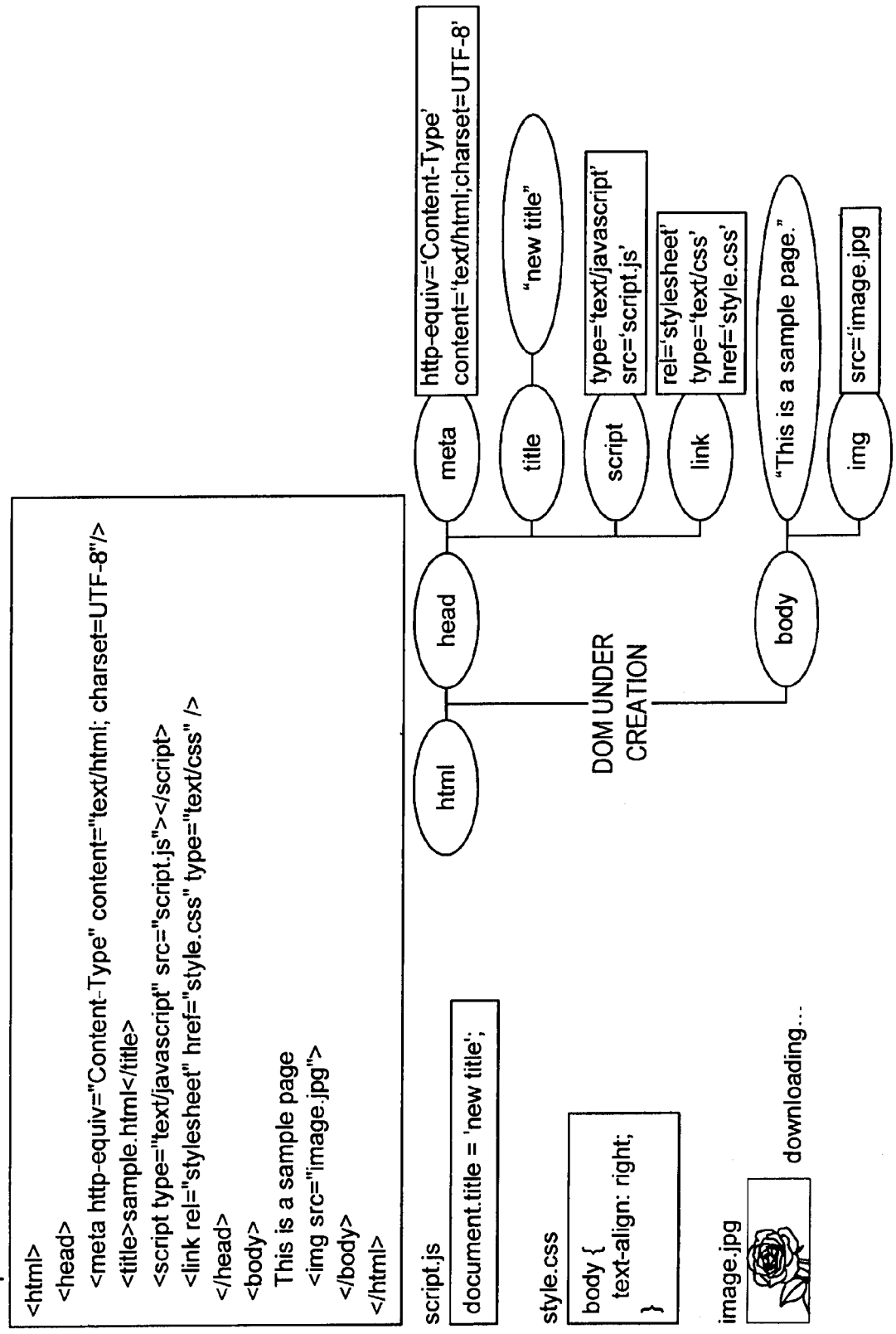
FIG. 35 is an explanatory diagram showing a flow of an HTML file execution process based on a standard display control method.

As shown in FIG. 31, specification of image data is included in the structural unit delimited by the <body> tags. Thus, the specified image data is downloaded as shown in FIG. 32. Note that, as shown in FIGS. 32 to 35, the process of building the DOM is continued during the download of the image data. Then, the </body> tag indicating the end position of the structural unit delimited by the <body> tags is read and the </html> tag indicating the end position of the structural unit delimited by the <html> tags is read, and the analysis of the HTML file is ended. Thus, the creation of the DOM is completed.

Heretofore, the DOM building steps of a standard Web browser has been concretely described. As described, the DOM building steps of a standard Web browser include steps of downloading and executing a JS script file. Thus, the building of the DOM takes a long time due to the sequential nature of the script processing.

(DOM Building Steps According to Present Embodiment)

Next, DOM building steps according to the present embodiment will be described. Additionally, the same file as the above-described example shown in FIG. 18 will be used as the HTML file to be read (see FIG. 36). Also, in the explanation below, processing by a first thread means processing relating to the creation of a temporary DOM, and processing by a second thread means processing relating to the creation of a complete DOM.

(Processing by First Thread)

First, processing by a first thread will be described.

When a redirect occurs, an HTML file is downloaded as shown in FIG. 36. Then, the structure of the downloaded HTML file is analysed. First, as shown in FIG. 37, an <html> tag at the beginning of the HTML file is read, and the structural unit delimited by <html> tags is recognized as the root of a DOM. Then, as shown in FIG. 38, a <head> tag is read, and the structural unit delimited by <head> tags is recognized as a node subordinate to the root of the DOM. At this time, the root corresponding to the <html> tag and the node corresponding to the <head> tag are linked to each other, as shown in FIG. 38.

Then, as shown in FIG. 39, a <meta . . . > tag is read, and the structural unit delimited by the <meta . . . > tags is recognized as a lower node subordinate to the <head> node. At this time, as shown in FIG. 39, the <head> node and the <meta . . . > node are linked to each other.

Next, as shown in FIG. 40, a <title> tag is read, and the structural unit delimited by the <title> tags is recognized as a lower node subordinate to the <head> node. Additionally, since the <meta . . . > tag and the <title> tag are delimited by the same <head> tags, the <title> tag is subordinate to the <head> tag, as shown in FIG. 40. That is, as shown in FIG. 40, the <head> node and the <title> node are linked to each other.

Next, as shown in FIG. 41, a <script . . . > tag is read. However, in the DOM building steps by the first thread according to the present embodiment, the <script . . . > tag is skipped as shown in FIG. 42, and processing relating to the structural unit delimited by the <script . . . > tags is not performed. That is, the download and execution of a JS script file are not performed.

Next, as shown in FIG. 43, a <link . . . > tag is read, and the structural unit delimited by the <link . . . > tags is recognized as a lower node subordinate to the <head> node. Additionally, the <meta . . . > tag, the <title> tag, the <script . . . > tag and the <link . . . > tag are delimited by the same <head> tags, and thus the <link . . . > tag is subordinate to the <head> tag, as shown in FIG. 43. That is, as shown in FIG. 43, the <head> node and the <link . . . > node are linked to each other.

Additionally, in the example of FIG. 43, a CSS file is associated by the <link . . . > tag. Thus, the <link . . . > node is a structural unit relating to the definition of the layout. Accordingly, as shown in FIG. 44, when the <link . . . > tag is read, a CSS file is downloaded, and the downloaded CSS file is applied. For example, in the case "body {text-align:right}" is described in the CSS file as shown in FIG. 44, the display layout of text data is set to right-align.

Figure 45:
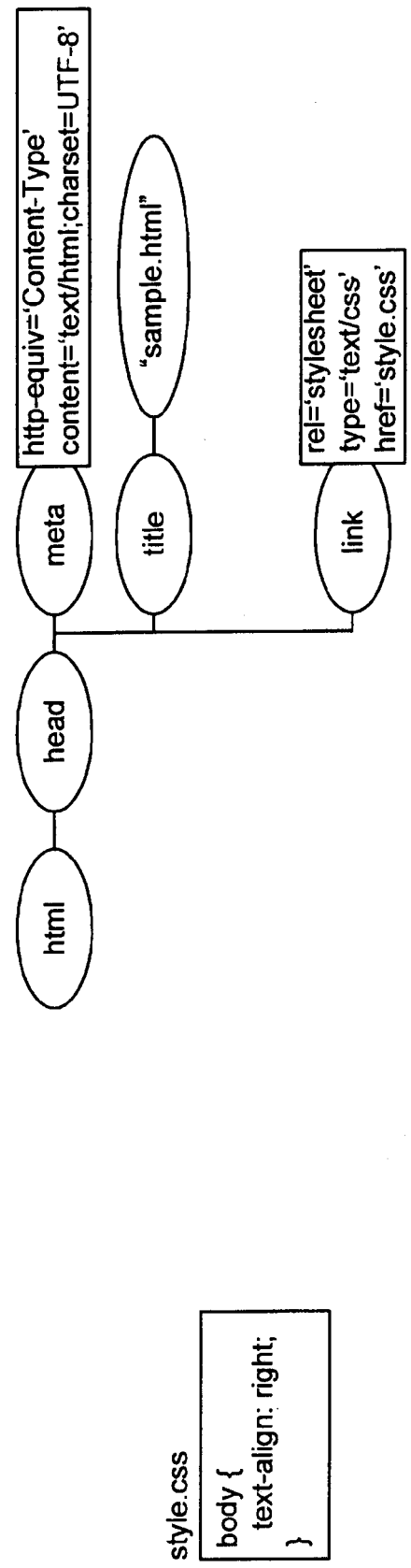
FIG. 45 is an explanatory diagram showing a flow of an HTML file execution process based on the display control method according to the embodiment.
Figure 51:
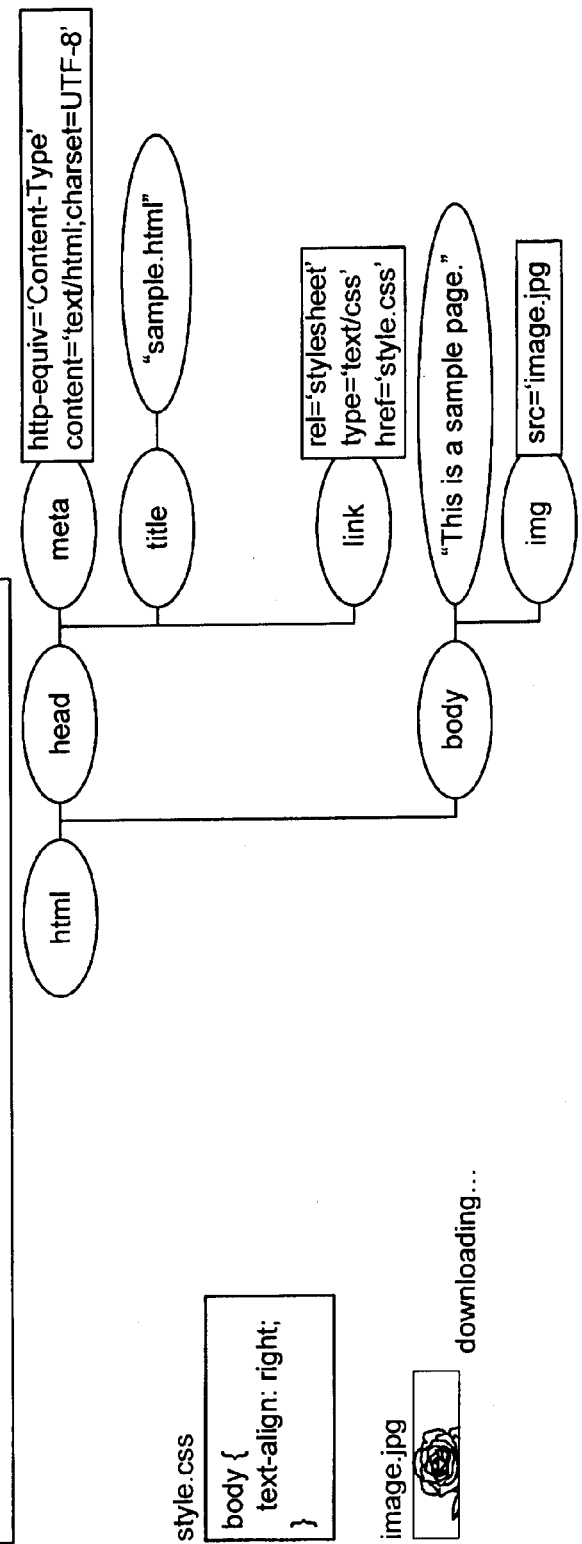
FIG. 51 is an explanatory diagram showing a flow of an HTML file execution process based on the display control method according to the embodiment.
Figure 52:
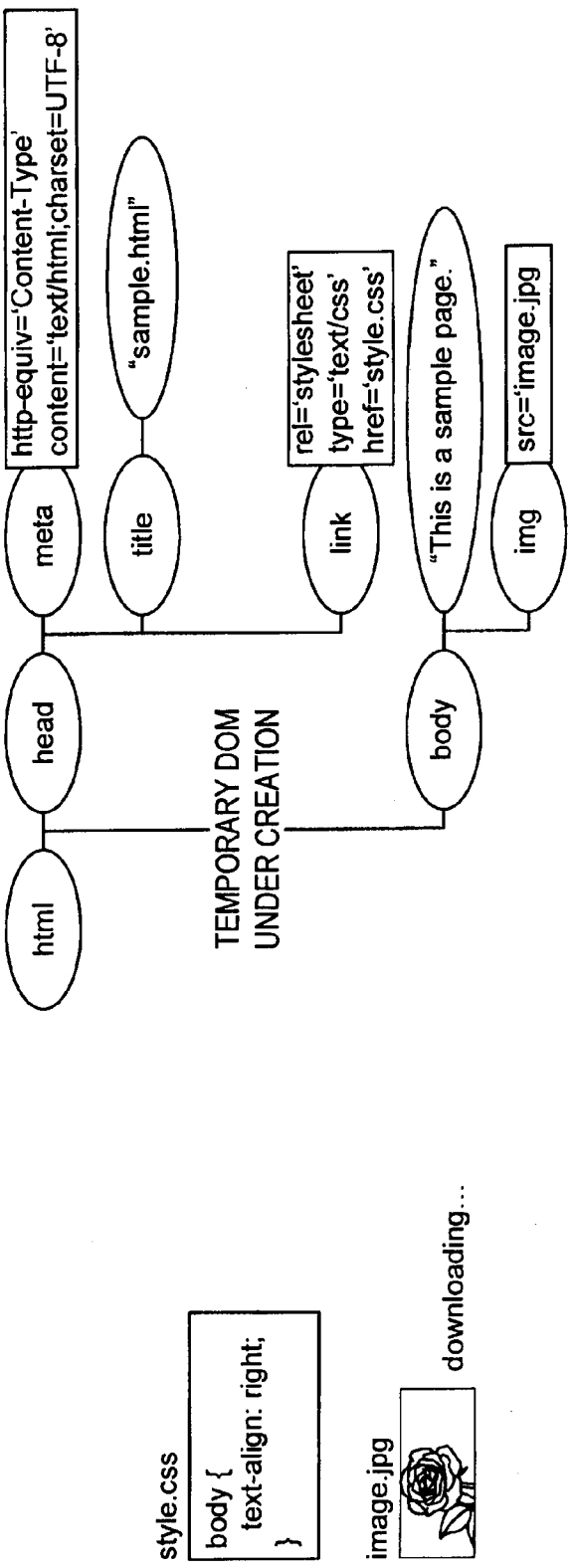
FIG. 52 is an explanatory diagram showing a flow of an HTML file execution process based on the display control method according to the embodiment.

Next, as shown in FIG. 45, the </head> indicating the end position of the structural unit delimited by the <head> tags is read, and the building of the DOM tree subordinate to the <head> node is complete. Then, as shown in FIG. 46, a <body> tag is read, and the structural unit delimited by the <body> tags is recognized as a node subordinate to the root. That is, as shown in FIG. 46, the root and the <body> node are linked to each other. Then, as shown in FIGS. 47 and 48, the contents of the structural unit delimited by the <body> tag are read.

As shown in FIG. 48, specification of image data is included in the structural unit delimited by the <body> tags. Thus, the specified image data is downloaded as shown in FIG. 49. Note that, as shown in FIGS. 49 to 52, the process of building the temporary DOM is continued during the download of the image data. Then, the </body> tag indicating the end position of the structural unit delimited by the <body> tags is read and the </html> tag indicating the end position of the structural unit delimited by the <html> tags is read, and the analysis of the HTML file is ended. Thus, the creation of the temporary DOM is completed.

As described, in the building steps for the temporary DOM by the first thread, the download and execution of a JS script file are skipped. Therefore, there is no processing delay due to the sequential nature of script processing, and the temporary DOM can be quickly built.

(Processing by Second Thread)

Next, processing by a second thread will be described. Note that the processing by the second thread is started at the same timing as the processing by the first thread. Also, since download of various files is performed by a download manager thread, the files that are already downloaded to be used by the first thread do not have to be downloaded redundantly.

When a redirect occurs, the structure of the HTML file is analysed as shown in FIG. 53. At this time, download of necessary files is continued by the download manager thread. First, as shown in FIG. 54, the <html> tag at the beginning of the HTML file is read, and the structural unit delimited by <html> tags is recognized as the root of a DOM. Then, as shown in FIG. 55, a <head> tag is read, and the structural unit delimited by <head> tags is recognized as a node subordinate to the root of the DOM. At this time, the root corresponding to the <html> tag and the node corresponding to the <head> tag are linked to each other, as shown in FIG. 55.

Then, as shown in FIG. 56, a <meta . . . > tag is read, and the structural unit delimited by the <meta . . . > tags is recognized as a lower node subordinate to the <head> node. At this time, as shown in FIG. 56, the <head> node and the <meta . . . > node are linked to each other.

Next, as shown in FIG. 57, a <title> tag is read, and the structural unit delimited by the <title> tags is recognized as a lower node subordinate to the <head> node. Additionally, since the <meta . . . > tag and the <title> tag are delimited by the same <head> tags, the <title> tag is subordinate to the <head> tag, as shown in FIG. 57. That is, as shown in FIG. 57, the <head> node and the <title> node are linked to each other.

Next, as shown in FIG. 58, a <script . . . > tag is read, and the structural unit delimited by the <script . . . > tags is recognized as a lower node subordinate to the <head> node. Additionally, the <meta . . . > tag, the <title> tag and the <script . . . > tag are delimited by the same <head> tags, and thus the <script . . . > tag is subordinate to the <head> tag, as shown in FIG. 58. That is, as shown in FIG. 58, the <head> node and the <script . . . > node are linked to each other. Additionally, the <script . . . > node is a structural unit relating to the execution of script processing.

In the example of FIG. 58, a JS script file is associated with the structural unit of the <script . . . > tag. Accordingly, as shown in FIG. 59, when the <script . . . > tag is read, a JS script file is downloaded, and the downloaded JS script file is executed. At this time, if a description for changing the DOM structure is included in the JS script file, the DOM structure is changed at this stage. For example, in the case "document.title='new title';" is described in the JS script file as shown in FIG. 60, the contents of the <title> tag are changed, and thus the <title> node included in the complete DOM is updated.

As described, in the building steps for a DOM by the second thread, the <script . . . > tag that was skipped in the DOM building steps of the first thread is read, and download and execution of a JS script file are performed.

Figure 61:
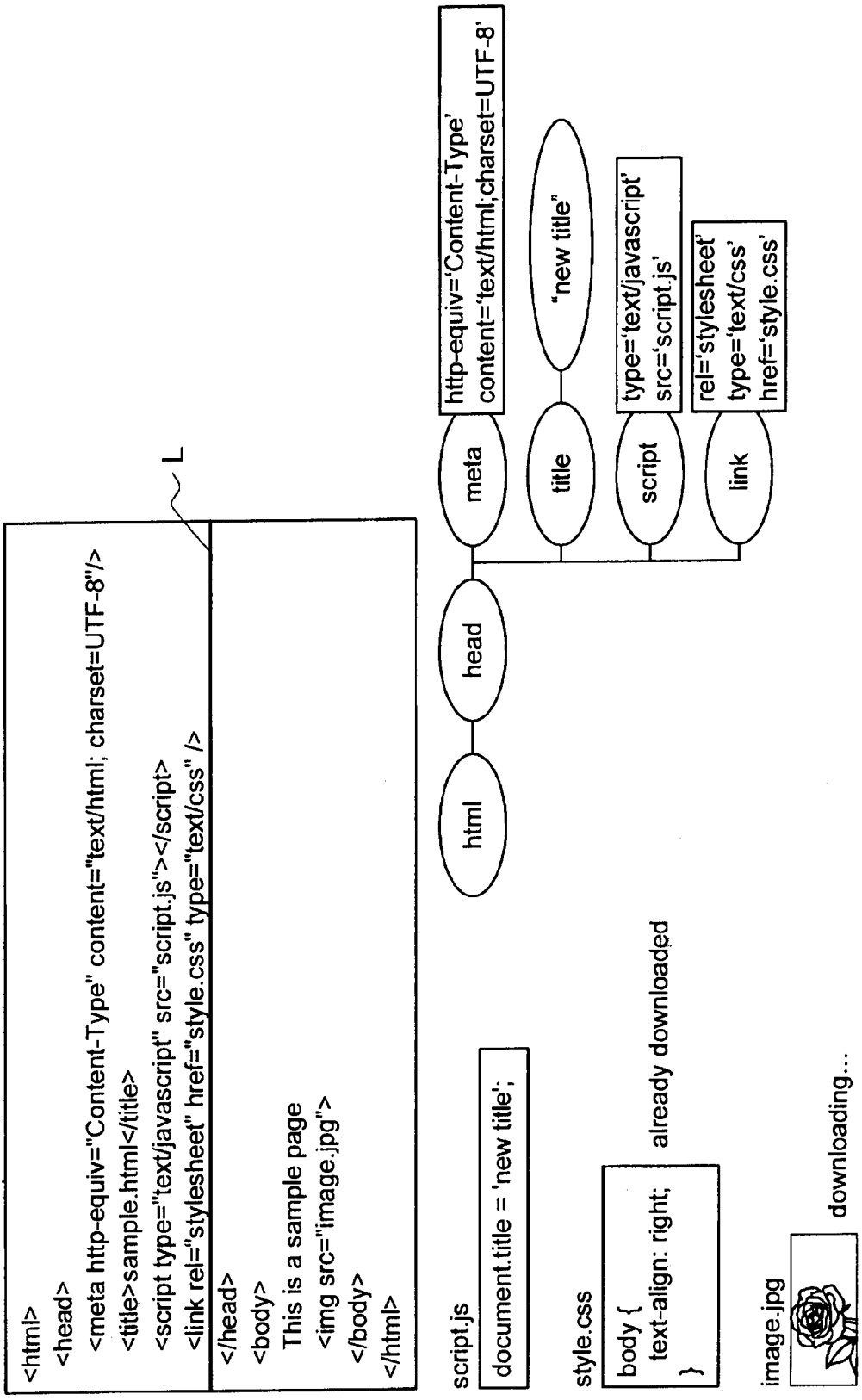
FIG. 61 is an explanatory diagram showing a flow of an HTML file execution process based on the display control method according to the embodiment.

Next, as shown in FIG. 61, a <link . . . > tag is read, and the structural unit delimited by the <link . . . > tags is recognized as a lower node subordinate to the <head> node. Additionally, the <meta . . . > tag, the <title> tag, the <script . . . > tag and the <link . . . > tag are delimited by the same <head> tags, and thus the <link . . . > tag is subordinate to the <head> tag, as shown in FIG. 61. That is, as shown in FIG. 61, the <head> node and the <link . . . > node are linked to each other.

Additionally, in the example of FIG. 61, a CSS file is associated by the <link . . . > tag. Thus, the <link . . . > node is a structural unit relating to the definition of the layout. Accordingly, a CSS file is applied as in the DOM building steps by the first thread. For example, in the case "body {text-align:right}" is described in the CSS file as shown in FIG. 61, the display layout of text data is set to right-align. Note that the CSS file is already downloaded by the download manager thread.

Next, as shown in FIG. 62, a </head> indicating the end position of the structural unit delimited by the <head> tags is read, and the building of the DOM tree subordinate to the <head> node is complete. Then, as shown in FIG. 63, a <body> tag is read, and the structural unit delimited by the <body> tags is recognized as a node subordinate to the root. That is, as shown in FIG. 63, the root and the <body> node are linked to each other. Then, as shown in FIGS. 64 and 65, the contents of the structural unit delimited by the <body> tag are read.

Figure 65:
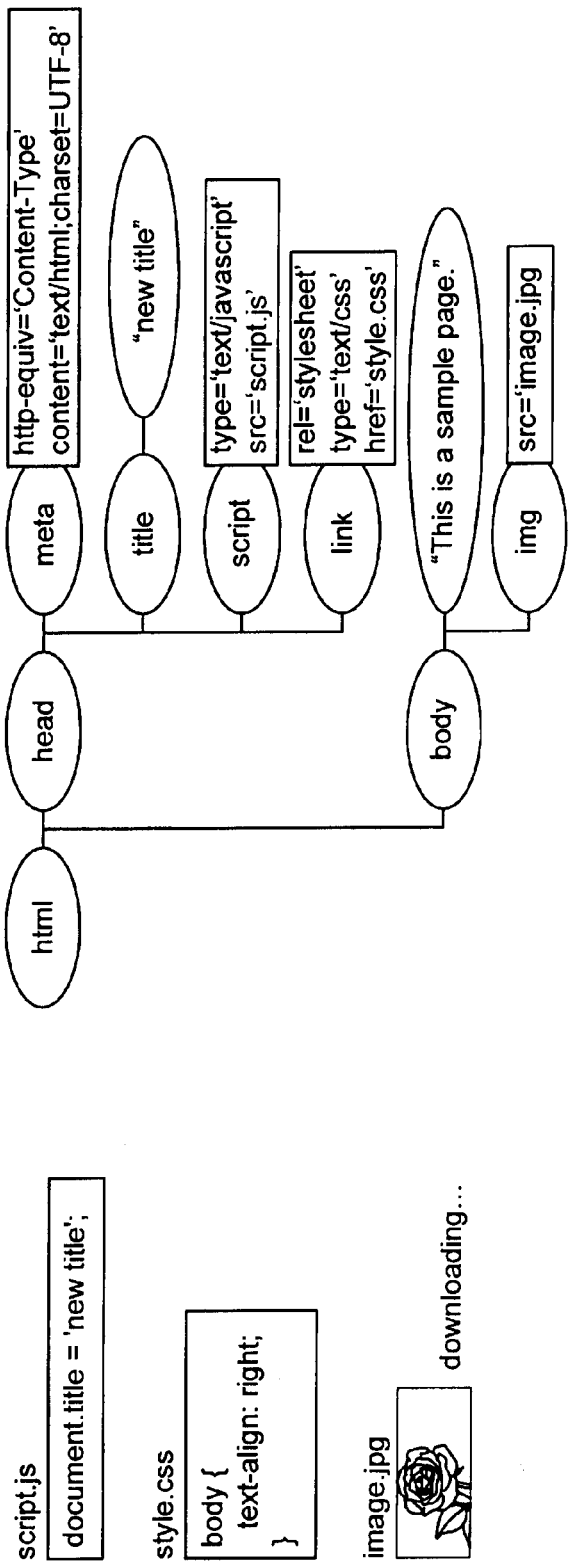
FIG. 65 is an explanatory diagram showing a flow of an HTML file execution process based on the display control method according to the embodiment.

As shown in FIG. 65, specification of image data is included in the structural unit delimited by the <body> tags. Thus, the specified image data is downloaded as shown in FIG. 65. Note that the image data that is already downloaded in the DOM building steps by the first thread is not newly downloaded. That is, what is downloaded here is image data that became newly necessary to be downloaded in the DOM building steps by the second thread. In the example of FIG. 65, the same image data as of the DOM building steps by the first thread is downloaded, and thus it is not necessary to newly download the image data.

Figure 68:
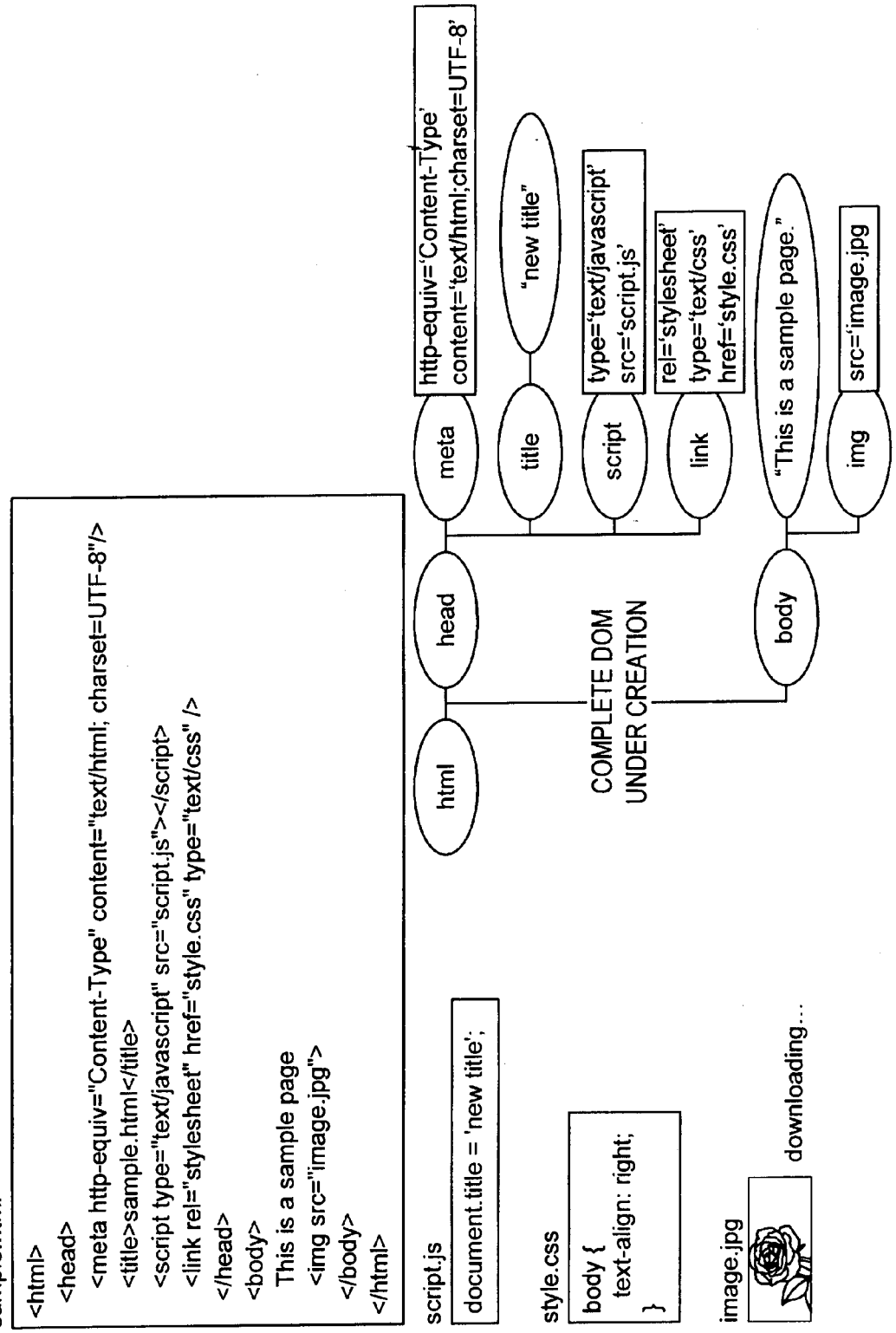
FIG. 68 is an explanatory diagram showing a flow of an HTML file execution process based on the display control method according to the embodiment.

Then, as shown in FIG. 66, a </body> tag indicating the end position of the structural unit delimited by the <body> tags is read. Also, as shown in FIG. 67, the </html> tag indicating the end position of the structural unit delimited by the <html> tags is read, and the analysis of the HTML file is ended. Thus, the creation of the complete DOM is complete, as shown in FIG. 68.

As described, in the DOM building steps by the second thread, download and execution of a script file that were skipped in the DOM building steps by the first thread are performed, and a DOM that is meant to be built (complete DOM) is created. As described above, the building steps for the complete DOM is substantially the same as the DOM building steps by a standard Web browser. That is, the complete DOM is built by reading the structural units of the HTML file including the JS in the proper order and executing the same. Accordingly, a Web page based on the complete DOM will have a layout and operation that accurately reflect the intention of the author.

As has been described, when a temporary DOM is build by the first thread, a Web page based on the temporary DOM is created by rendering the temporary DOM, and the Web page is displayed on the screen. Since processes of download and execution of a script file are not included in the building steps for the temporary DOM, a Web page based on the temporary DOM is displayed quickly. On the other hand, when the building of a complete DOM is complete, a Web page based on the complete DOM is created by rendering the complete DOM, and the Web page replaces the Web page based on the temporary DOM. Therefore, it becomes possible to browse a Web page having a structure that is actually intended by the author of the Web page.

As a result, the desire to quickly acquire necessary information and the desire to browse a Web page that accurately reflects the intention of the author of the Web page can both be fulfilled. Such configuration is especially effective in an unstable network environment such as a mobile data line. Also, application to a device with relatively high computing capability is desirable.

Additionally, expressions "first thread" and "second thread" are used, but the building processes of the temporary DOM/complete DOM do not necessarily have to be performed by two real threads. That is to say, it is not necessary to prepare two real threads and to independently perform the processing, as long as two types of processing can be logically performed. Furthermore, in the above explanation, the analysis of an HTML file and the building of a DOM based on the structural units included in the HTML file have been described, but application is also possible to the analysis of a file written in other structured language and the process of building a tree structure therefor. Such application example is, of course, within the technical scope of the present embodiment.

(Modified Example, etc.)

Heretofore, explanation has been made on the premise that a structural unit relating to script processing is included in the HTML file. However, in reality, many HTML files do not include a structural unit relating to script processing. In the case of an HTML file not including a structural unit relating to script processing, the temporary DOM and the complete DOM built from the HTML file will have the same structure.

Accordingly, if it becomes clear during the execution of the building steps for the temporary DOM that the HTML file does not include a structural unit relating to script processing, modification is made to stop the building steps for the complete DOM. Such a modification allows to not create the complete DOM, thereby reducing the computing load necessary for the creation of the complete DOM. Moreover, since the complete DOM is not created, a process of replacing the Web page based on the temporary DOM with the Web page based on the complete DOM is also omitted.

Furthermore, in the above explanation, the entire Web page was taken as the application scope of the technology according to the present embodiment. However, the above-described technology can also be performed for each tab, window or frame of a Web browser. Modification is also possible that allows specification of a domain, a URL or the like to which the technology is to be applied. Furthermore, it is also possible to select a site to which the technology is to be applied based on the length of display time detected at the time of Web browsing, and to apply the technology for a site that takes a long time to be displayed.

3: SECOND EMBODIMENT

Next, the second embodiment of the present invention will be described. The present embodiment relates to a method of acquiring in advance (prefetching) a file necessary for displaying a Web page, before the display of the Web page is requested by a user. Using this method allows to not download a file after the display of a Web page is requested by a user, and thus time taken to display a Web page can be greatly reduced.

Additionally, a method of prefetching data used for displaying a Web page from all the link destinations described in a Web page that is being browsed is already known. However, if a large number of link destinations are described in a Web page that is being browsed or if there are a large number of files for displaying a Web page at a link destination, the bandwidth will be taken up by the prefetching. Also, a high-capacity memory will be necessary to cache the prefetched files. Moreover, it is extremely difficult to appropriately select a link destination that is likely to be selected by a user, since it calls for prediction of the user's action. Furthermore, prediction of a user's action calls for high computing capability, and is difficult to realize in an information processing apparatus for which the technology according to the first embodiment described above will be useful. Thus, in the present embodiment, method of suppressing the size of a file to be prefetched will be proposed, with the use of the technology according to the first embodiment as a premise.

<3-1: Effect of Prefetching (Consideration)>

An effect of prefetching will be described here with reference to FIGS. 69 to 72.

First, reference will be made to FIG. 69. As described above, the prefetching method according to the present embodiment takes the use of the technology according to the first embodiment as its premise. That is, a method of putting the download and execution of a script file at a later sequence is taken as a premise. Therefore, prefetching of an HTML file and a CSS file for building a temporary DOM will be considered. By excluding image data and the like from the prefetching target, the amount of data to be cached by prefetching can be drastically reduced. Even with this configuration, text data is displayed in a layout that is adjusted to a certain degree, and sufficient amount of information is presented to a user in a somewhat easy-to-view format.

Figure 70:
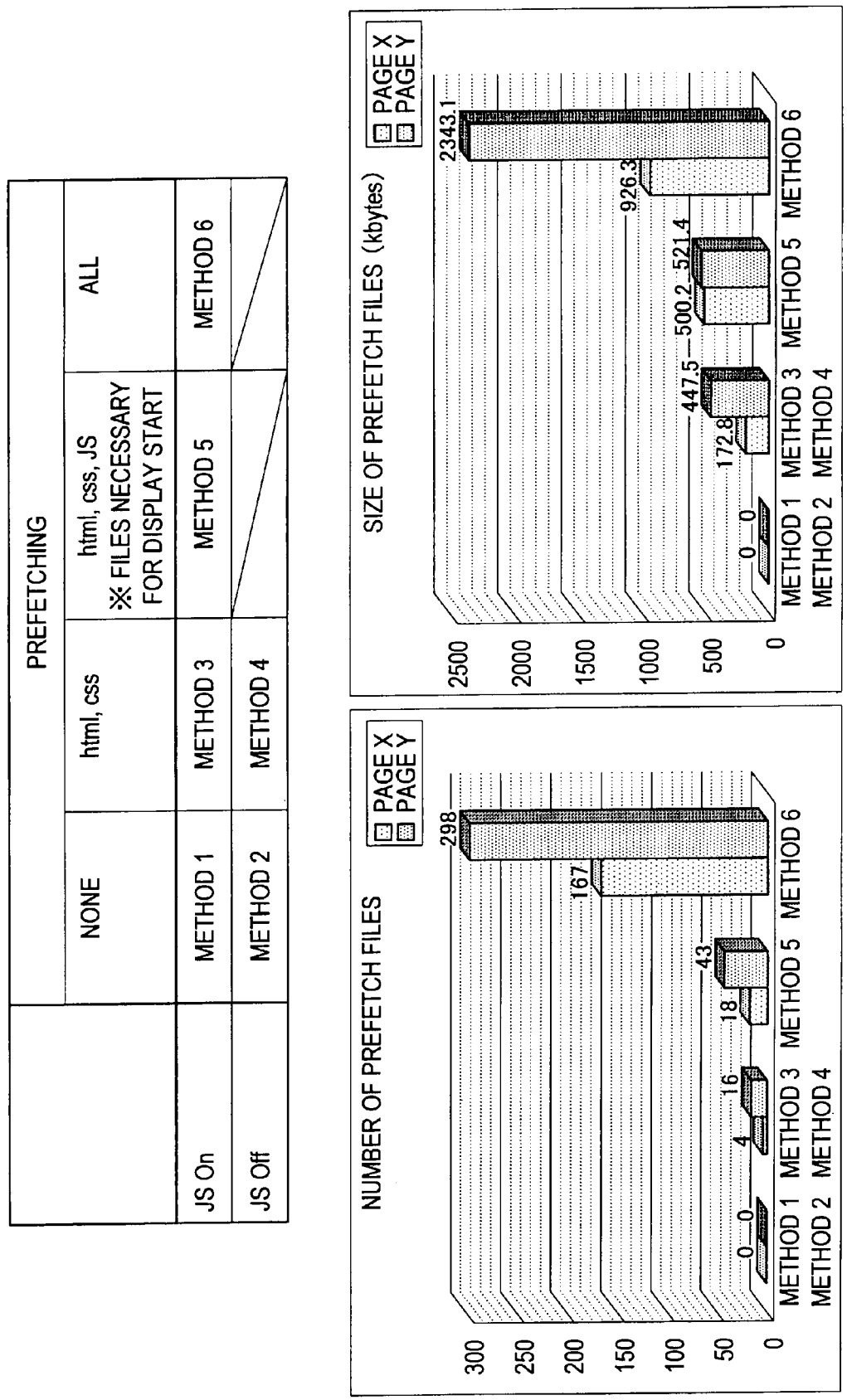
FIG. 70 is an explanatory diagram showing a difference in effects of prefetching according to types of prefetch targets.
Figure 71:
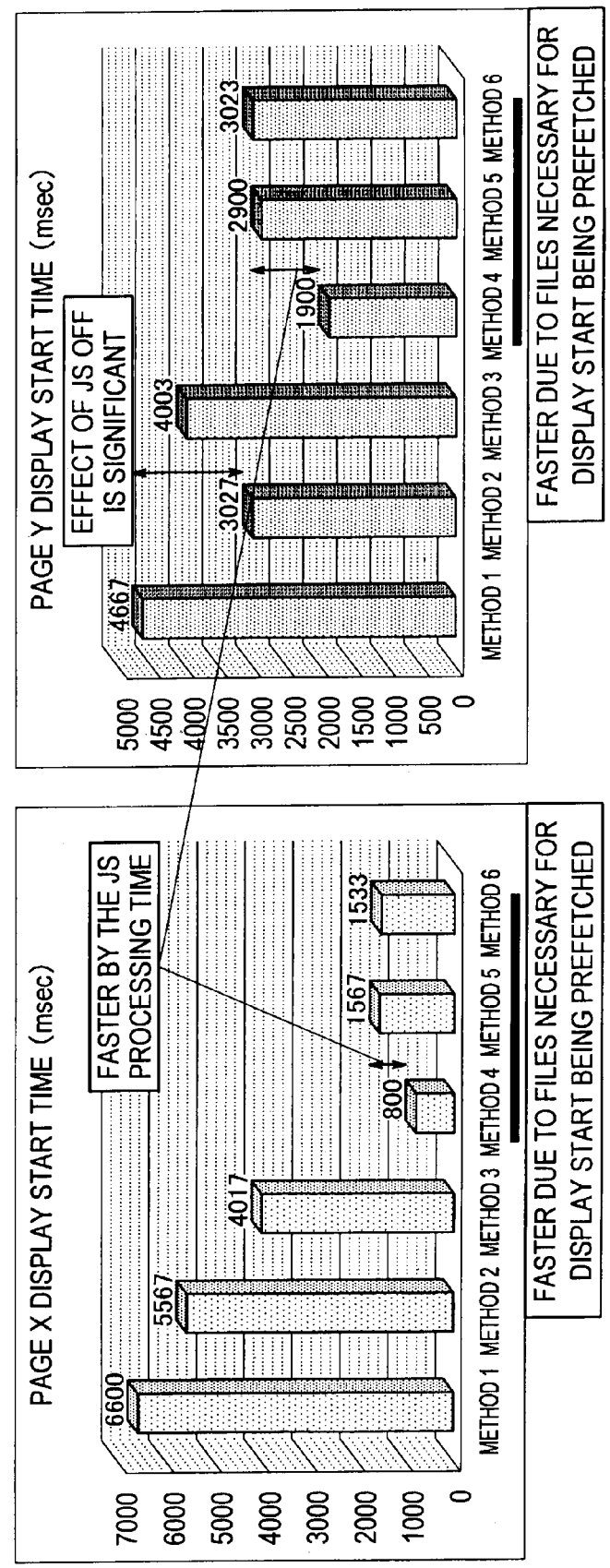
FIG. 71 is an explanatory diagram showing a difference in effects of prefetching according to types of prefetch targets.

FIGS. 70 and 71 compare four cases: (case 1) no prefetching, (case 2) prefetching of HTML file and CSS file, (case 3) prefetching of HTML file, CSS file and JS file, and (case 4) prefetching of all files.

First, reference will be made to FIG. 70. The drawing on the left in FIG. 70 compares the number of prefetched files. On the other hand, the drawing on the right in FIG. 70 compares the total size of prefetched files. As can be seen from FIG. 70, the number of files to be prefetched and the file size are significantly larger for (case 4) compared to other cases. That is, when a standard prefetching method of prefetching all the pieces of data configuring a Web page is applied, an extremely large cache memory will be necessary. On the other hand, it can be understood that, when prefetching methods of (case 2) and (case 3) are used, data to be cached can be reduced compared to the prefetching method of (case 4) where all the pieces of data are prefetched. Furthermore, when focusing on the comparison of (case 2) and (case 3), it can be seen that there is a large difference in the amount of cached data simply due to the presence/absence of JS files.

Next, reference will be made to FIG. 71. FIG. 71 compares the time until the start of display for cases where the prefetching methods of (case 1) to (case 4) are applied to two types of Web pages. Of course, the display time is short for (case 2) to (case 4) because files necessary for starting display of a Web page are prefetched. Furthermore, when comparison is made based on the presence and absence of JS processing, the time-reducing effect obtained by the absence of JS processing is significant. Of course, the level of effect obtained by omitting the JS processing is different depending on the type of the Web page, but that an effect is obtained in all cases is understood. From these results, it is expected that sufficient time-reducing effect will be obtained while saving cache memory, by the configuration of (case 2) where only the HTML file and the CSS file are prefetched.

Furthermore, by combining the present embodiment with the technology of the first embodiment and by structuring a temporary DOM from the prefetched HTML file and CSS file and displaying a Web page based on the temporary DOM, even quicker display of a Web page is expected. Additionally, as shown in FIG. 72, as a candidate for the Web page which is a prefetch target, there can be assumed (candidate 1) link destinations registered in a bookmark list, (candidate 2) a specific number of link destinations at the top of the link destinations included in a search result, (candidate 3) link destinations in a browsing page, and the like. Also, a specific number of link destinations can be selected in order from (candidate 1) to (candidate 3). Furthermore, a user may decide the combination among these candidates, and may select a specific number of link destinations from the combination.

As described above, the present embodiment proposes a method of prefetching an HTML file and a CSS file. Of course, the HTML file is only an example, and a file written in other structured language may be used instead of the HTML file. Also, the CSS file is only an example, and a file of a different format for adjusting the display layout can be used instead of the CSS file. In any case, by prefetching these two types of files, a Web page based on a temporary DOM can be quickly displayed. In the following, the prefetching method according to the present embodiment will be described in detail.

<3-2: Functional Configuration of Information Processing Apparatus 100>

Figure 73:
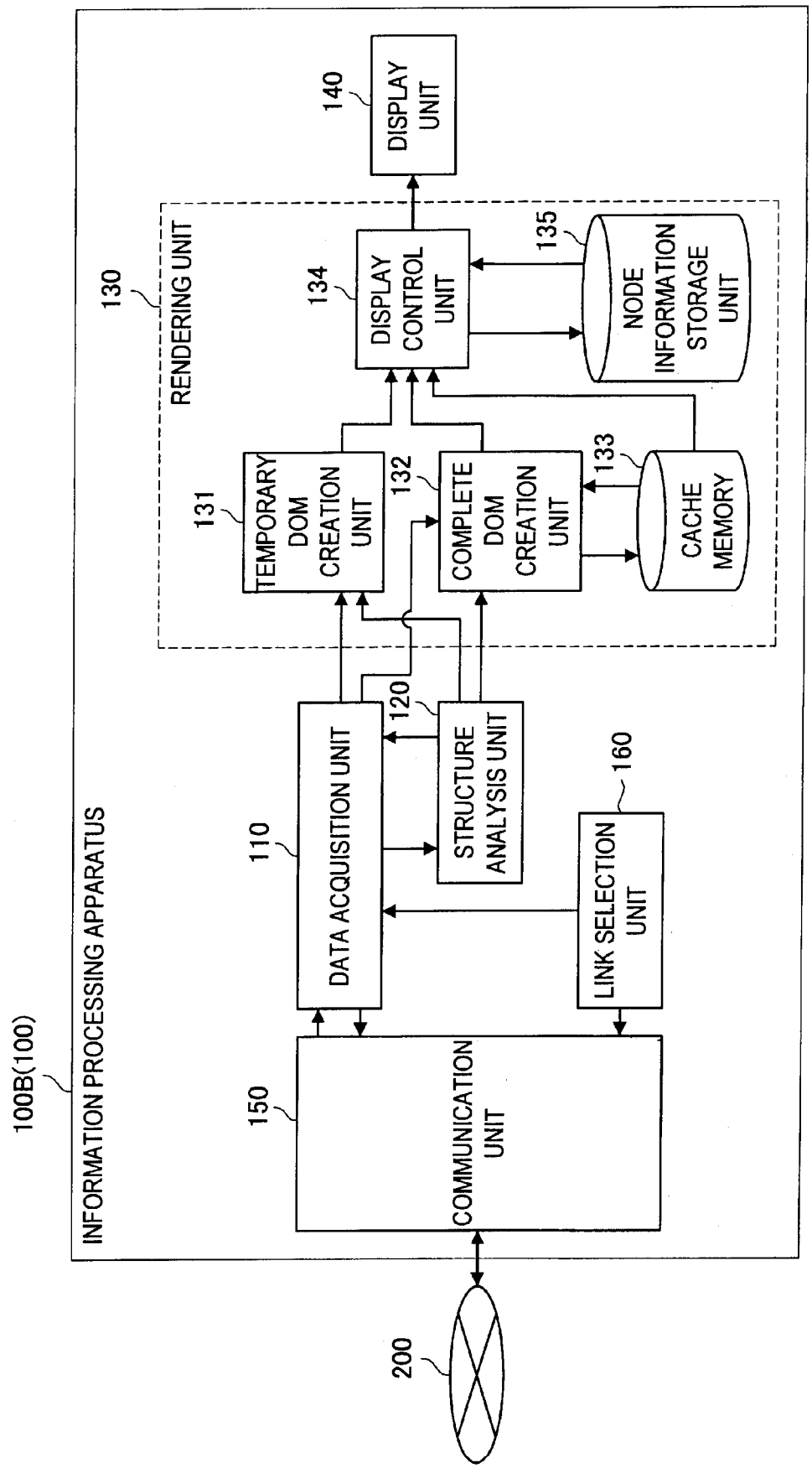
FIG. 73 is an explanatory diagram showing an example of the functional configuration of an information processing apparatus according to the embodiment.

First, the functional configuration of an information processing apparatus 100 capable of realizing the idea described above will be described with reference to FIG. 73. FIG. 73 is an explanatory diagram showing an example of the information processing apparatus 100 according to the present embodiment. Additionally, the information processing apparatus 100 according to the present embodiment is sometimes referred to as an information processing apparatus 100B to be distinguished from the information processing apparatuses 100 of the first embodiment described above and the third embodiment described later.

As shown in FIG. 73, the information processing apparatus 100 is configured mainly from a data acquisition unit 110, a structure analysis unit 120, a rendering unit 130, a display unit 140, a communication unit 150, and a link selection unit 160. Furthermore, the rendering unit 130 includes a temporary DOM creation unit 131, a complete DOM creation unit 132, a cache memory 133, a display control unit 134, and a node information storage unit 135. The main difference to the information processing apparatus 100A according to the first embodiment described above lies in the presence of the communication unit 150 and the link selection unit 160. Accordingly, in the following, the functions of the communication unit 150 and the link selection unit 160 will be mainly described.

The communication unit 150 is means for communicating with the Web servers 310 and 320 via a network 200. Additionally, to download a file from the Web server 310 or 320, a DNS server has to be accessed, and name resolution has to be performed or a TCP connection has to be established. Also, a redirect has to be acquired from the Web servers 310 and 320. The communication unit 150 performs, as appropriate, the processes mentioned above and the like regarding the communication with the Web servers 310 and 320.

Furthermore, the link selection unit 160 is means for selecting a link destination to be a prefetch target. As described above, as link destinations which are prefetch targets, there can be assumed (candidate 1) link destinations registered in a bookmark list, (candidate 2) a specific number of link destinations at the top of the link destinations included in a search result, (candidate 3) link destinations in a browsing page, and the like. For example, when (candidate 2) is set, the link selection unit 160 selects a specific number of link destinations included in a search result output from a search engine. Also in the case of (candidate 1) and (candidate 3), the link selection unit 160 selects a specific number of link destinations.

Furthermore, the link selection unit 160 assigns a selected link destination with a type of prefetching according to a specific rule. For example, the link selection unit 160 assigns a first method of prefetching an HTML file and a CSS file for top N1 link destinations, and assigns a second method of prefetching a redirect for the next N2 link destinations. Also, the link selection unit 160 assigns, to the Web servers 310 and 320 corresponding to the next N3 link destinations, a third method of establishing a TCP connection in advance, or assigns a fourth method of performing name resolution through DNS in advance. In the following, the first method, the second method, the third method and the fourth method will be respectively referred to as file prefetching, redirect prefetching, pre-connection and DNS prefetching.

Information on the link destinations selected by the link selection unit 160 and the type of prefetching assigned to each link destination are input to the data acquisition unit 110 and the communication unit 150.

For example, information on a link destination assigned to file prefetching or redirect prefetching is input to the data acquisition unit 110. When information on a link destination assigned to file prefetching is input, the data acquisition unit 110 downloads an HTML file and a CSS file from the link destination indicated by the input information on the link destination, and caches the same. On the other hand, when information on a link destination assigned to redirect prefetching is input, the data acquisition unit 110 acquires a redirect code from the link destination indicated by the input information on the link destination, and proceeds to read the URL of the redirect destination as appropriate.

Furthermore, information on a link destination assigned to pre-connection or DNS prefetching is input to the communication unit 150. When information on a link destination assigned to pre-connection is input, the communication unit 150 establishes a TCP connection to the link destination indicated by the input information on the link destination. Note that, in the case of pre-connection, download or the like of a file is not performed. On the other hand, when information on a link destination assigned to DNS prefetching is input, the communication unit 150 performs name resolution for connecting to the link destination indicated by the input information on the link destination. Note that, in the case of DNS prefetching, processing does not go as far as establishment of a TCP connection.

The above-described file prefetching, redirect prefetching, pre-connection and DNS prefetching are performed before a link destination is specified by a user. In a case file prefetching is to be performed, after acquisition of an HTML file, analysis of the HTML file is performed, and download of a CSS file is performed as appropriate. Then, when a link destination is specified by a user, building of a temporary DOM and a complete DOM are started by the rendering unit 130. The building method of the temporary DOM and the complete DOM, and the processes of display and switching of Web pages are substantially the same as those of the information processing apparatus 100A according to the first embodiment described above. Accordingly, detailed explanation will be omitted.

Heretofore, the functional configuration of the information processing apparatus 100 according to the present embodiment has been described.

<3-3: Operation of Information Processing Apparatus 100>

Figure 74:
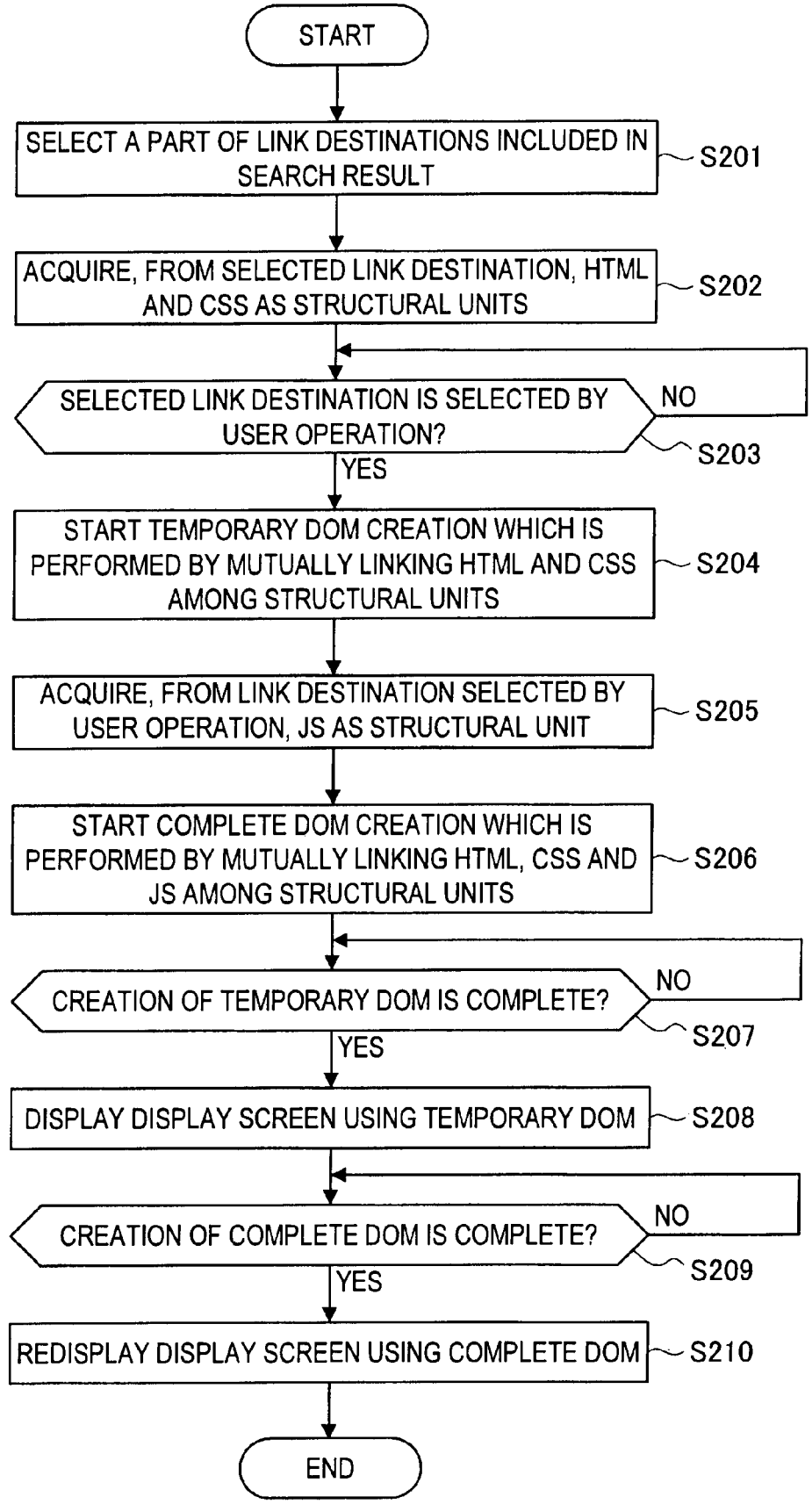
FIG. 74 is an explanatory diagram showing a flow of a prefetch process by the information processing apparatus according to the embodiment.

Next, the operation of the information processing apparatus 100 according to the present embodiment will be described with reference to FIG. 74. FIG. 74 is an explanatory diagram showing an operational flow of the information processing apparatus 100 according to the present embodiment. Note that the operational flow shown in FIG. 74 relates to a configuration of selecting a specific number of link destinations from a result of search by a search engine and performing file prefetching.

As shown in FIG. 74, first, the information processing apparatus 100 selects a part of link destinations included in a search result (step S201). Next, the information processing apparatus 100 downloads HTML files and CSS files from the selected link destinations (step S202). Then, the information processing apparatus 100 determines whether or not any of the selected link destinations is selected by a user (step S203). When a link destination is selected by the user, the information processing apparatus 100 proceeds to the process of step S204. On the other hand, when no link destination is selected by the user, the information processing apparatus 100 returns to the process of step S203.

In a case it proceeded to the process of step S204, the information processing apparatus 100 analyses the HTML file that has been downloaded and cached in advance by file prefetching, and starts creating a temporary DOM by mutually linking each structural unit relating to the description of the HTML and a structural unit relating to a CSS file (step S204). Then, the information processing apparatus 100 downloads a JS file from the link destination selected by the user (step S205). Then, the information processing apparatus 100 starts creating a complete DOM by using the HTML file, the CSS file, and the JS file (step S206).

Then, the information processing apparatus 100 determines whether or not the creation of the temporary DOM is complete (step S207). In a case the creation of the temporary DOM is complete, the information processing apparatus 100 proceeds to the process of step S208. On the other hand, in a case the creation of the temporary DOM is not complete, the information processing apparatus 100 returns to the process of step S207. In a case it proceeded to the process of step S208, the information processing apparatus 100 creates a Web page by rendering the temporary DOM, and displays the created Web page on the display screen (step S208).

Then, the information processing apparatus 100 determines whether or not the creation of the complete DOM is complete (step S209). In a case the creation of the complete DOM is complete, the information processing apparatus 100 proceeds to the process of step S210. On the other hand, in a case the creation of the complete DOM is not complete, the information processing apparatus 100 returns to step S209. In a case it proceeded to step S210, the information processing apparatus 100 creates a Web page by rendering the complete DOM, replaces the Web page based on the temporary DOM with the Web page based on the complete DOM (step S210), and ends the series of processes.

Heretofore, the operational flow of the information processing apparatus 100 according to the present embodiment has been described.

<3-4: Flow of Prefetch Process>

Figure 75:
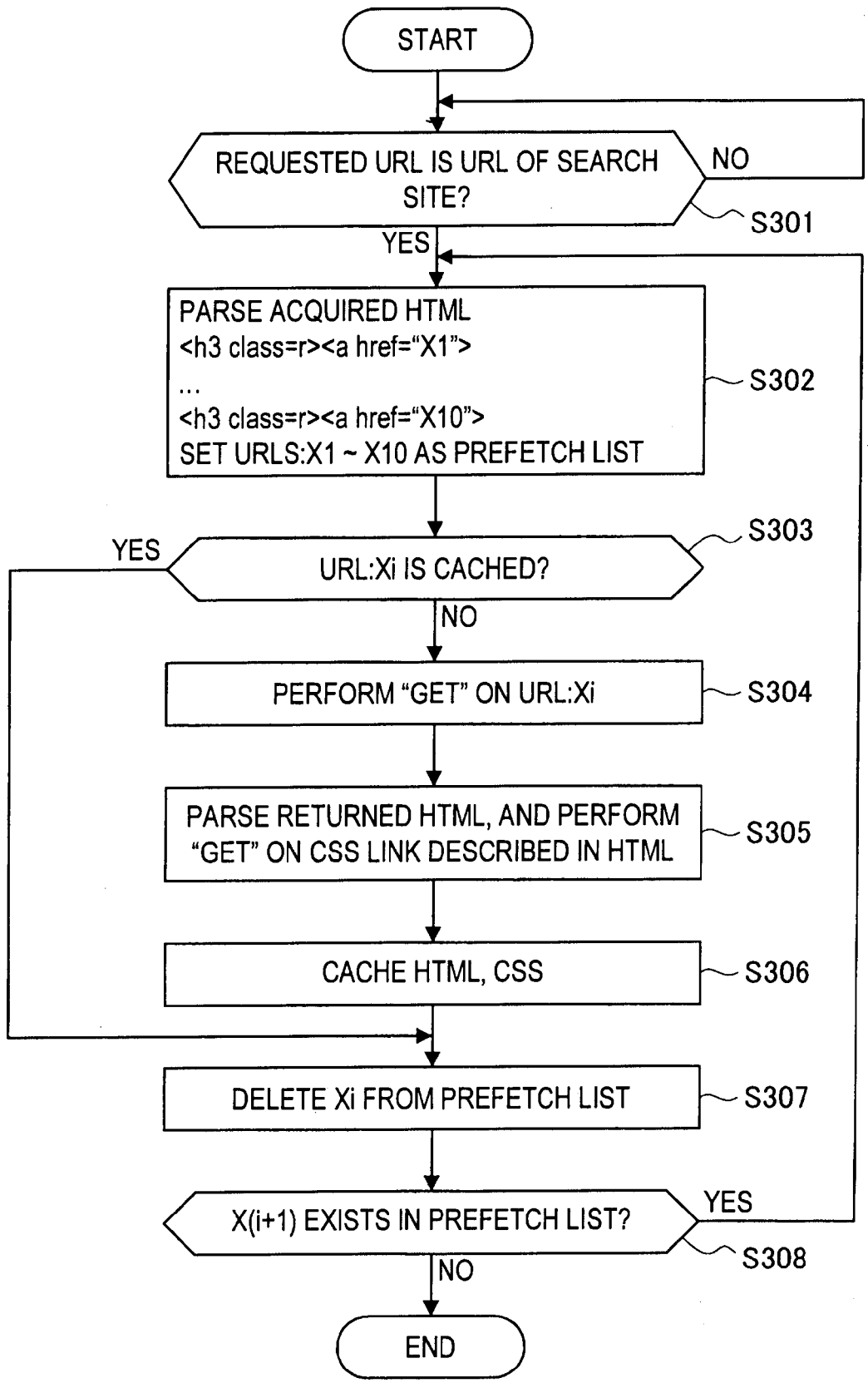
FIG. 75 is an explanatory diagram showing a flow of a prefetch process according to the embodiment.

Next, a flow of a prefetch process according to the present embodiment will be described with reference to FIG. 75. FIG. 75 is an explanatory diagram showing a flow of a prefetch process according to the present embodiment. Additionally, the process shown in FIG. 75 is performed by the information processing apparatus 100.

As shown in FIG. 75, first, whether or not a requested URL is a URL of a search site is determined (step S301). In a case it is a URL of a search site, the process proceeds to step S302. On the other hand, in a case it is not a URL of a search site, the process returns to step S301. In a case the process proceeded to step S302, an acquired HTML file of the search site is parsed, and a list of link destinations to be prefetched (hereinafter, prefetch list) is extracted (step S302). Then, whether or not an i-th URL (Xi) among the extracted link destinations is already cached is determined (step S303). In a case Xi is cached, the process proceeds to step S307. On the other hand, in a case Xi is not cached, the process proceeds to step S304.

In a case the process proceeded to step S304, a command (GET) for acquiring an HTML file from Xi is issued, and the HTML file is acquired (step S304). Then, the acquired HTML file is parsed, and the link destination of a CSS file written in the HTML file is extracted (step S305). Furthermore, a command (GET) for acquiring the CSS file is issued, and the CSS file is acquired (step S305). Then, the acquired HTML file and CSS file are cached (step S306). Then, Xi is deleted from the prefetch list (step S307). Then, whether or not there is an i+1-th URL (X(i+1)) in the prefetch list is determined (step S308). In a case there is X(i+1), the process returns to step S303. On the other hand, in a case there is no X(i+1), the series of processes is ended.

Heretofore, a flow of the prefetch process according to the present embodiment has been described. Additionally, the prefetch process is cancelled at the stage of the user clicking a URL link.

<3-5: Effect of Prefetching>

Figure 76:
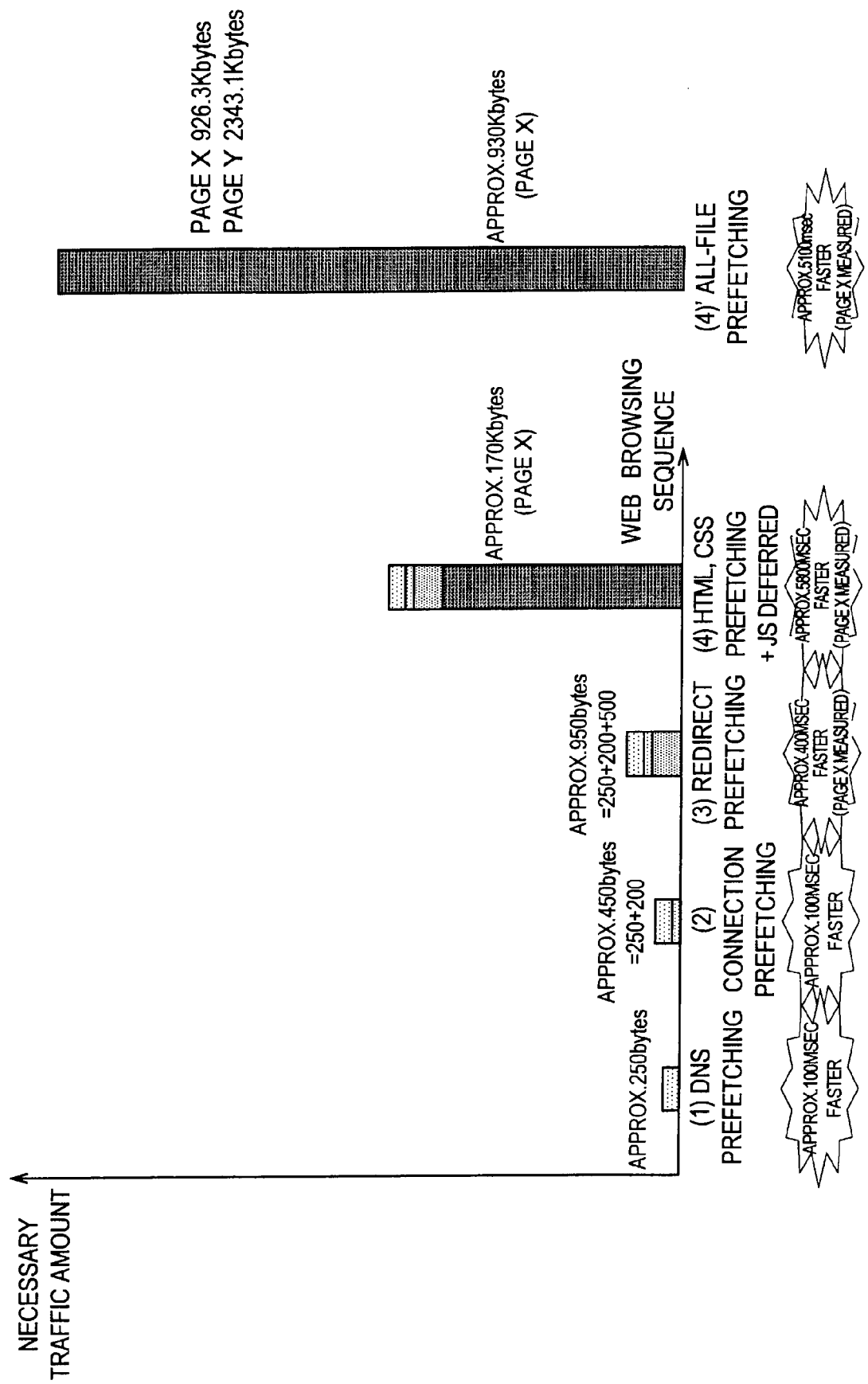
FIG. 76 is an explanatory diagram showing a difference in effects according to types of prefetching.

Next, an effect of the above-described prefetching will be described with reference to FIG. 76. FIG. 76 shows a comparison between the effects of DNS prefetching, pre-connection (connection prefetching), redirect prefetching, file prefetching, and all-file prefetching. As shown in FIG. 76, necessary traffic amount for file prefetching according to the present embodiment is significantly less than in the case of prefetching all the files. The effects of DNS prefetching, pre-connection and redirect prefetching are also noticeable. That is, by applying the prefetching according to the present embodiment, increase in the traffic amount caused by prefetching can be suppressed. It can also be understood from the comparison between the display times of pages that there is no large difference in the effects of the file prefetching according to the present embodiment and prefetching of all files. As described, by making good use of the file prefetching according to the present embodiment, the speed of display of a Web page can be sufficiently increased, and at the same, wasteful use of memory capacity or of occupied bandwidth due to prefetching can be reduced.

<3-6: Effect of Pre-Connection (Consideration)>

Next, a case of applying the pre-connection described above will be considered with reference to FIGS. 77 to 80. As described above, by using the file prefetching method and the display method of a Web page based on the temporary DOM according to the present embodiment, a Web page can be quickly displayed in an easy-to-view format even if an unstable low-speed line is used. Also, an increase in the traffic amount due to prefetching can be prevented as much as possible, and communication cost can be cut down. As has been already stated, it is not sensible to apply file prefetching to all the link destinations. For example, it is not efficient to apply file prefetching to a link destination which is unlikely to be selected by a user. Accordingly, a method of further reducing the traffic amount due to prefetching by effectively combining pre-connection with prefetching will be considered.

As shown in FIG. 77, it is desirable that a TCP connection to the host of a link destination is established in advance before a user clicks the link destination included in a Web page that is being displayed. It is also effective to have a TCP connection to the host of a specified link destination established during the input of an URL by the user. Furthermore, it is also desirable to have the type of a link destination that is highly probable to be clicked by the user in the near future determined, and to apply pre-connection to a link destination of that type, as shown in FIG. 78. As shown in FIG. 78, the link destination that is highly probable to be clicked by the user may be, for example, (selection candidate 1) a link destination displayed in the upper part of a screen showing search results, (selection candidate 2) a link destination displayed on a screen that is being browsed, (selection candidate 3) a link destination that is frequently accessed, in the browsing history, or (selection candidate 4) a link destination near the position of an operating tool that a user is operating, such as a mouse pointer.

Furthermore, it is also conceivable to select a link destination for which the effect obtained by applying the technology of the first embodiment described above and the prefetching or pre-connection according to the present embodiment is large. In this case, a selection target is decided based on, for example, a specific domain, a country, an actually measured response time, history of connection establishment times, and the like. As shown in FIGS. 79 and 80, the connection establishment time greatly varies depending on the TLD (Top Level Domain) of the link destination URL or the country the link destination host is located. FIG. 79 compares the connection establishment times in the case of connection from Japan to link destinations of URLs having respective TLDs. FIG. 80 compares the connection establishment times at the time of connecting from Japan to link destination hosts of respective countries. It can be understood from these results that the effect of performing pre-connection is great in the case of a foreign link destination. That is, flexible application of extracting a foreign link destination and performing pre-connection on the link destination and of performing file prefetching for a domestic link destination is effective.

Heretofore, the second embodiment of the present invention has been described.

4: THIRD EMBODIMENT

Next, the third embodiment of the present invention will be described. The present embodiment relates to a method of performing prefetching (or pre-connection) at an appropriate timing by using a touch panel that is capable of detecting a proximity distance of an operating tool. This method is based on the technology according to the first and second embodiments, and is for improving the usefulness of the technology.

<4-1: Integration of Proximity Detection and Prefetch Process>

First, an overview of a prefetching method according to the present embodiment will be described with reference to FIG. 81. As described above, the prefetching method according to the present embodiment is realized by using a touch panel that is capable of proximity detection. The proximity detection here means detection of the degree of closeness of an operating tool in a case an operating tool such as a finger or a stylus nears the surface of the touch panel. That is, the touch panel assumed here has a function of detecting information corresponding to the distance between the operating tool and the touch panel. Additionally, a concrete example of such touch panel will be described later.

Figure 81:
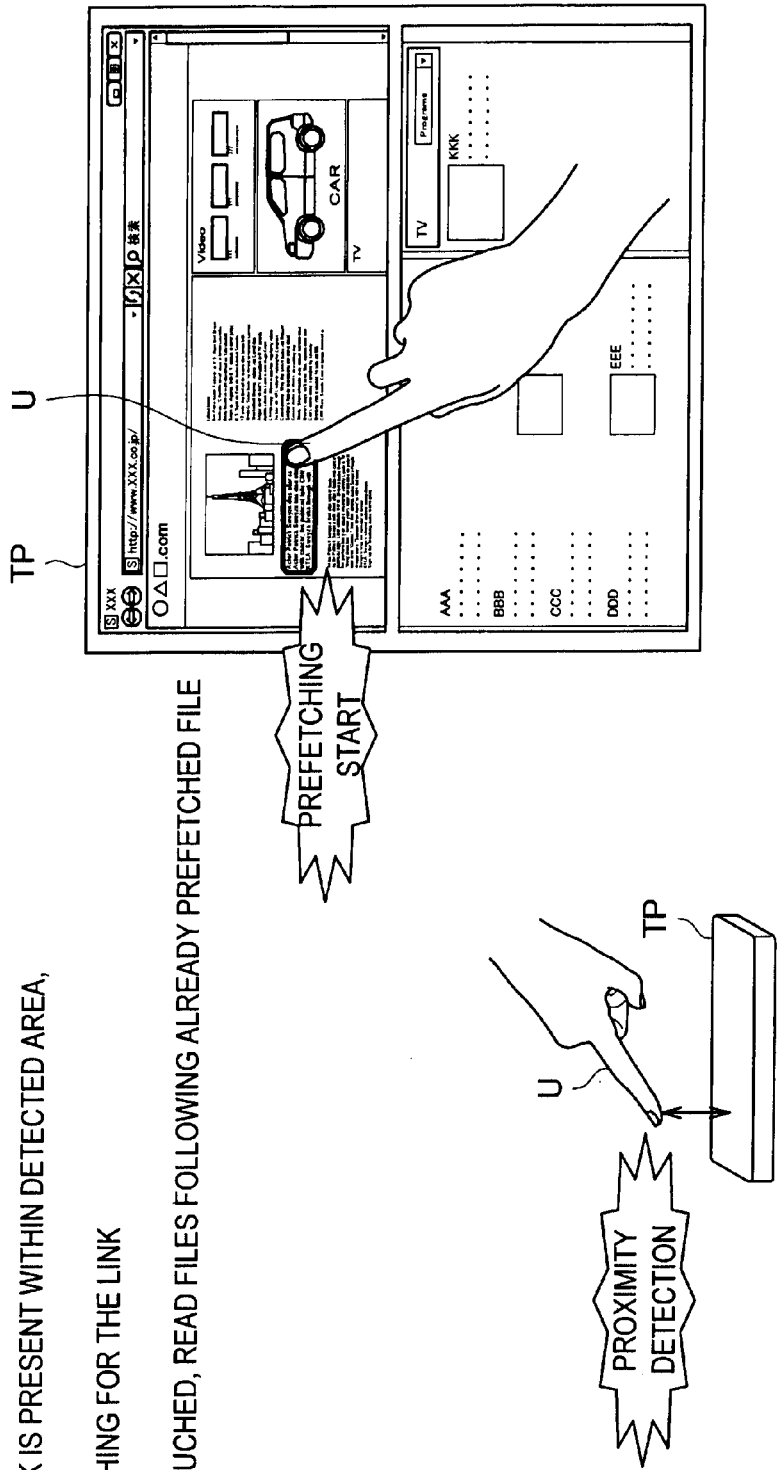
FIG. 81 is an explanatory diagram showing an overview of a prefetching method based on a proximity distance according to the third embodiment of the present invention.

Now, as shown in FIG. 81, the mechanism of the prefetching according to the present embodiment is to perform prefetching of a link destination displayed within an area for which proximity is detected. For example, file prefetching is started when the distance between an operating tool and the touch panel becomes shorter than a specific threshold, and a Web page is displayed, by using a file that is cached, at a stage a link destination is touched. Note that the file prefetching that is performed here is for prefetching only an HTML file and a CSS file as with the second embodiment. Furthermore, at the time of displaying a Web page, display of a Web page based on a temporary DOM and replacement with a Web page based on a complete DOM are performed as with the first embodiment.

Additionally, a major difference between the mechanism of the prefetching according to the present embodiment and the mechanism of the prefetching according to the second embodiment lies in the method of selecting a link destination to be the target of prefetching. According to the prefetching method of the second embodiment, a specific number of link destinations in a page that is being browsed are selected, or a specific number of link destinations are selected from a search result. However, according to the prefetching method of the present embodiment, the link destination within an area to which an operating tool is neared is selected as the target of prefetching. Therefore, the number of link destinations to be selected is reduced, thereby causing the data amount to be cached to be reduced than the prefetching method according to the second embodiment. However, since the execution time of the prefetch process becomes relatively short, it is sometimes better to combine prefetching with pre-connection as appropriate.

For example, it is sometimes more preferable to perform step-by-step processing of starting pre-connection when the distance between the operating tool and the touch panel becomes shorter than a threshold L1, and starting file prefetching when the distance becomes shorter that a threshold L2 (L2<L1). It is also possible to start file prefetching in a case a state where the distance is shorter than the threshold L1 is maintained for a specific time or more. According to this configuration, file prefetching can be completed while a user is wondering whether to select a link destination or not, and a Web page based on a temporary DOM can be displayed immediately after user selection is performed.

Heretofore, an overview of the prefetching method according to the present embodiment has been described.

<4-2: Functional Configuration of Information Processing Apparatus 100>

Figure 82:
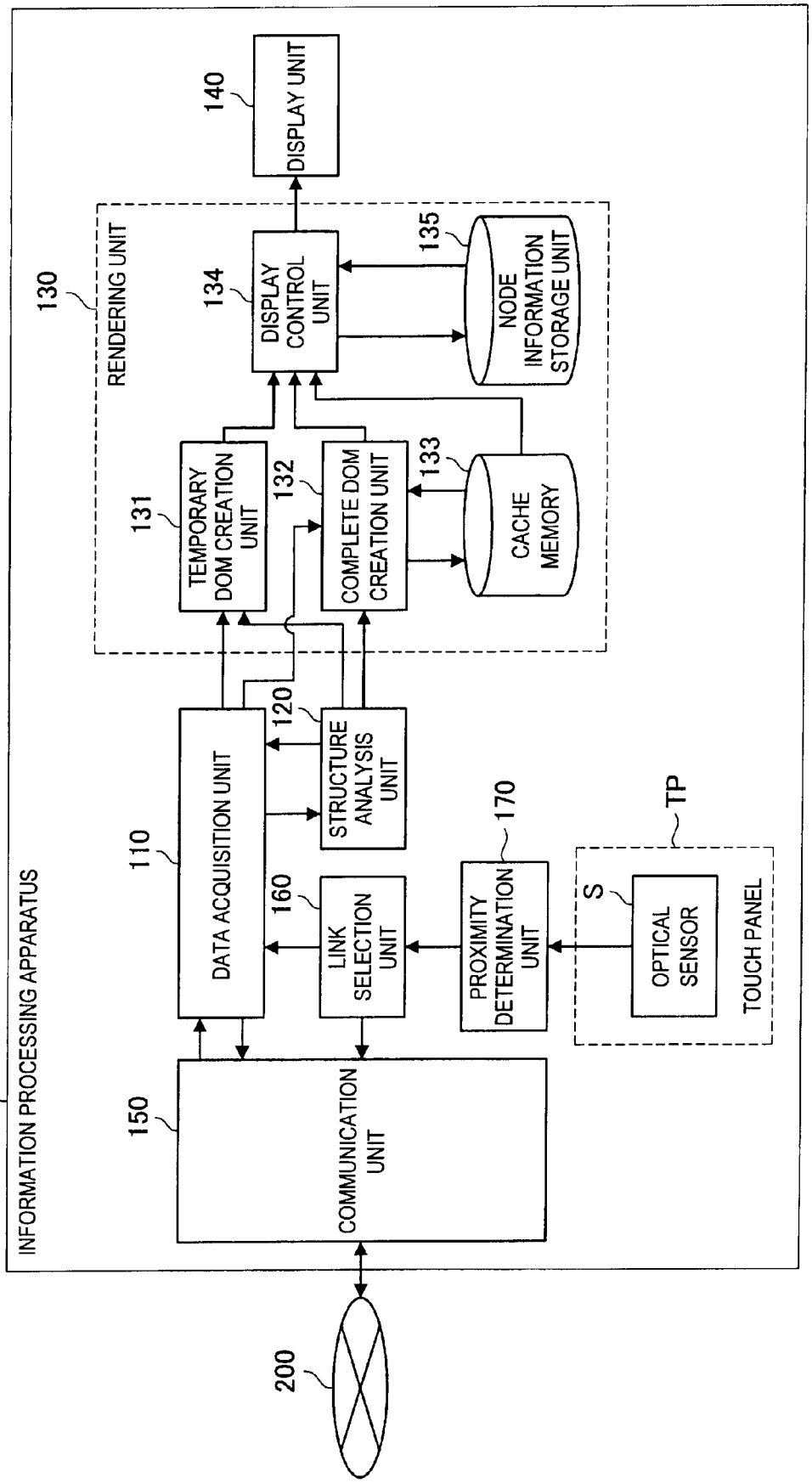
FIG. 82 is an explanatory diagram showing an example of the functional configuration of an information processing apparatus according to the embodiment.

Next, the functional configuration of the information processing apparatus 100 that is capable of realizing the above idea will be described with reference to FIG. 82. FIG. 82 is an explanatory diagram showing an example of the functional configuration of the information processing apparatus 100 according to the present embodiment. Additionally, to distinguish from the information processing apparatuses 100 according to the second and third embodiments, the information processing apparatus 100 according to the present embodiment may be sometimes referred to as an information processing apparatus 100C.

As shown in FIG. 82, the information processing apparatus 100 is mainly configured from a data acquisition unit 110, a structure analysis unit 120, a rendering unit 130, a display unit 140, a communication unit 150, a link selection unit 160, a proximity determination unit 170, and a touch panel TP. Furthermore, the rendering unit 130 includes a temporary DOM creation unit 131, a complete DOM creation unit 132, a cache memory 133, a display control unit 134, and a node information storage unit 135. The main difference to the information processing apparatus 100B according to the second embodiment described above lies in the presence of the proximity determination unit 170 and the touch panel TP. Furthermore, the function of the link selection unit 160 is partially changed. Accordingly, in the following, the functions of the proximity determination unit 170 and the touch panel TP will be mainly described.

First, an explanation will be given on the touch panel TP. The touch panel TP includes an optical sensor S. Also, although shown separately in FIG. 82, the touch panel TP and the display unit 140 are, in many cases, integrally formed. As described above, the touch panel TP has a function of detecting the nearing of an operating tool. This function is achieved by detecting, by the optical sensor S, reflected light of light emitted on the operating tool from a light source provided in the touch panel TP (or backlight of the display unit 140). For example, the stronger the light reflected by the operating tool, the nearer to the touch panel TP is the operating tool determined to be. Note that this determination is made by the proximity determination unit 170.

Additionally, an example is shown in FIG. 82 where an optical touch panel is used as the touch panel TP. However, any type of touch panel can be used as long as it is capable of proximity detection. For example, a capacitive touch panel that detects the position of an operating tool by sensing the change in the capacitance between the operating tool and a conductive layer provided on the screen can also be used. In the case of the capacitive touch panel, the proximity distance of the operating tool can be determined by monitoring the capacitance that increases as the operating tool nears the screen. Additionally, in the following, explanation will be given taking an optical touch panel as an example, for the sake of explanation.

The proximity determination unit 170 estimates the distance between an operating tool and the touch panel TP based on the intensity of reflected light detected by the optical sensor S. Also, the proximity determination unit 170 determines, based on the intensity distribution of the reflected light, the position of the operating tool, the size of a shadow formed by the operating tool and the region of the shadow formed by the operating tool. The shadow here means a shadow formed due to the light emitted from the light source being intercepted by the operating tool where the operating tool is seen from a position facing the touch panel TP with the operating tool in-between. Of course, it is not recognized as a shadow by the optical sensor S, but the expression "shadow" is used here so that an image formed by the operating tool will be easy to picture. Moreover, it can also be said that the larger the size of the shadow, the shorter the distance between the operating tool and the touch panel TP.

Information indicating the position of the operating tool (hereinafter, position information), information indicating the region of a shadow formed by the operating tool (hereinafter, region information), and information indicating the distance between the operating tool and the touch panel TP (hereinafter, distance information) are input to the link selection unit 160 by the proximity determination unit 170. When the position information, the region information and the distance information are input, the link selection unit 160 determines whether or not a link destination is displayed in the area on the screen indicated by the region information. In a case a link destination is displayed, the link selection unit 160 selects the link destination that is displayed and, at the same, refers to the distance information, and determines whether or not the distance between the operating tool and the touch panel TP is shorter than a specific threshold. In a case the distance is shorter than the specific threshold, the link selection unit 160 assigns a type of prefetching to the selected link destination, and inputs information on the link destination to the data acquisition unit 110 or the communication unit 150. Additionally, the operations of the data acquisition unit 110 and the communication unit 150 are substantially the same as those of the first and second embodiments.

Now, there are several methods of assigning a type of prefetching to a link destination. First, the most basic method is to start file prefetching in a case the distance from the operating tool becomes less than the specific threshold. For example, although it will be a little more complicated, in a case multiple link destinations are included in the region information, a method can be conceived of assigning, according to the distance from the position information indicating the centre position of the shadow formed by the operating tool, file prefetching to a link destination which is close and pre-connection to a link destination which is distant. Furthermore, there can be conceived a method of preparing two specific thresholds, and changing the type of prefetching to be assigned to a link destination such that pre-connection is started in a case the distance from the operating tool becomes less than the first threshold L1 and prefetching is started in a case the distance from the operating tool becomes less than the second threshold L2 (L2<L1). This assignment process is performed by the link selection unit 160.

Additionally, the link selection unit 160 may also determine whether or not to perform file prefetching, according to the time the operating tool is in proximity to a link destination. For example, it is possible to have file prefetching performed only in a case a specific time has passed in a state where the operating tool is nearer, than a specific threshold, to the screen at a position above a certain link destination. It is also possible to perform pre-connection after a state where the operating tool stays nearer, than a specific threshold, to the screen at a position above a certain link destination is maintained for a specific time and file prefetching is performed on the link destination, the pre-connection being performed on link destinations within a specific range of the above-mentioned link destination. Furthermore, in a case there are multiple link destinations for which pre-connection is to be performed, the link selection unit 160 may set the order of performing pre-connection according to a specific standard. For example, the link connection unit 160 may perform pre-connection at an earlier stage for a link destination that has been selected specific times or more. The link selection unit 160 may also perform pre-connection at an earlier stage for a link destination, the round-trip time of which is longer than a specific threshold. The link selection unit 160 may also set the order of performing pre-connection according to the domain name or the IP address of the link destination. The processes relating to the determination and execution control are performed by the link selection unit 160.

Heretofore, the functional configuration of the information processing apparatus 100 according to the present embodiment has been described.

<4-3: Operation of Information Processing Apparatus 100>

Figure 83:
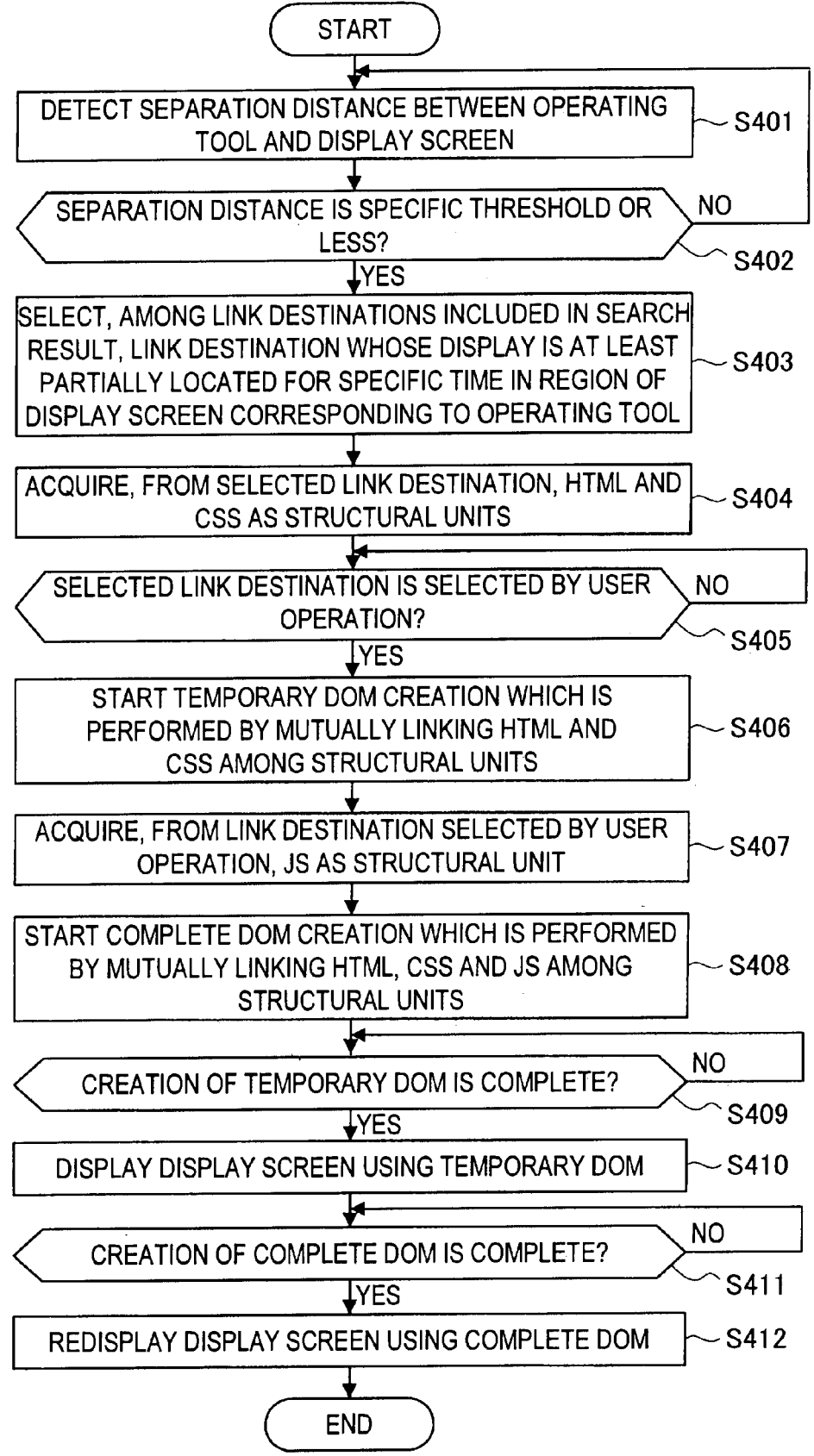
FIG. 83 is an explanatory diagram showing a flow of a proximity detection process and prefetch process by the information processing apparatus according to the embodiment.

Next, an operation of the information processing apparatus 100 according to the present embodiment will be described with reference to FIG. 83. FIG. 83 is an explanatory diagram showing an operational flow of the information processing apparatus 100 according to the present embodiment. Note that the operational flow shown in FIG. 83 relates to a configuration of selecting a specific number of link destinations from a result of search by a search engine and of performing file prefetching.

As shown in FIG. 83, first, the information processing apparatus 100 detects the distance between an operating tool and the display screen (hereinafter, separation distance) (step S401). Then, the information processing apparatus 100 determines whether or not the detected separation distance is a specific threshold or less (step S402). In a case the separation distance is the specific threshold or less, the information processing apparatus 100 proceeds to the process of step S403. On the other hand, in a case the separation distance is not the specific threshold or less, the information processing apparatus 100 returns to the process of step S401. In a case it proceeded to the process of step S403, the information processing apparatus 100 selects a link destination whose display is at least partially included in a region corresponding to the shadow of an operating tool, among link destinations included in a search result (step S403).

Next, the information processing apparatus 100 downloads an HTML file and a CSS file from the selected link destination (step S404). Then, the information processing apparatus 100 determines whether or not the selected link destination is selected by the user (step S405). In a case the link destination is selected, the information processing apparatus 100 proceeds to the process of step S406. On the other hand, in a case the link destination is not selected, the information processing apparatus 100 returns to the process of step S405. In a case it proceeded to the process of step S406, the information processing apparatus 100 analyses the HTML file that was acquired in advance, and starts creating a temporary DOM by mutually linking structural units relating to the HTML description and a structural unit relating to the CSS file (S406).

Next, the information processing apparatus 100 acquires a JS file from the link destination selected by the user (S407). Then, the information processing apparatus 100 starts creating a complete DOM by mutually linking the structural units relating to the HTML description, the structural unit relating to the CSS file and a structural unit relating to the JS file, based on the analysis result of the HTML file that has been acquired in advance (step S408). Next, the information processing apparatus 100 determines whether or not the creation of the temporary DOM is complete (step S409). In a case the creation of the temporary DOM is complete, the information processing apparatus 100 proceeds to the process of step S410. On the other hand, in a case the creation of the temporary DOM is not complete, the information processing apparatus 100 returns to the process of step S409.

In a case it proceeded to the process of step S410, the information processing apparatus 100 creates a Web page by rendering the temporary DOM, and displays, on the display screen, the created Web page based on the temporary DOM (step S410). Then, the information processing apparatus 100 determines whether or not the creation of the complete DOM is complete (step S411). In a case the creation of the complete DOM is complete, the information processing apparatus 100 proceeds to the process of step S412. On the other hand, in a case the creation of the complete DOM is not complete, the information processing apparatus 100 returns to the process of step S411. In a case it proceeded to the process of step S412, the information processing apparatus 100 creates a Web page by rendering the complete DOM, displays, on the display screen, the created Web page based on the complete DOM instead of the Web page based on the temporary DOM (S412), and ends the series of processes.

Heretofore, the operational flow of the information processing apparatus 100 according to the present embodiment has been described.

<4-4: Flow of Prefetch Process based on Proximity Detection>

Figure 84:
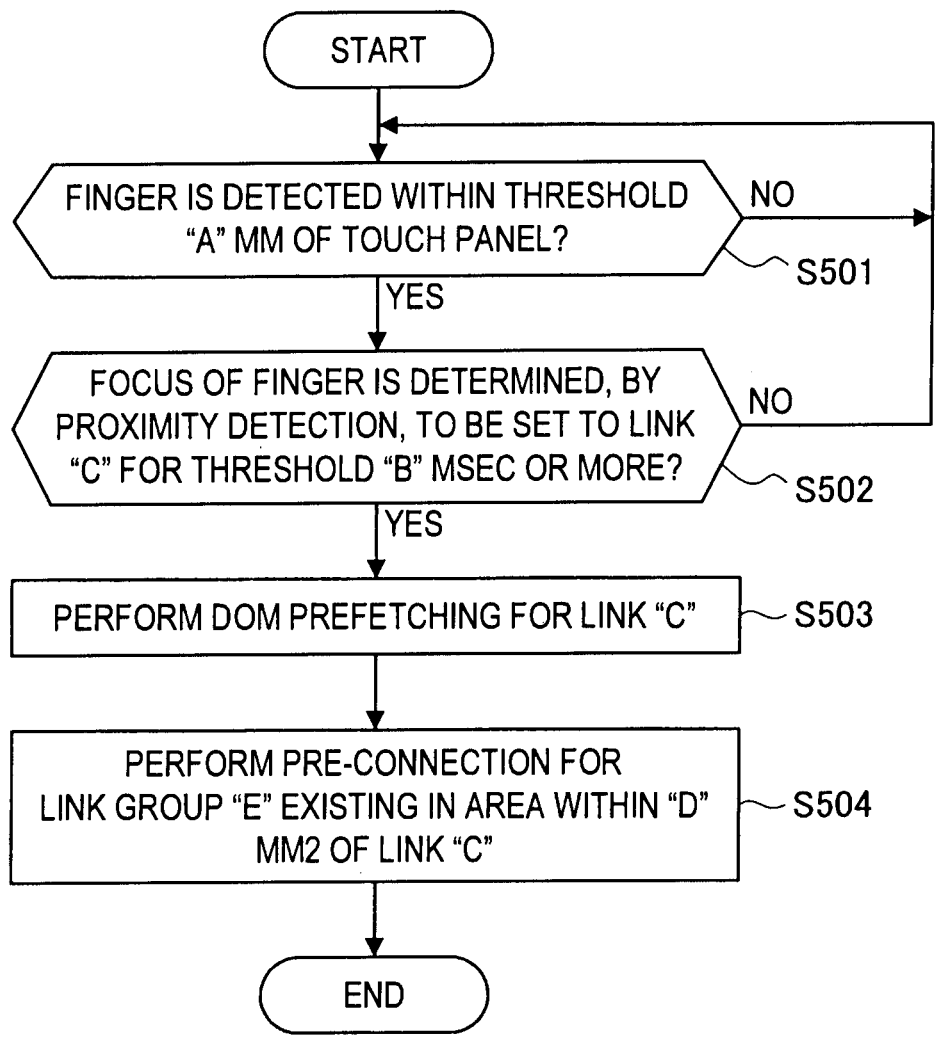
FIG. 84 is an explanatory diagram showing a flow of the prefetch process according to the embodiment.

Next, a flow of the prefetch process that uses proximity detection according to the present embodiment will be described with reference to FIG. 84. FIG. 84 is an explanatory diagram showing a flow of the prefetch process that uses the proximity detection according to the present embodiment. Additionally, in the example of FIG. 84, a finger is taken as an example of the operating tool.

As shown in FIG. 84, first, whether or not a finger is detected within a threshold A (mm) of the touch panel TP is determined (step S501). In a case a finger is detected within the threshold, the process proceeds to step S502. On the other hand, in a case a finger is not detected within the threshold, the process returns to step S501. In a case the process proceeded to step S502, whether or not the focus of the finger is set to a link C for a period of threshold B (msec) or longer is determined by the proximity detection (step S502).

In a case the focus is set for the threshold B or longer, the process proceeds to step S503. On the other hand, in a case the focus is not set for the threshold B or longer, the process returns to step S501. In a case the process proceeded to step S503, file prefetching is performed for the link C (step S503). Then, pre-connection is performed for a link group E existing in an area within D (mm$^2$) of the link C (step S504), and the series of processes is ended.

Heretofore, a flow of the prefetch process according to the present embodiment has been described.

<4-5: Structure of Touch Panel Capable of Proximity Detection (In-Cell Touch Panel)>

Next, explanation will be given on a touch panel that is capable of proximity detection with reference to FIG. 85. There are several types of touch panels, for example: a pressure-sensitive touch panel, a capacitive touch panel, and an optical touch panel. A pressure-sensitive touch panel detects the position of an operating tool by detecting the change in pressure occurring at the time of the operating tool pressing a panel. A capacitive touch panel detects, as an electrical signal, static electricity generated at the time of an operating tool touching a panel, and detects, from the detection result, the position of the operating tool. Regarding an optical touch panel, method of detecting the position or movement direction of an operating tool that touched a panel by using an optical sensor provided at an outer frame of the display panel is well known, for example.

An optical touch panel called "in-cell touch panel" is also known. An in-cell type optical touch panel (hereinafter, in-cell touch panel) detects the position of an operating tool by detecting, by using an optical sensor array formed on a glass substrate constituting a display panel, light reflected by the operating tool. A light source is provided in the display panel to display an image. When an operating tool is in contact with or in proximity to the display panel, the light emitted from the light source is strongly reflected by the operating tool and the reflected light is received by the optical sensor array.

A read circuit for reading intensity data of light detected by each optical sensor is connected to the optical sensor array.

Therefore, when light reflected by the operating tool is detected by the optical sensor array, the intensity data of light detected by each optical sensor is read by the read circuit. The intensity data of light read by the read circuit in this manner indicates the distribution of light reflected by the operating tool. Accordingly, by forming an image from the intensity data of light read by the read circuit, the shape of the operating tool that is in contact with or in proximity to the display panel is obtained as an image.

Additionally, the image obtained here corresponds to a shadow image obtained due to light emitted from the light source being intercepted by the operating tool. As described, in a case of the in-cell touch panel, the shape of an operating tool is obtained as an image, and thus, the area of the shadow cast by the operating tool can be calculated. Furthermore, when considering that the amount of light intercepted by an operating tool increases as the operating tool nears a display panel, it becomes possible to estimate the distance between the operating tool and the display panel based on the area of the shadow (see FIG. 85).

Figure 85:
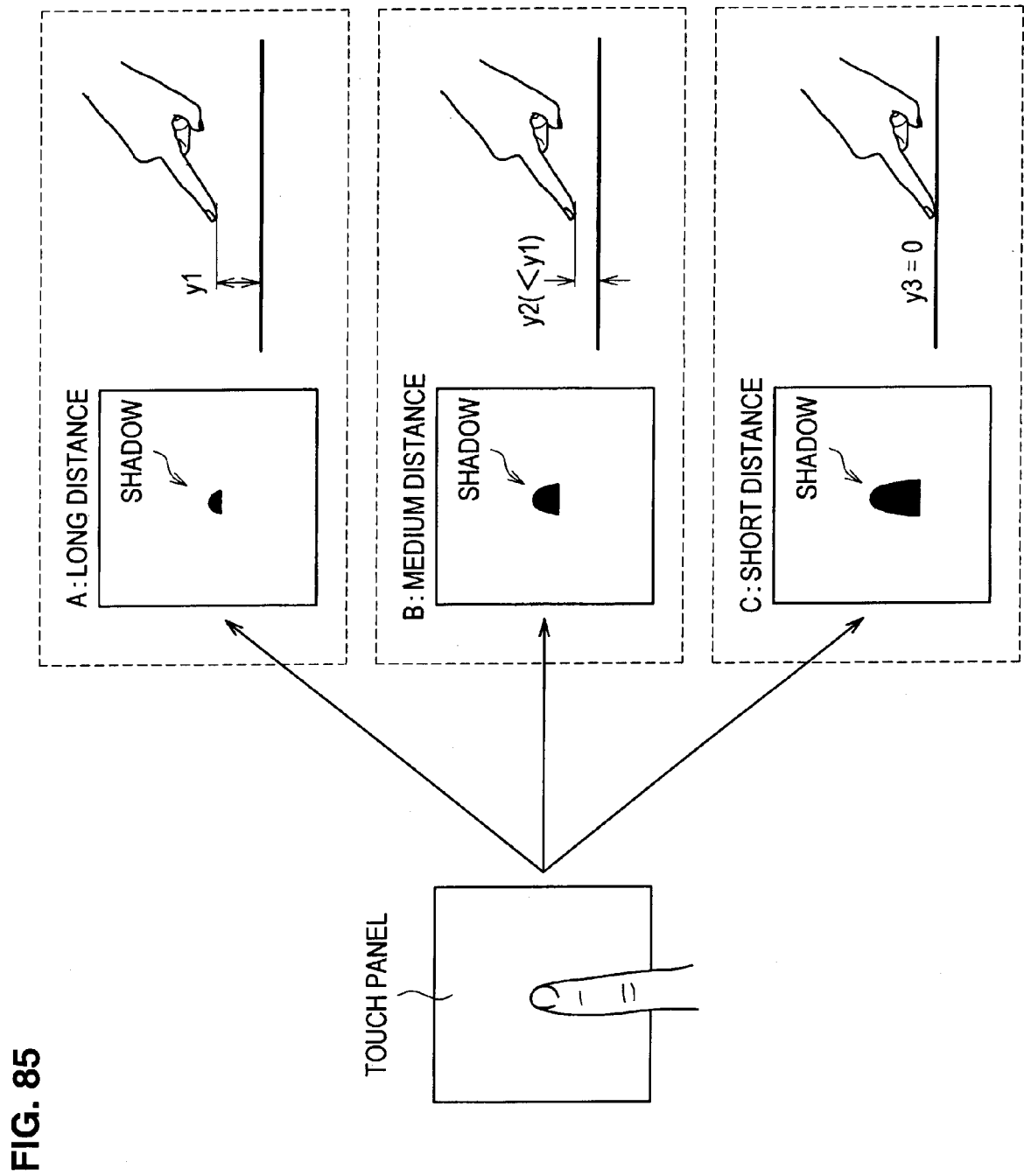
FIG. 85 is an explanatory diagram showing a method of detecting an operating tool by an in-cell touch panel.

For example, when expressing, as a shadow, a portion where the intensity of reflected light is high, image patterns as shown in FIG. 85 are obtained. When the distance to the operating tool is long, a small shadow is obtained, and as the distance to the operating tool becomes shorter, the amount of light interception increases and the area of the shadow gradually increases. Accordingly, by measuring the area of the shadow, the distance between the operating tool and the display panel can be detected. In a case of multi-touch, multiple shadows corresponding to multiple operating tools are obtained, and the distance between each operating tool and the display panel can be obtained by measuring the area of each shadow.

5: HARDWARE CONFIGURATION EXAMPLE OF INFORMATION PROCESSING APPARATUS 100

The function of each structural element of the information processing apparatus 100 (100A, 100B, and 100C) described above can be realized by using the hardware configuration of an information processing apparatus shown in FIG. 86, for example. That is, the function of each structural element is realized by controlling the hardware shown in FIG. 86 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 86, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to the network 200, and is, for example, a communication card for a wired or wireless LAN, Bluetooth (registered trademark), or WUSB, an optical communication router, an ADSL router, or various communication modems. The network 200 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

6: SUMMARY

Lastly, the technical contents according to the embodiments of the present invention will be briefly described. The technical contents stated here can be applied to various information processing apparatuses, such as a PC, a mobile phone, a portable game machine, a portable information terminal, an information appliance, a car navigation system, and the like.

The functional configuration of the information processing apparatus described above can be expressed as follows. The information processing apparatus mainly includes a link selection unit, a data prefetch unit, a structure analysis unit, a first structuring unit, a second structuring unit, and a display control unit.

The link selection unit selects one or more of at least one link destination which is a result of search based on key information.

The data prefetch unit acquires, before the link destination is selected by user operation, information relating to a layout of a display screen and display control data including at least a structural unit in which the information relating to a layout of a display screen is written, the display control data and the information relating to a layout of a display screen existing at the link destination selected by the link selection unit.

The structure analysis unit analyses the display control data and extracts structural units included in the display control data, in a case the link destination whose display control data has been acquired by the data prefetch unit is selected by the user operation.

The first structuring unit generates, in a case the link destination whose display control data has been acquired by the data prefetch unit is selected by the user operation, first structured data for display control by mutually linking, except for a structural unit in which information relating to display control involving script processing is written, the structural units including at least the structural unit in which the information relating to a layout of a display screen is written, among the structural units extracted by the structure analysis unit.

The second structuring unit generates, in a case the link destination whose display control data has been acquired by the data prefetch unit is selected by the user operation, second structured data for display control by mutually linking the structural units.

The display control unit displays a display screen by using the first structured data generated by the first structuring unit, and, at a stage the second structured data is generated by the second structuring unit, redisplays the display screen by using the second structured data.

According to such configuration, a well laid-out page can be quickly displayed prior to the display of a display screen by proper structured data that includes script information. That is, it becomes possible to avoid the delay in the start of page display caused by the sequential nature of script processing and to quickly present sufficient amount of information to a user in a simple but somewhat easy-to-view format. Furthermore, with a simple page being replaced with a page having a layout that is actually intended by the author of the page, a user is enabled to browse a page that accurately reflects the proper layout. As a result, both the desire to quickly browse information of a page and the desire to browse information of a page based on a proper layout can be fulfilled. In many cases, the information that a user wants can be obtained from the simple page. However, a user tends to feel uncomfortable, wondering whether the user is enabled to browse all the pieces of information that are actually intended by the author. Such uncomfortable feeling can be alleviated by presenting to the user a page that accurately reflects the author's intention as with the configuration described above.

(Notes)

The data acquisition unit 110 is an example of the data prefetch unit. The temporary DOM creation unit 131 is an example of the first structuring unit. The complete DOM creation unit 132 is an example of the second structuring unit. The communication unit 150 is an example of a connection establishment unit. The node information storage unit 135 is an example of a display history storage unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-216286 filed in the Japan Patent Office on Sep. 17, 2009, the entire content of which is hereby incorporated by reference.

What is claimed is:

1. An information processing apparatus comprising a computer processor and a memory for storing instructions that when executed by the processor perform a method, the method comprising:

selecting for prefetching at least one link destination from a plurality of link destinations, wherein the plurality of link destinations are a result of a search based on key information;

prefetching, before the at least one link destination is selected by user operation, information relating to a layout of a display screen and display control data including at least a structural unit in which the information relating to a layout of a display screen is written, the display control data and the information relating to a layout of a display screen existing at the at least one link destination selected for prefetching;

analyzing the display control data and extracting structural units included in the display control data, when the at least one link destination whose display control data has been acquired by prefetching is selected by the user operation;

generating, when the at least one link destination whose display control data has been acquired is selected by the user operation, a display screen created from first structured data for display control by mutually linking, except for a structural unit in which information relating to display control involving script processing is written, the structural units including at least the structural unit in which the information relating to a layout of a display screen is written, among the structural units extracted;

generating, when the link destination whose display control data has been acquired is selected by the user operation, a display screen created from second structured data for display control by mutually linking the structural units; and displaying the display screen created from the first structured data, which is generated at a first time, and, at a second time when the display screen created from the second structured data is generated, replacing the display screen created from the first structured data with the display screen created from the second structured data.

2. The information processing apparatus according to claim 1, wherein the method further comprises:

establishing a connection to one of the plurality of link destinations for data prefetching, wherein the link destination is selected based on at least one of the following criteria:

whether the link destination is located on a display screen within a specific proximity to a position specifying object that is used for specifying a position on the display screen, whether the link destination is currently displayed on the display screen, and whether the link destination has been selected a specific number of times or more, wherein the method further comprises establishing the connection to the link destination before the link destination is selected by the user operation.

3. The information processing apparatus according to claim 2, wherein the criteria further includes whether the link destination has a round-trip time that is equal to or greater than a specific threshold.

4. The information processing apparatus according to claim 3, wherein the criteria further includes deciding, according to a domain name or an IP address of the link destination, whether or not the link destination is to be selected as the link destination to which the connection is to be established.

5. The information processing apparatus according to claim 1, wherein the method further comprises:

acquiring the display control data and related data related to the display control data, wherein a data acquisition request for the first structured data is handled in priority to a data acquisition request for the second structured data.

6. The information processing apparatus according to claim 2, wherein the method further comprises acquiring, when a host address of the link destination is decided, an IP address corresponding to the host address before prefetching of the display control data or establishment of the connection.

7. The information processing apparatus according to claim 6, wherein the method further comprises:

storing in the memory the display control data and the related data acquired upon requests for the first structured data and the second structured data, wherein the display switches based on data stored in the memory, at a time point of all the display control data required for display based on the second structured data having been stored in the memory.

8. The information processing apparatus according to claim 1, wherein the method further comprises not generating the second structured data when the information relating to display control involving script processing is written is not present in the structural units extracted.

9. The information processing apparatus according to claim 1, wherein the method further comprises:

storing a history including a structural unit corresponding to content displayed on the display screen at the first time, wherein the display selects, at the second time, a structural unit corresponding to content to be displayed on the display screen, based on display history stored in the display history storage unit.

10. A data acquisition method comprising the steps of:

selecting one or more of at least one link destination which is a result of search based on key information;

acquiring, before the link destination is selected by user operation, display control data including at least a structural unit in which information relating to a layout of a display screen is written, the display control data existing at the link destination selected in the step of selecting a part of at least one link selection destination;

analyzing the display control data and extracting structural units included in the display control data before the link destination whose display control data has been acquired prior to the user operation is selected by the user operation;

generating, before the link destination whose display control data has been acquired prior to the user operation is selected by the user operation, first structured data for display control by mutually linking, except for a structural unit in which information relating to display control involving script processing is written, the structural units including at least the structural unit in which the information relating to a layout of a display screen is written, among the structural units extracted in the step of extracting structural units;

generating, in a case the link destination whose display control data has been acquired prior to the user operation is selected by the user operation, second structured data for display control by mutually linking the structural units;

displaying a display screen by using the first structured data generated in the step of generating first structured data; and redisplaying, upon the generation of the second structured data, the display screen by using the second structured data.

11. A non-transitory computer-readable medium having embodied thereon a program, which when executed by a computer, causes the computer to execute a method, the method comprising:

selecting one or more of at least one link destination which is a result of search based on key information;

prefetching, before the link destination is selected by user operation, display control data including at least a structural unit in which information relating to a layout of a display screen is written, the display control data existing at the link destination selected;

analyzing the display control data and extracting structural units included in the display control data, before the link destination whose display control data has been acquired by the data prefetching is selected by the user operation;

generating, before the link destination whose display control data has been acquired by the data prefetching is selected by the user operation, first structured data for display control by mutually linking, except for a structural unit in which information relating to display control involving script processing is written, the structural units including at least the structural unit in which the information relating to a layout of a display screen is written, among the structural units extracted by the structure analysis;

generating, in a case the link destination whose display control data has been acquired by the data prefetching is selected by the user operation, second structured data for display control by mutually linking the structural units; and displaying a display screen by using the first structured data, and redisplaying, upon the generation of the second structured data, the display screen by using the second structured data.

* * * * *